United States Patent
Miyaki

(10) Patent No.: US 6,603,564 B1
(45) Date of Patent: Aug. 5, 2003

(54) PRINTING DEVICE, PRINTING SYSTEM, AND STORAGE MEDIUM

(75) Inventor: Kazuyuki Miyaki, Ichinomiya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/265,877

(22) Filed: Mar. 11, 1999

(30) Foreign Application Priority Data

Mar. 12, 1998 (JP) ............................................. 10-082570
Mar. 12, 1998 (JP) ............................................. 10-082571
Mar. 12, 1998 (JP) ............................................. 10-082572

(51) Int. Cl.$^7$ .............................................. G06K 15/02
(52) U.S. Cl. ..................... 358/1.12; 358/3.02; 358/3.03; 358/3.26; 358/3.27
(58) Field of Search ............................... 358/1.12, 3.27, 358/3.26, 3.02, 3.03

(56) References Cited

U.S. PATENT DOCUMENTS 3,681,650 A * 8/1972 Koll ............................. 315/30
5,300,950 A   4/1994 Lopez et al.
6,190,058 B1 * 2/2001 Koide et al. .................. 358/1.9

FOREIGN PATENT DOCUMENTS

| EP | 0 430 451 A | 6/1991 |
|----|-------------|--------|
| EP | 0 517 543 A | 12/1992 |
| EP | 0 532 302 A | 3/1993 |
| EP | 0 730 973 A | 9/1996 |
| EP | 0 800 923 A | 10/1997 |
| JP | B2-58-43028 | 9/1983 |
| JP | A-60-168667 | 9/1985 |

* cited by examiner

Primary Examiner—Edward Coles
Assistant Examiner—Alan Rahimi
(74) Attorney, Agent, or Firm—Oliff & Berridge, PLC

(57) ABSTRACT

A tape printer is presented to improve the print quality of a border portion between print areas. Dots, which are smaller in area than dots printed in a previous print area, are printed after being shifted by α (1.0 dot) in the X direction from dots printed in an overlap area. Accordingly, even if the dots are printed slightly out of position, high-density overlap portions, where dots overlap with each other, and/or paper surface-exposed portions, where dots are away from each other, are not produced greatly or distributed unevenly.

24 Claims, 38 Drawing Sheets

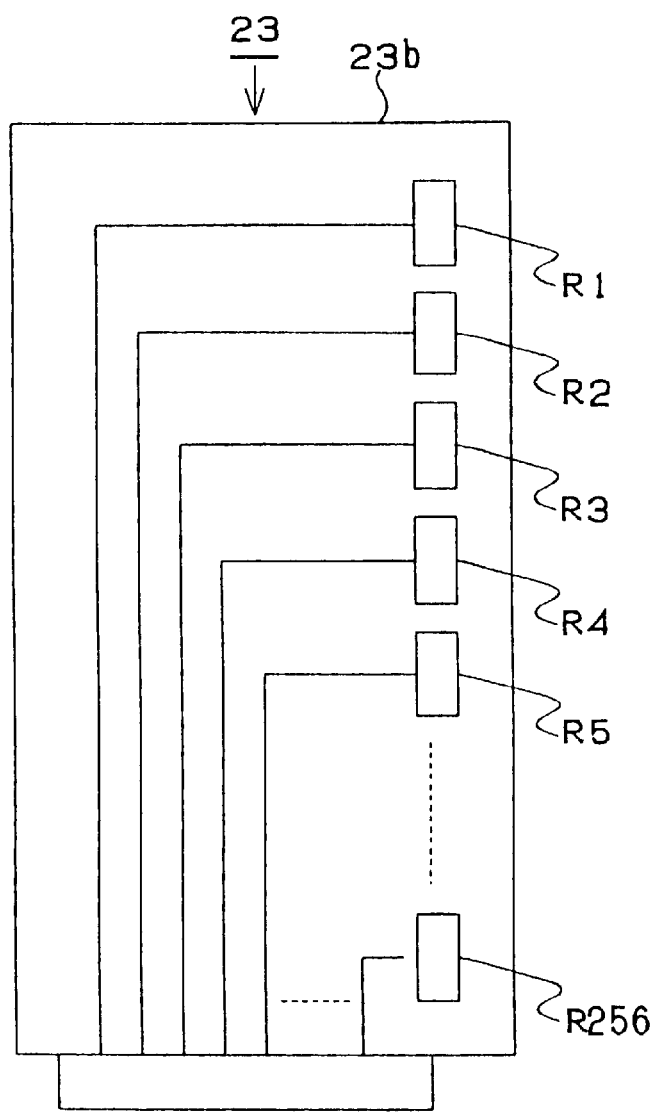
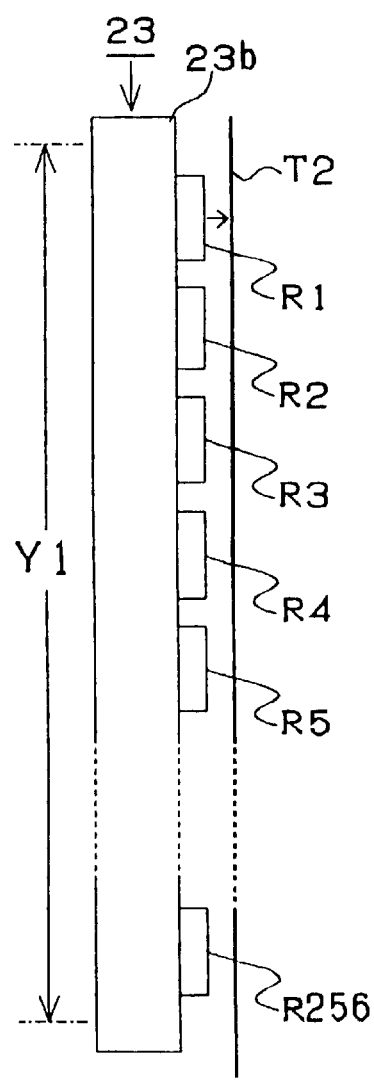

Fig.6A PULSE TABLE (64a)

| TONE LEVEL | NUMBER OF PULSES |
|---|---|
| 0 | 0 |
| 1 | 6 |
| 2 | 10 |
| 3 | 14 |
| 4 | 19 |
| 5 | 23 |
| 6 | 27 |
| 7 | 34 |
| 8 | 47 |

Fig.6B PULSE TABLE (64b)

| TONE LEVEL | NUMBER OF PULSES |
|---|---|
| 0 | 0 |
| 1 | 3 |
| 2 | 4 |
| 3 | 5 |
| 4 | 9 |
| 5 | 13 |
| 6 | 18 |
| 7 | 21 |
| 8 | 22 |

Fig.6C PULSE TABLE FOR PRINTING IN CYAN (65a)

| TONE LEVEL | NUMBER OF PULSES |
|---|---|
| 0 | 0 |
| 1 | 3 |
| 2 | 4 |
| 3 | 5 |
| 4 | 9 |
| 5 | 13 |
| 6 | 18 |
| 7 | 21 |
| 8 | 22 |

Fig.6D PULSE TABLE FOR PRINTING IN MAGENTA (65b)

| TONE LEVEL | NUMBER OF PULSES |
|---|---|
| 0 | 0 |
| 1 | 3 |
| 2 | 4 |
| 3 | 5 |
| 4 | 8 |
| 5 | 12 |
| 6 | 17 |
| 7 | 20 |
| 8 | 21 |

Fig.6H — PULSE TABLE FOR PRINTING DOTS D7, D9 (64e)

| TONE LEVEL | NUMBER OF PULSES |
|---|---|
| 0 | 0 |
| 1 | 3 |
| 2 | 4 |
| 3 | 5 |
| 4 | 9 |
| 5 | 13 |
| 6 | 18 |
| 7 | 21 |
| 8 | 22 |

Fig.6G — PULSE TABLE FOR PRINTING DOTS D6, D10 (64d)

| TONE LEVEL | NUMBER OF PULSES |
|---|---|
| 0 | 0 |
| 1 | 2 |
| 2 | 3 |
| 3 | 4 |
| 4 | 7 |
| 5 | 10 |
| 6 | 15 |
| 7 | 18 |
| 8 | 19 |

Fig.6F — PULSE TABLE (64c)

| TONE LEVEL | NUMBER OF PULSES |
|---|---|
| 0 | 0 |
| 1 | 6 |
| 2 | 10 |
| 3 | 14 |
| 4 | 19 |
| 5 | 23 |
| 6 | 27 |
| 7 | 34 |
| 8 | 47 |

Fig.6E — PULSE TABLE FOR PRINTING IN YELLOW (65c)

| TONE LEVEL | NUMBER OF PULSES |
|---|---|
| 0 | 0 |
| 1 | 4 |
| 2 | 6 |
| 3 | 7 |
| 4 | 10 |
| 5 | 15 |
| 6 | 20 |
| 7 | 23 |
| 8 | 26 |

+0.5 DOT

−0.5 DOT 1.0 DOT

+0.5 DOT

−0.5 DOT 1.0 DOT

○ PREVIOUSLY PRINTED DOT
● CURRENTLY PRINTED DOT

◇ PREVIOUSLY PRINTED DOT
◆ CURRENTLY PRINTED DOT

+0.5 DOT

−0.5 DOT 1.0 DOT

| AREA (%) | a (μm) | b (μm) |
|---|---|---|
| 100 | 133 | 185 |
| 50 | 94 | 133 |

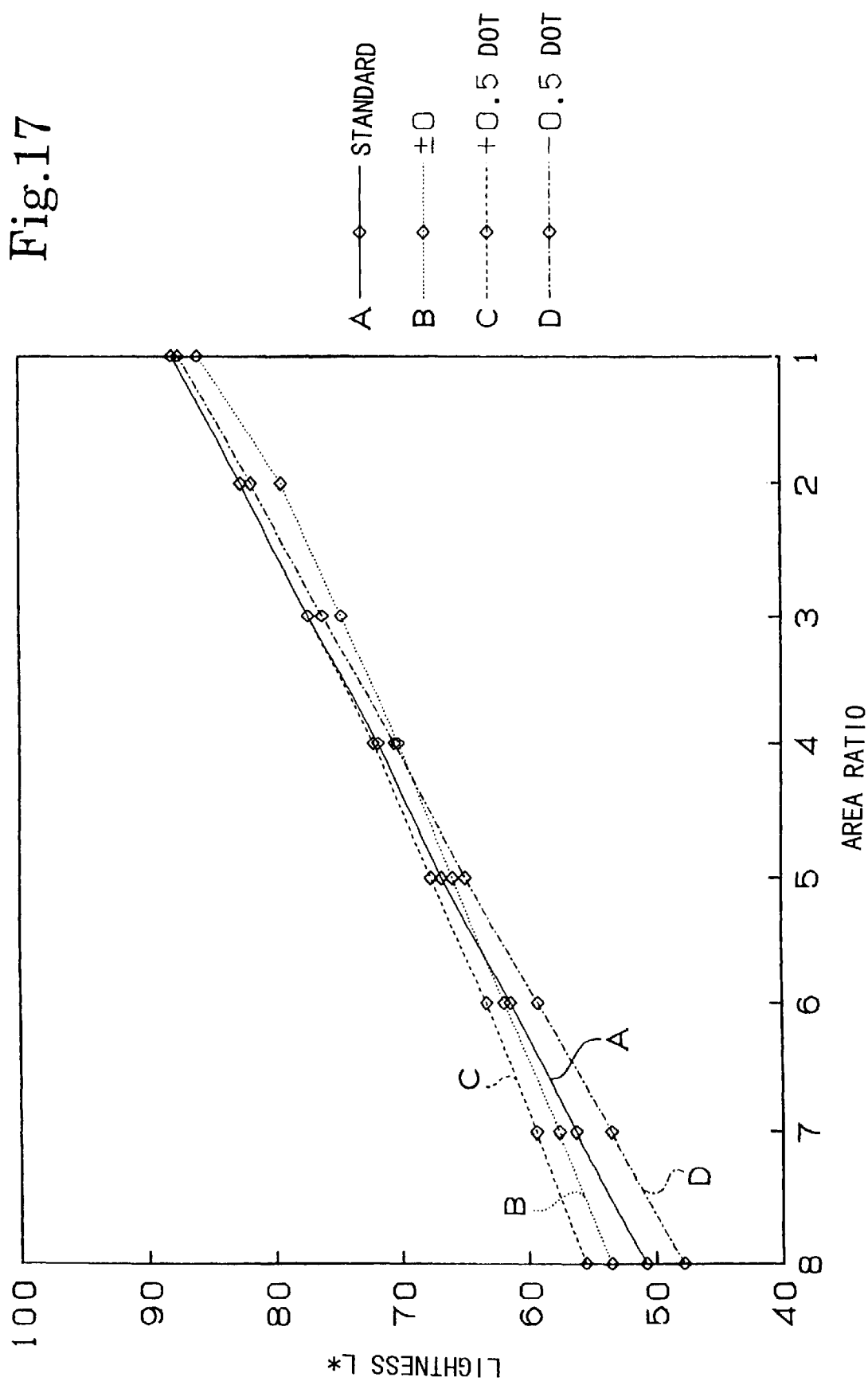

○ PREVIOUSLY PRINTED DOT
● CURRENTLY PRINTED DOT

◇ PREVIOUSLY PRINTED DOT
◇ CURRENTLY PRINTED DOT

○ PREVIOUSLY PRINTED DOT
● CURRENTLY PRINTED DOT

◇ PREVIOUSLY PRINTED DOT
◇ CURRENTLY PRINTED DOT

○ PREVIOUSLY PRINTED DOT
● CURRENTLY PRINTED DOT

◇ PREVIOUSLY PRINTED DOT
◇ CURRENTLY PRINTED DOT

○ PREVIOUSLY PRINTED DOT
● CURRENTLY PRINTED DOT

◇ PREVIOUSLY PRINTED DOT
◇ CURRENTLY PRINTED DOT

| AREA (%) | a (μm) | b (μm) |
|---|---|---|
| 100 | 133 | 185 |
| 50 | 94 | 133 |

PRINTING DEVICE, PRINTING SYSTEM, AND STORAGE MEDIUM

BACKGROUND OF THE INVENTION

1. Field of Invention

The present invention relates to a printing device which is capable of improving print quality of a border portion of each print area, when the printing device prints an image by dividing it into a plurality of print areas.

2. Description of Related Art

Conventional printing devices print an image on a medium such as paper using patterns of dots by moving a print head in a row direction with respect to the paper. The print head is provided with a plurality of printing elements aligned in a column direction.

In such printing devices, a width printable by a single scan of the print head in the row direction is limited by the length in the column direction over which the printing elements are aligned. Thus, in order to print large graphic images or characters, scanning of the print head and paper feeding should be alternately repeated.

In this case, due to variations in pitch or insufficient mechanical rigidity of gears used in paper feed mechanism, several problems arise. Excessive paper feed will produce a clearance between print areas, which appears to be a white streak. Insufficient tape feed will cause the print areas to overlap with each other. The density of overlapping images is enhanced, and a black streak is produced.

Japanese Patent Publication No. 58-43028 and Japanese Patent Application Publication No. 60-168667 provide solutions for these problems.

Japanese Patent Publication No. 58-43028 is directed to a printing technique, in which printing is performed by jetting ink droplets from nozzles to paper. In an area where printing is repeated over a previously printed image, ink droplets are jetted from every other nozzle to prevent a border portion between the print areas from standing out.

Japanese Patent Application Publication No. 60-168667 is related to a printing technique, in which ink applied to a ink ribbon is melted by heating elements and transferred to paper. The print density of an image overlapping with a previously printed image is lowered to prevent a border portion between the print areas from standing out.

Both printing techniques disclosed in the above publications are effective when the paper feed mechanism operates perfectly without errors. In fact, however, it is impossible to operate the paper feed mechanism with perfection, as assembling or mechanical errors thereof cannot be eliminated. Thus, inconsistencies in density and changes in color are still noticeable in the border portion.

SUMMARY OF THE INVENTION

In view of the foregoing, one aspect of the invention is to provide a printing device which is capable of improving print quality of a border portion of each print area.

According to the invention, print quality of a border portion between print areas can be improved by shifting, before printing is repeated over a predetermined area of a previous print area, dots, which are smaller than dots printed in the previous print area, by a predetermined amount in a row direction from dots printed in the predetermined area, Furthermore, before printing is repeated over a predetermined area of a previous print area, dots which are smaller than dots printed in the previous print area can be shifted by a predetermined amount in a column direction.

Furthermore, before printing is repeated over a predetermined area of a previous print area, dots which are smaller than dots printed in the previous print area can be shifted by a predetermined amount in row and column directions. In addition, color print quality of a border portion between print areas can be improved by changing, before printing is repeated over a predetermined area of a previous print area, the tone of dots to be printed according to the color used for printing.

In particular, it is preferable that the tone of dots to be printed is changed by selecting energy data which is associated with tone data for the color to be used for printing.

In addition, print quality of a border portion between print areas can be improved by printing at least two kinds of dots, which are different in area, over at least two kinds of dots, which are different in area and printed in a predetermined area of a previous print area.

BRIEF DESCRIPTION OF THE DRAWINGS

A preferred embodiment of the present invention will be described in detail with reference to the following figures wherein:

FIG. 4A is an illustrative diagram of the thermal head as seen from its print surface;

FIG. 4B is an illustrative diagram of the thermal head of FIG. 4A as seen from the left side;

FIG. 6A is a diagram illustrating the contents of a pulse table used for printing on a non-overlap area;

FIG. 6B is a diagram illustrating the contents of a pulse table used for printing on an overlap area;

FIG. 6C shows a pulse table used for printing in cyan;

FIG. 6D shows a pulse table used for printing in magenta;

FIG. 6E shows a pulse table used for printing in yellow;

FIGS. 6F, 6G and 6H show other pulse tables 64c, 64d and 64e.

FIG. 17 is a graph showing the relationship between the area ratio and the lightness L* of dots printed in a border portion between print areas;

DETAILED DESCRIPTION OF PREFERRED EMBODIMENTS

Preferred embodiments of this invention, which is applied to a tape printer for printing characters, symbols, and graphic images on a tape, will be described below with reference to the accompanying drawings.

Figure 1:
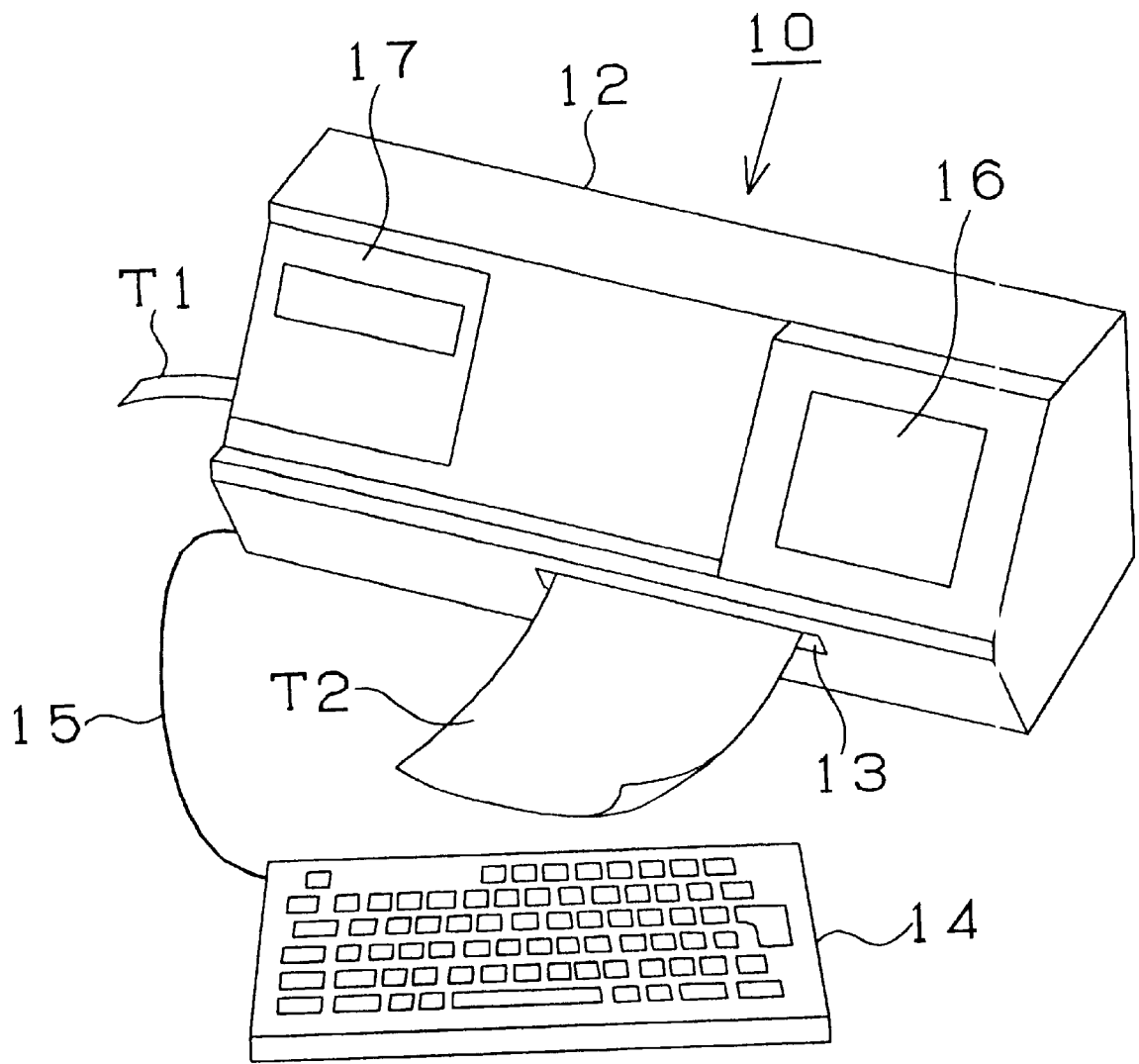
FIG. 1 is an external perspective view of a tape printer as a first embodiment of the present invention.
Figure 2:
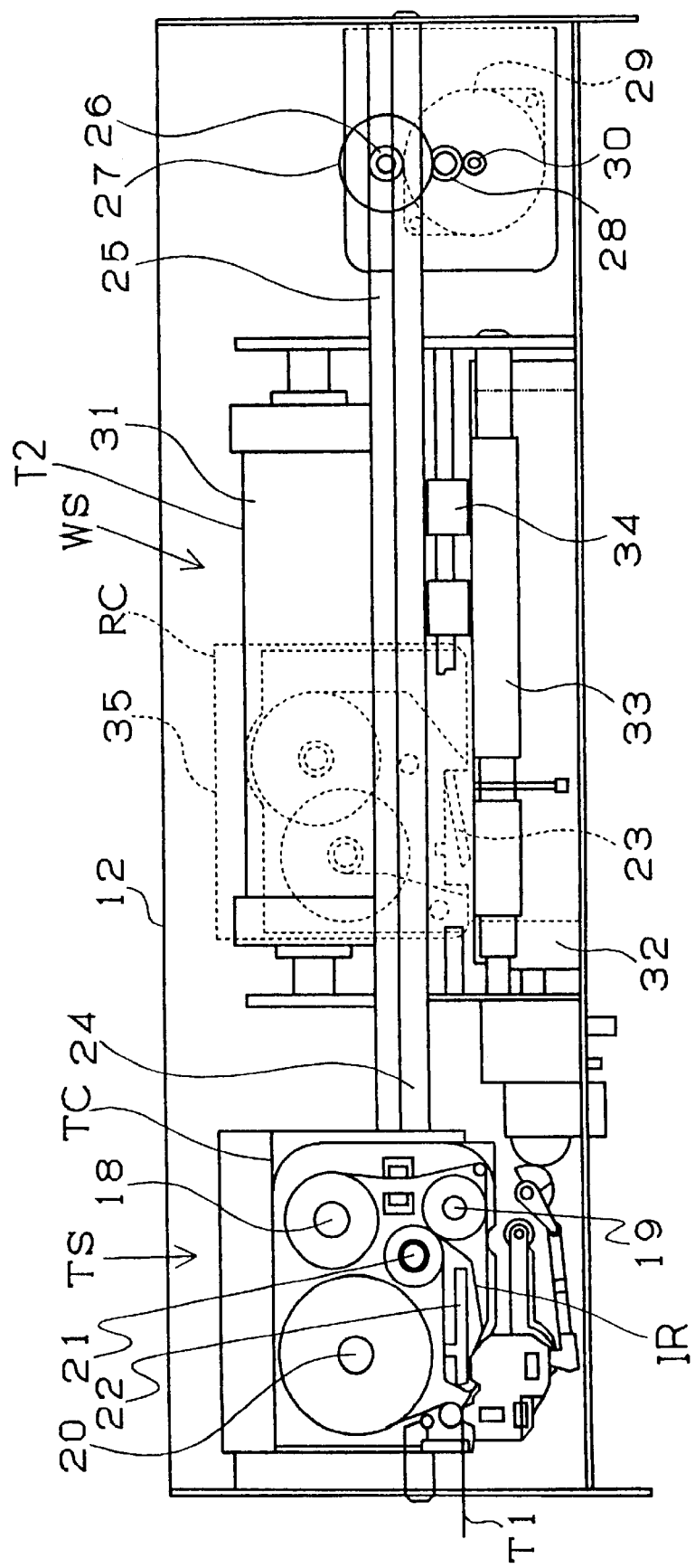
FIG. 2 is a front view showing the internal structure of the tape printer of FIG. 1.

FIG. 1 is an external perspective view of a tape printer. FIG. 2 is a front view showing the inner structure of the tape printer of FIG. 1.

Provided inside a frame 12 of the tape printer 10 are a tape station TS for monochrome printing on a narrow tape T1, and a wide station WS for monochrome and color printing on a wide tape T2. Provided at the lower front portion of the frame 12 is a discharge port 13 from which the tape T2 printed by the wide station WS is discharged. Provided at the left side of the frame 12 is a discharge port (not shown) from which the tape T1 printed by the tape station TS is discharged.

A keyboard 14 having character keys used to input characters and symbols, and various keys including an execution key is connected to the tape printer 10 via a cable 15. Data entered through the keyboard 14 is displayed on a LCD (liquid crystal display) 16 provided on the tape printer 10.

Provided at the front left portion of the frame 12 are a tape cassette TC used at the tape station TS, and a cover 17 which is opened/closed to mount/dismount a ribbon cassette RC to/from the wide station WS.

Referring now to FIG. 2, the inner structure of the tape printer 10 will be outlined.

The tape cassette TC is removably mounted on the tape station TS. Provided inside the tape cassette TC are a reel 18 around which the tape T1 is wound, a reel 19 around which an ink ribbon IR is wound, a reel 20 around which a double-sided adhesive tape is wound, and a take-up reel 21 which takes up the ink ribbon IR. A thermal head 22 is fixed below the reel 20.

At the tape station TS, the tape T1 supplied by the reel 18 and the ink ribbon IR supplied by the reel 19 overlap, and they are guided to the thermal head 22. The thermal head 22 produces a printed record on a surface of the tape T1 via the ink ribbon IR. The double-sided adhesive tape supplied by the reel 20 is laminated onto the printed surface of the tape T1. Then the laminated tape T1 is discharged from the discharge port (not shown) provided at the left side of the frame 12.

At the wide station WS, the ribbon cassette RC is removably mounted on a carriage 35. Attached to the carriage 35 is the thermal head 23. A guide shaft 24 extending within the frame 12 in its width direction penetrates the carriage 35. The rear portion of the carriage 35 is attached to a timing belt 25 provided along the guide shaft 24. One end of the timing belt 25 is placed over a pulley 26, which rotates integrally with a gear 27. The gear 27 is rotated via a gear 28 as a result of rotation of a drive shaft 30 of a carriage moving motor 29.

A driving force of the carriage moving motor 29 is transferred via the drive shaft 30, the gears 28, 27, the pulley 26, and the timing belt 25 to the carriage 35. As a result, the carriage 35 reciprocates along the guide shaft 24 with the ribbon cassette RC and the thermal head 23 mounted therewithin.

An encoder member (not shown) is provided along the guide shaft 24. An encoder sensor 61 (FIG. 5) provided on the carriage 35 reads a mark provided on the encoder member to detect the carriage position when the carriage moves.

Provided at the inner rear portion of the frame 12 is a roller 31 around which the tape T2, which is wider than the tape T1, is wounded. The roller 31 is rotated by a tape feed mechanism (not shown), and the tape T2 around the roller 31 is guided between the thermal head 23 and a platen 32. Then, the thermal head 23 prints on the tape T2 via the ink ribbon IR, and the printed tape T2 is discharged from the discharge port 13 by tape feed rollers 33, 34.

Figure 3A:
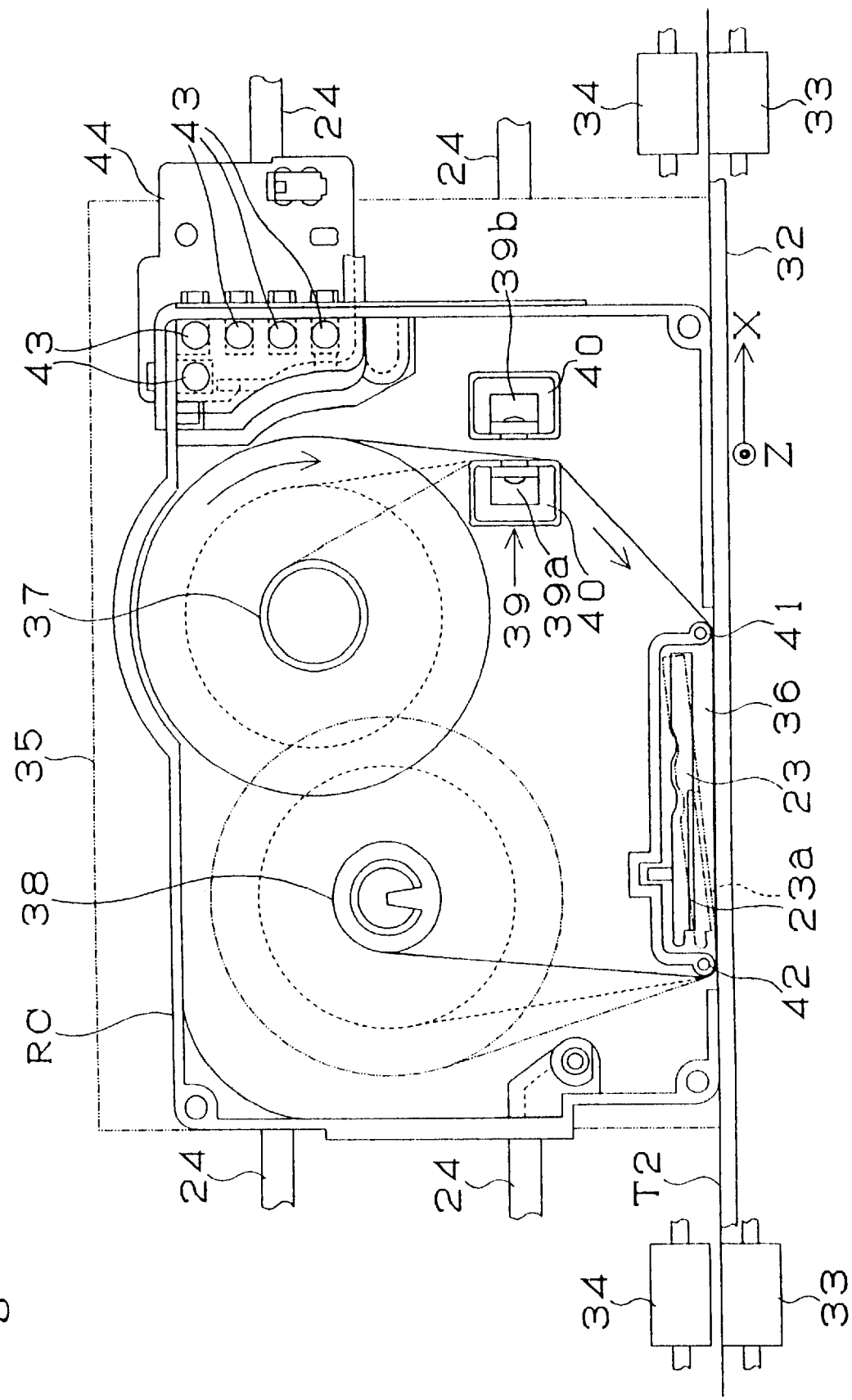
FIG. 3 is a diagram showing the structure of a ribbon cassette and a thermal head.
Figure 3B:
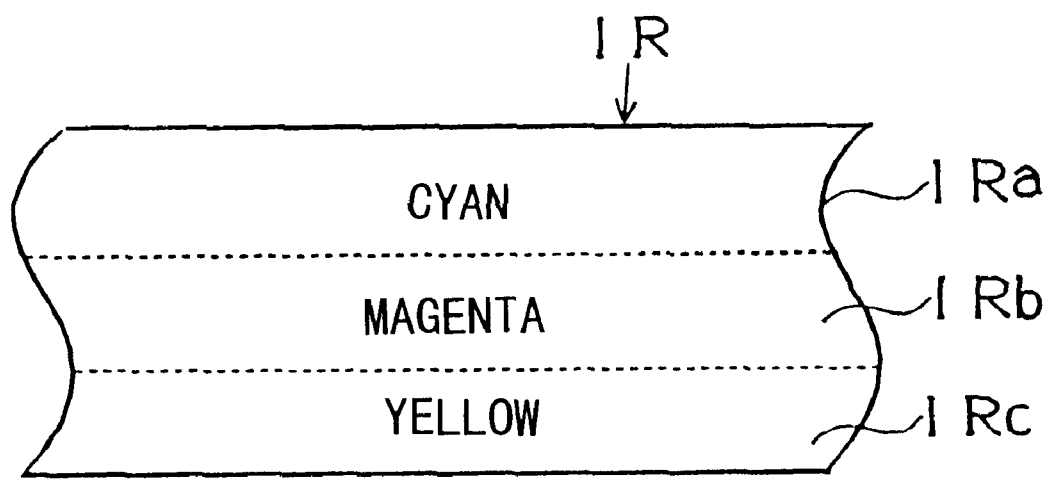

Referring now to FIGS. 3A and 3B, the structure of the ribbon cassette RC and the thermal head 23 will be described.

Figure 5:
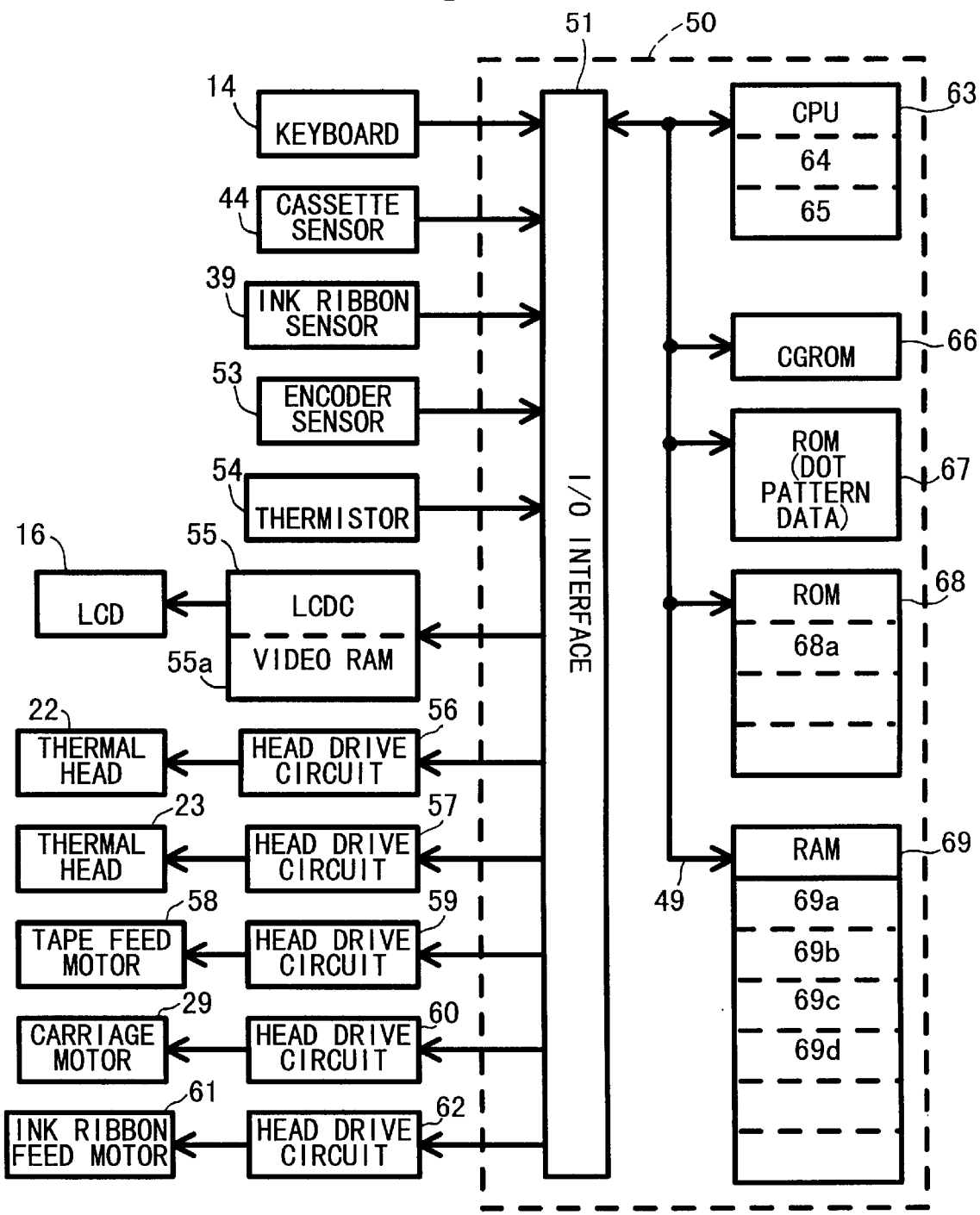
FIG. 5 is a block diagram outlining the configuration of a control system of the tape printer of FIG. 1.

Disposed at the lower portion of the carriage 35 is the thermal head 23. The thermal head 23 is designed to be disposed within an opening 36 formed at the lower portion of the ribbon cassette RC when the ribbon cassette RC is mounted. The ink ribbon IR, which is divided into three areas, cyan, magenta, and yellow from the top, as shown in FIG. 3B, is wounded around the reel 37. The used ink ribbon IR is taken up by a reel which is rotated by an ink ribbon feed motor 61 (FIG. 5).

The ink ribbon IR supplied from the reel 37 passes between a light emitting element 39a and a light receiving element 39b which constitutes an ink ribbon sensor for detecting the ribbon end and color. The light emitting element 39a and the light receiving element 39b are mounted on the carriage 35 and inserted into a pair of through holes 40, 40 formed in the ribbon cassette RC, respectively. The portion of the ink ribbon IR which has passed the ink ribbon sensor 39 is taken up by the reel 38 via a guide member 41, a print surface 23a of the thermal head 23, and another guide member 42. The thermal head 23 is spaced away from the tape T2, as shown by a solid line in FIG. 3A, when it is not operative, and it contacts the tape T2, as shown by a phantom line in FIG. 3B, when it is operative. Such movement of the thermal head 23 is accomplished by a mechanism (not shown) in association with mounting/dismounting of the ribbon cassette RC. Specifically, mounting the ribbon cassette RC causes the thermal head 23 to move into the position shown by the solid line and contact the tape T2. Dismounting the ribbon cassette RC causes the thermal head 23 to move into the position shown by the phantom line and retract from the tape T2.

Provided at the upper right portion of the ribbon cassette RC are a plurality of identifying elements 43. The type of the ribbon cassette RC is determined by each of the identifying elements 43, which is recessed or not recessed. Provided opposed to ,the identifying elements 43 is a cassette sensor 44 for sensing the presence of a recess or recesses of the identifying elements 43.

Referring now to FIG. 4, the structure of the thermal head 23 will be described.

FIG. 4A is an illustrative diagram of the thermal head 23 as seen from its print surface. FIG. 4B is an illustrative diagram of the thermal head 23 of FIG. 4A as seen from the left side.

The thermal head 23 is provided with 256 heating elements R1–R256 on a ceramic board 23b. The heating elements R1–R256 are aligned in the direction of the width of the ink ribbon IR, i.e., in the direction of a column (in the direction of an arrow Z1 shown in FIG. 3). By heating all the heating elements R1–R256, printing to a maximum height of Y1 can be accomplished.

It is noted that the thermal head 23 is driven in a staggered manner in the preferred embodiments described below.

Referring now to FIG. 5, the configuration of the control system of the tape printer 10 will be outlined.

A control system 50 for performing various controls is built in the tape printer 10. Connected to an input/output interface 51 of the control system 50 are the keyboard 14, the cassette sensor 44, the ink ribbon sensor 39, the encoder sensor 53, a LCDC (liquid crystal display controller) 55 having a video PAM 55a for outputting display data, a thermistor 54 for measuring the ambient temperature of the tape printer 10, a head drive circuit 56 for driving the thermal head 22, a head drive circuit 57 for driving the thermal head 23, a motor drive circuit 59 for driving the tape feed motor 58, a motor drive circuit 60 for driving the carriage moving motor 29, and a motor drive circuit 62 for driving the ink ribbon feed motor 61.

When the motor drive circuit 59 outputs a 4-pulse drive signal, the tape feed motor 58 feeds the tape T2 by an amount corresponding to 1.0 dot. When the motor drive circuit 60 outputs a 2-pulse signal, the carriage moving motor 29 moves the carriage 35 by an amount corresponding to 1.0 dot in the printing direction. As the carriage 35 moves, a print clock is generated based on the signal output from the encoder sensor 53, and the frequency of the drive signal to be output to the thermal head 23 is determined by the print clock.

A CPU 63 for controlling the head drive circuits 56, 57, the motor drive circuits 59, 60, 62, and the LCDC 55 is also connected to the input/output interface 51 via a bus. The CPU 63 incorporates therein a pulse memory 64 storing a pulse table 64a (FIG. 6A) and a pulse table 64b (FIG. 6B), as well as a pulse memory 65 storing a pulse table used for printing in cyan 65a (FIG. 6C), a pulse table used for printing in magenta 65b (FIG. 6D), and a pulse table used for printing in yellow 65c (FIG. 6E).

The structure of the pulse table will be described.

FIG. 6A shows the contents of the pulse table 64a used for printing in any color on a print area except for an overlap area HA (referred to as a non-overlap area hereinafter). FIG. 6B shows the contents of the pulse table 64b used for printing in black on the overlap area HA. FIG. 6C shows the contents of the pulse table 65a used for printing in cyan on the overlap area HA. FIG. 6D shows the contents of the pulse table 65b used for printing in magenta on the overlap area HA. FIG. 6E shows the contents of the pulse table 65c used for printing in yellow on the overlap area HA.

In each of the pulse tables in FIGS. 6A, 6B, 6C, 6D, and 6E, tone data representing the nine levels of tone from 0 to 8 and pulse data representing the number of pulses, which is applied to the heating elements, are shown in a one-to-one correspondence. If comparisons are made between the pulse tables as to the number of pulses for the same tone level, the number of pulses set in the pulse tables 64b, 65a, 65c (FIG. 6B–6E), which are used for printing on the overlap area, is smaller than that set in the pulse table 64a (FIG. 6A), which is used for printing on the non-overlap area.

For example, the number of pulses for the tone level "8" is "47" in the pulse table 64a (FIG. 6A) used for printing on the non-overlap area, while the corresponding number of pulses is "22" in the pulse table 64b (FIG. 6B) used for printing on the overlap area.

The number of pulses set in the pulse table 65a (FIG. 6C) used for printing in cyan is smaller than that set in the pulse table 65c (FIG. 6E) used for printing in yellow. When printing is repeated using the same color, the portion printed in cyan over cyan stands out more than that printed in yellow over yellow. For this reason, by setting the number of pulses applied to the heating elements for printing in cyan over cyan smaller than that for printing in yellow over yellow, heat generated by the heating elements is reduced, and thereby the density, i.e., the intensity of overlap portions is reduced.

In addition, the number of pulses set in the pulse table 65b (FIG. 6D) used for printing in magenta is smaller than that set in the pulse table 65a (FIG. 6C) used for printing in cyan. When printing is repeated using the same color, the portion printed in magenta over magenta stands out more than that printed in cyan over cyan. For this reason, by setting the number of pulses, as a drive signal, for printing in magenta over magenta smaller than that for printing in cyan over cyan, heat generated by the heating elements is reduced, and thereby the density, i.e., the intensity of the overlap portions is reduced.

As described above, the number of pulses is set in correspondence with the tone level of each color used for printing on the overlap area. The number of pulses set for yellow, cyan, and magenta decreases in this order.

A CGROM 66, a ROM 67, a ROM 68, and a RAM 69 are connected to the input/output interface 51 via the bus 49. The CGROM 66 stores dot pattern data used for displaying characters, such as alphabets and symbols, in association with code data, while the ROM 67 stores dot pattern data used for printing characters in association with code data. The dot pattern data used for printing is classified according to the font, such as Gothic and Courier, and prepared in eight character sizes (16-, 24-, 32-, 48-, 64-, 96-, and 128-dot sizes) for each font.

The ROM 68 stores various control programs including a head drive program for driving the thermal heads 22, 23, a pulse control program for controlling the number of pulses applied to each of the heating elements, a display control program for controlling the LCDD 55 according to the code data for characters, numerals, and symbols entered from the keyboard 14, and a motor control program for controlling the carriage moving motor 29, and the ink ribbon feed motor 61.

A text memory 69a in the RAM 69 stores text data entered from the keyboard 14, and a text pointer 69b stores addresses of the text memory 69a. A character size memory 69c stores data on character size used for printing and specified from the keyboard 14, and a print buffer 69d stores, as print data, dot pattern data used for printing a plurality of characters and symbols.

A first embodiment of the tape printer 10 of this invention is described such that, when printing is repeated over the previously printed area, the print starting position is moved only in the direction of a row.

Figure 7:
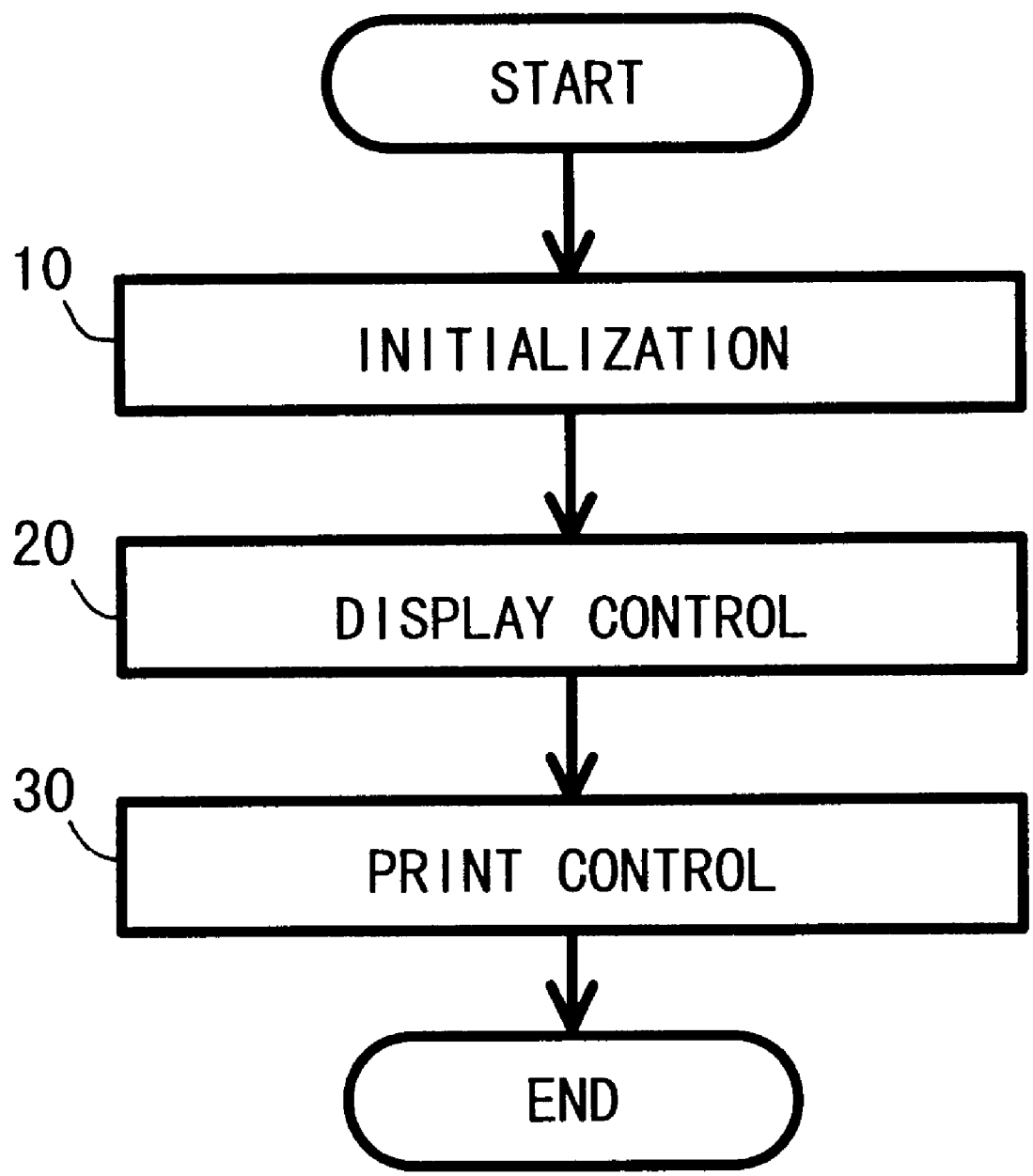
FIG. 7 is a flowchart outlining a control routine executed by a CPU.
Figure 8A:
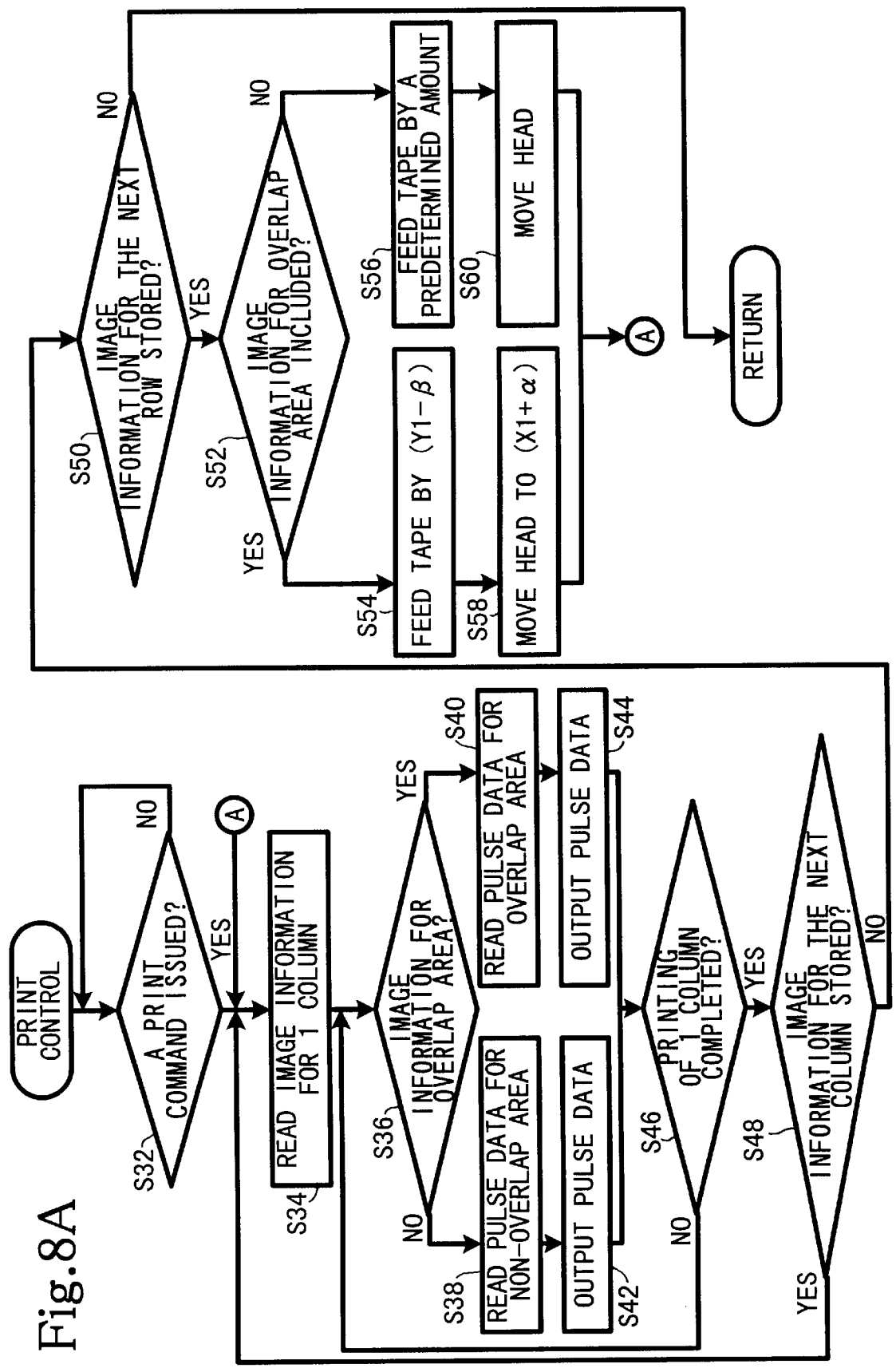
FIGS. 8A, 8B, and 8C are flowcharts showing a print control routine executed at step 30 of FIG. 7.
Figure 9:
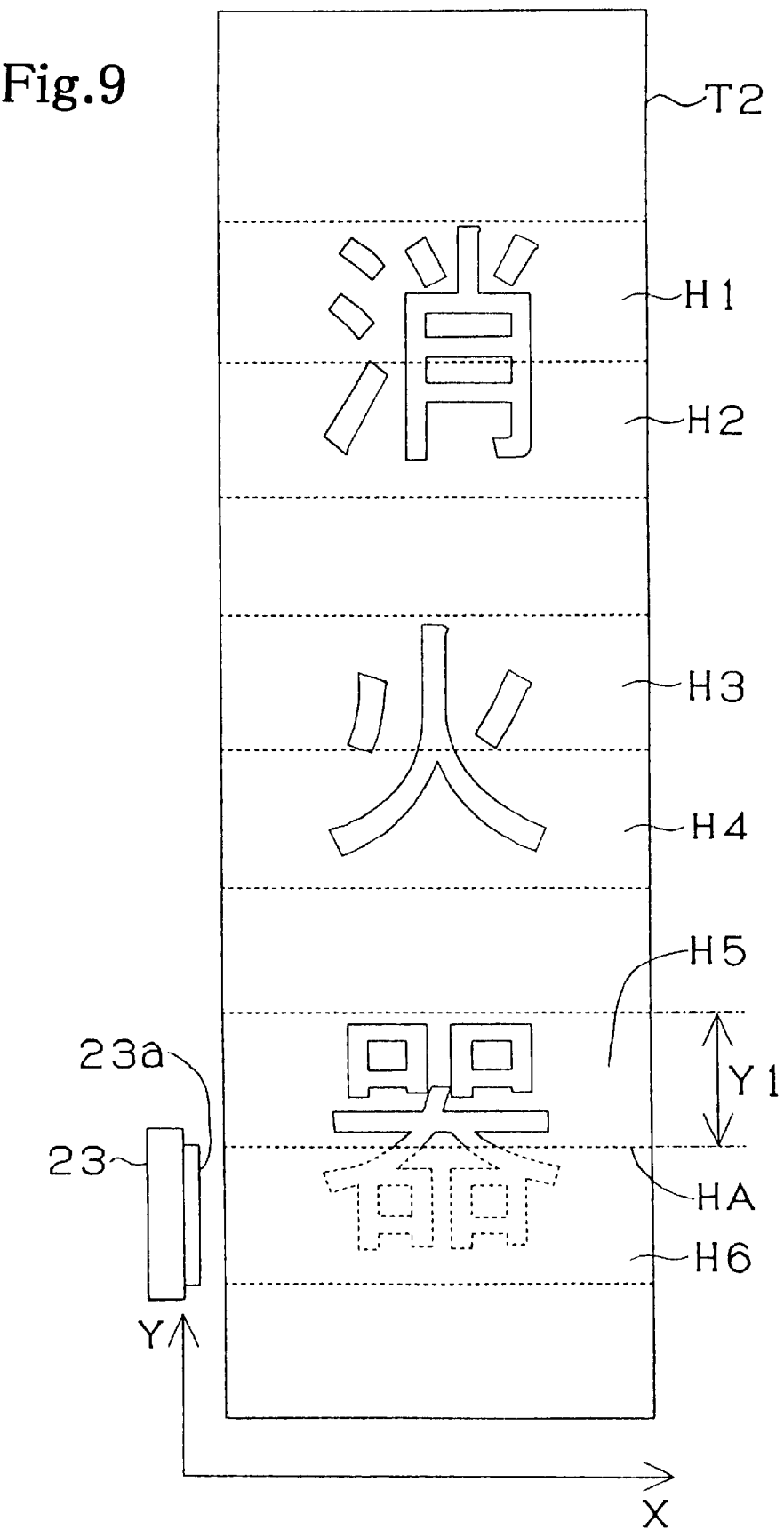
FIG. 9 is a diagram illustrating characters to be printed on a tape.
Figure 10A:
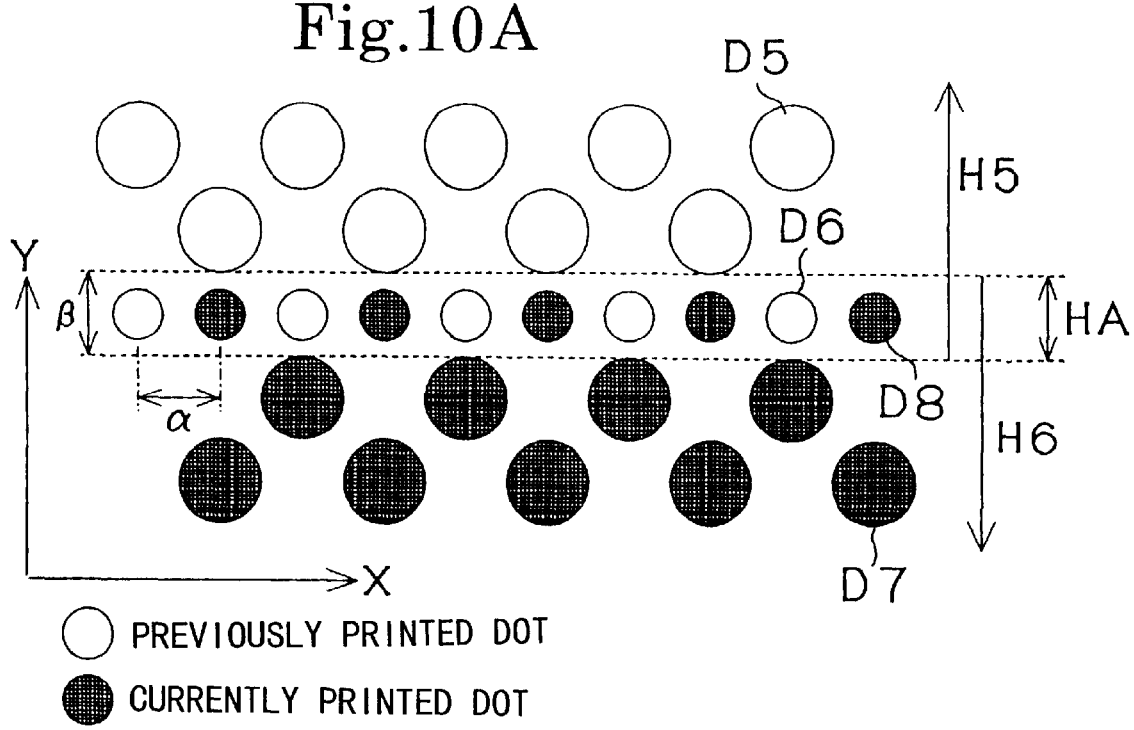
FIG. 10A is a partially exploded diagram illustrating a dot pattern in an overlap area in the first embodiment.
Figure 10B:
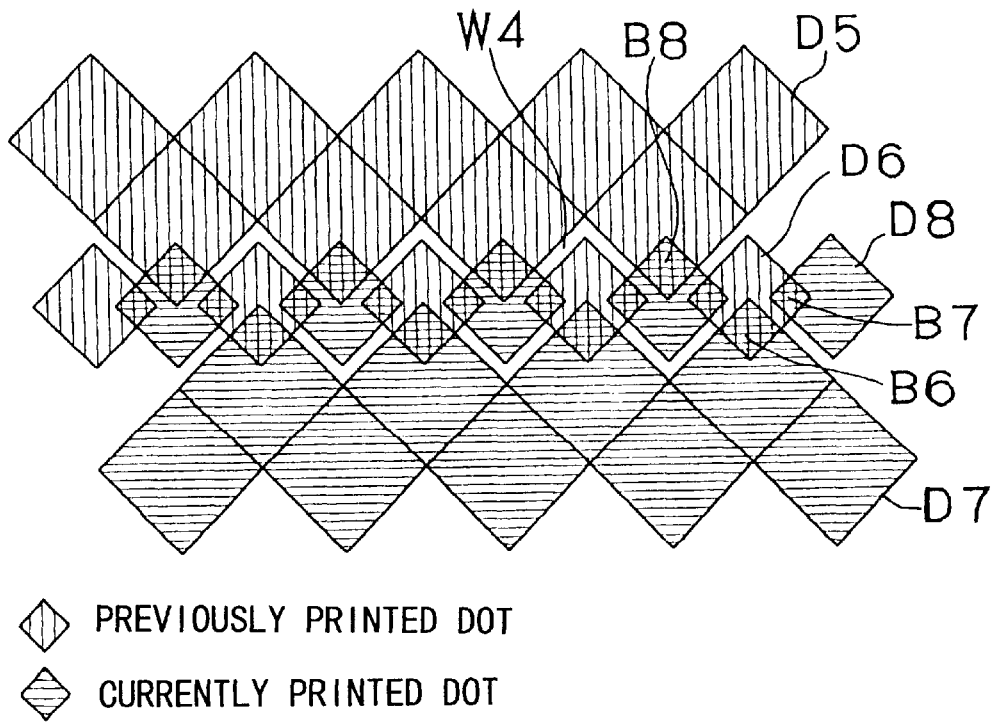
FIG. 10B is a diagram illustrating the result of a simulation performed using the dot pattern of FIG. 10A.

FIG. 7 is a flowchart outlining a control routine executed by the CPU 63. FIG. 8A is a flowchart showing a print control routine executed at step 30 of FIG. 7. FIG. 9 is a diagram illustrating characters to be printed on the tape T2 and a printing sequence. FIG. 10A is a partially exploded diagram illustrating a dot pattern in the overlap area HA, where print areas H5 and H6 shown in FIG. 9 overlap with each other. FIG. 10B is a diagram illustrating the result of a simulation performed using the dot pattern shown in FIG. 10A.

Described herein is a case where characters shown in FIG. 9 are printed as open characters against a red background on the tape T2 by the wide station WS. It is noted that printing on a single print area is accomplished by a single scan of the thermal head 23 in the row direction.

First, when an operator turns on the power switch of the tape printer 10, the CPU 63 performs initialization at S10 (hereinafter, S stands for a step). Then, the CPU 63 executes display control for displaying on the LCD 16 characters and symbols entered from the keyboard 14 (S20), and executes print control for driving the thermal head 23 and various motors based on the dot pattern data for printing, which is associated with the entered characters and symbols (S30).

Referring now to FIG. 8A, a control routine executed by the CPU 63 will be described.

When the CPU 63 detects that a print command is issued through keyboard operations (S32: Yes), image information used for printing the first column of the first row, i.e., a print area H1 is read from the print buffer 69d in the RAM 69 (S34).

Then, the CPU 63 determines if each piece of image information is the one used for printing on the overlap area (S36). Specifically, the CPU 63 determines if each piece of image information is the one to be output to the heating element R256 disposed at the lowermost end of the thermal head 23.

As shown in FIG. 9, image information used for printing on the print area H5 includes a piece of image information for driving the heating element R256. In this case, that piece of image information is determined to be the data used for printing on the overlap area HA.

When the CPU 63 determines that a piece of image information is not the one used for printing on the overlap area HA (S36: No), the CPU 63 reads, from the pulse table 64a stored in the pulse memory 64 within the CPU 63, pulse data corresponding to the tone level specified by the tone data contained in the piece of image information (S38).

For example, when the tone level is "8", the CPU 63 reads "47", as the pulse data, as shown in FIG. 6A.

Then, the CPU 63 outputs the read pulse data to the head drive circuit 57 (S42), which in turn outputs, according to the received pulse data, a drive signal in terms of the number of pulses to the applicable heating element of the thermal head 23.

When the CPU 63 determines that a piece of image information is the one used for printing on the overlap area HA (S36: Yes), the CPU 63 reads, from the pulse table 64b stored in the pulse memory 63 within the CPU 63, pulse data corresponding to the tone level specified by the tone data contained in the read image data (S40). When the tone level is "8", the CPU 63 reads "22" as the pulse data, as shown in FIG. 6B. Then, the CPU 63 outputs the read pulse data to the head drive circuit 57 (S44), which in turn outputs, according to the received pulse data, a drive signal in terms of the number of pulses to the applicable heating element of the thermal head 23.

The head drive circuit 57 outputs a drive signal in terms of the number of pulses corresponding to the pulse data to the applicable heating element. Then, the heating element generates heat, and ink applied to the ink ribbon IR is melted and transferred to the tape T2. Thus, printing is accomplished in a pattern of dots on the tape T2. At this time, as the number of pulses becomes greater, the heating element generates higher heat, and dots being larger in area are printed.

The CPU 63 repeats S36 to S44 until it determines, at S46, that printing of one column is completed. If the CPU 63 determines in the affirmative at S46, it determines if the print buffer 69d stores image information used for printing the next column (S48).

Then, the CPU 63 repeats S34 to S46 to continue printing in the row direction, i.e., in the X-axis direction until it determines, at S48, that the print buffer 69d stores no image information for the next column. If the CPU 63 determines in the negative at S48, it determines if the print buffer 69d stores image information used for printing the next row (S50). If the CPU 63 determines in the affirmative at S50, it determines if the image information for the next row includes image information used for printing on the overlap area (S52). Specifically, the CPU 63 determines if the image information for the next row includes image information to be output to the heating element R1 disposed at the uppermost end R1 of the thermal head 23.

When the CPU 63 determines that the image information for the next row includes image information used for printing on the overlap area (S52: Yes), it feeds the tape T2 by a length of (Y1−β) at S54. Y1 is the maximum width (in the row direction) printable by the thermal head 23, and β is an amount overlapping with the previously printed area.

The CPU 63 moves the carriage 35 in the row direction so that the print starting position is set at (X1−α). X1 shows the initial print starting position at which the print head 23 is set when the image information for the next row includes no image information used for printing on the overlap area HA, and α shows an amount by which the thermal head 23 is moved in the row direction.

It is noted that β is a length corresponding to 1.0 dot, and so is α.

Then, the CPU 63 jumps to S34, and repeats S34 to S48 to perform printing on the print area H6 until it determines, at S48, that the print buffer 69d stores no image information used for printing the next column.

When the CPU 63 determines, at S52, that the image information for the next row includes no image data used for printing on the overlap area HA (S52: No), it feeds the tape T2 by a predetermined amount (S56) and moves the thermal head 23 to its initial print starting position (S60). When printing is all done, the tape T2 is fed to be discharged (S56) and cut by a cutting mechanism (not shown). Finally, the CPU 63 returns the thermal head 23 to its initial position (S60).

As described above, the CPU 63 performs printing on the print areas H1–H6 and, as a result, a character string is printed on the tape T2 as shown in FIG. 9.

Referring now to FIGS. 10A and 10B, the overlap area HA, where the print areas H5 and H6 overlap with each other, will be described.

As shown in FIG. 10A, the print area H6 overlaps with the previously printed print area H5 by β (1.0 dot) in the column direction (+Y direction). Dots D6 forming the overlap area HA are smaller in area than dots D5 forming the non-overlap area of the print area H5.

In the print area H6, dots D8 forming the overlap area HA are smaller in area than dots D7 forming the non-overlap area of the print area H6, and printed while being shifted by α (1.0 dot) in the row direction.

In short, dots D6 and D8 are formed alternately in the row direction in the overlap area HA.

As shown in FIG. 10B, high-density overlap portions B6, B7, and B8, where dots D6 and D7, dots D6 and D8, dots D5 and D8 overlap with each other, respectively, are formed in the overlap area HA. Since the overlap portions B6, B7 and B8 are generally identical in area and formed alternately, they are not likely to stand out.

Figure 11A:
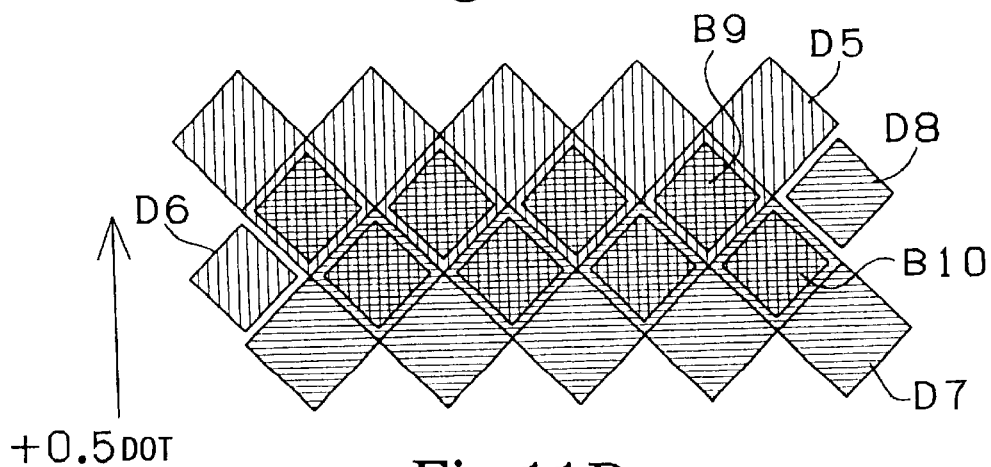
FIG. 11A is a diagram illustrating the result of simulating a case in the first embodiment where dots D8 are printed while being shifted by 0.5 dot in the +Y direction.
Figure 11B:
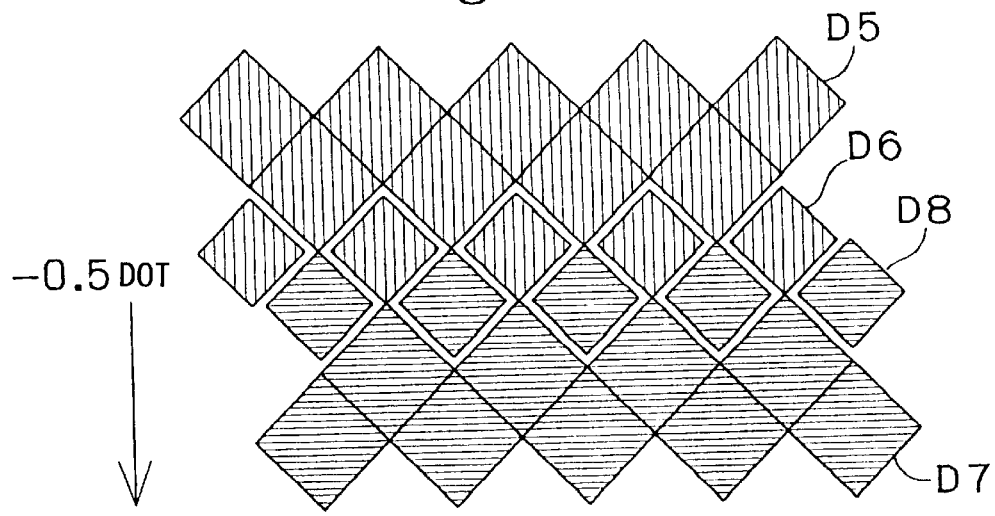
FIG. 11B is a diagram illustrating the result of simulating a case where dots D8 are printed while being shifted by 0.5 dot in the −Y direction.
Figure 11C:
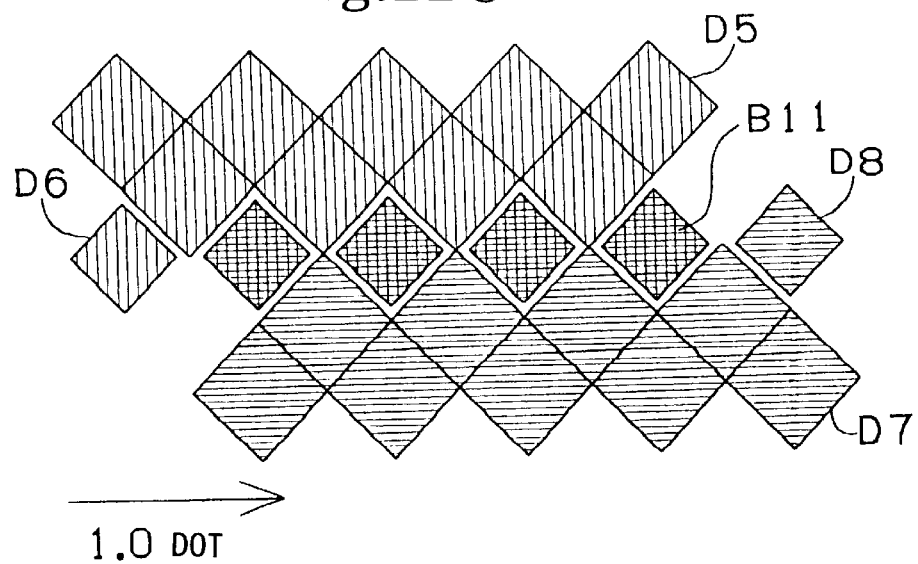
FIG. 11C is a diagram illustrating the result of simulating a case where dots D8 are printed while being shifted by 1.0 dot in the +X direction.

Referring now to FIGS. 11A, 11B, and 11C, illustrated therein are cases where dots D8 are printed slightly out of position in the overlap area HA.

FIG. 11A is a diagram illustrating the result of simulating a case where dots D8 are printed while being shifted by 0.5 dot in the +Y direction. In this case, as shown in FIG. 11A, overlap portions B9 and B10, where dots D6 and D7, and dots D5 and D8 overlap with each other, respectively, are formed.

However, since the overlap portions B9 and B10 are generally identical in area and smaller in area than other dots D5 and D7, and formed continuously and alternately in the row direction, they are not likely to stand out.

FIG. 11B is a diagram illustrating the result of simulating a case where dots D8 are printed while being shifted by 0.5 dot in the −Y direction. In this case, as shown in FIG. 11B, since no overlapping dots or no high-density portions are formed, the overlap area HA between the print areas does not stand out.

FIG. 11C is a diagram illustrating the result of simulating a case where dots D8 are printed while being shifted by 1.0 dot in the +X direction. In this case, as shown in FIG. 11C, overlap portions B11, where dots D6 and D8 overlap with each other, are formed. However, since the overlap portions B11 are smaller in area than other dots D5 and D7 and formed uniformly in the row direction, they are not likely to stand out.

As described above, print quality of the overlap area HA between the print areas H5 and H6 can be improved by shifting, prior to printing, dots D8, which are smaller in area than dots D5 printed in the print area H5, by 1.0 dot in the row direction from dots D6 formed at the lowermost end of the print area H5.

In particular, even if the print starting position for printing on the print area H5 and that for printing on the print area H6 are shifted from the respective proper positions, print quality is not noticeably affected.

Described below is a second embodiment of a tape printer 10 of this invention, wherein, when printing is repeated over the previously printed area, the print starting position is moved only in the direction of a column (+Y direction).

The second embodiment is the same as the first embodiment except for values $\alpha$ and $\beta$, which are shown at S58 and S54, respectively.

In the flowchart shown in FIG. 8A, when the CPU 63 determines that the print buffer 69d stores image data used for printing the overlap area HA (S52: Yes), it feeds the tape T2 by a length of (Y1–$\beta$) at S54, and moves the thermal head 23 so that printing starts from (X1+$\alpha$) at S58.

In the second embodiment, $\beta$ is a length corresponding to 0.5 dot and $\alpha$ is zero.

Figure 12:
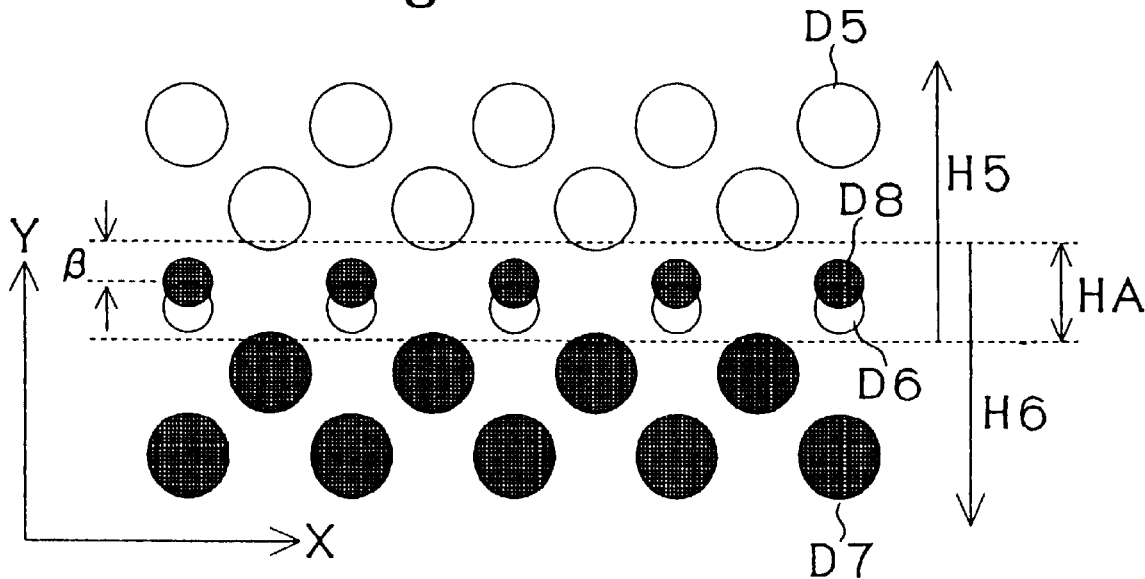
FIG. 12A is a partially exploded diagram illustrating a dot pattern in an overlap area in a second embodiment.
FIG. 12B is a diagram illustrating the result of a simulation performed using the dot pattern of FIG. 12A.
Figure 12:
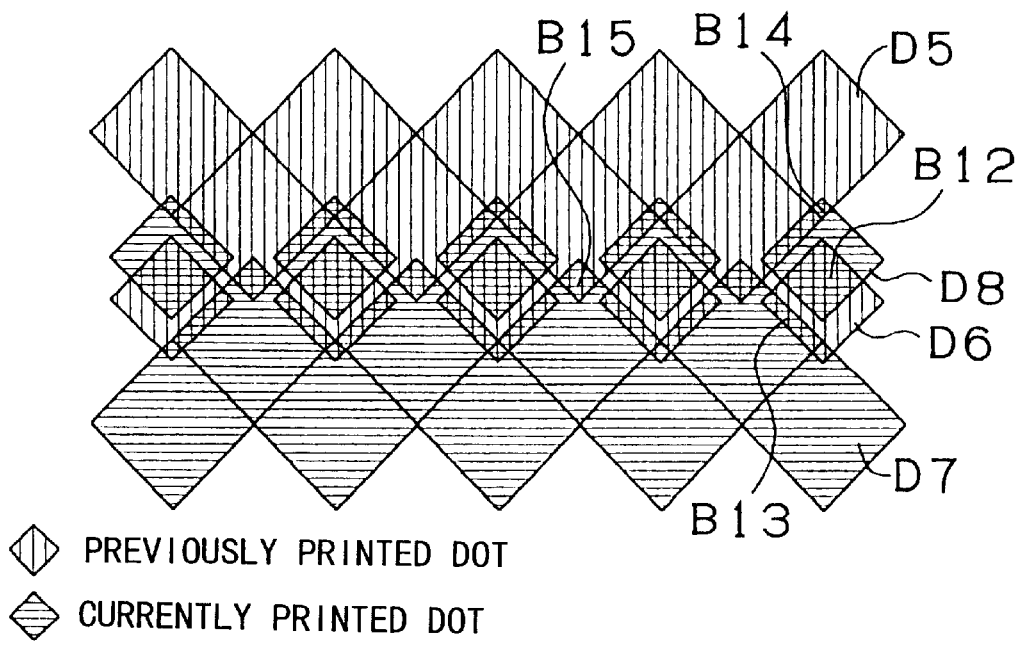

FIG. 12A is a partially exploded diagram illustrating a dot pattern in the overlap area HA, where print areas H5 and H6 overlap with each other. FIG. 12B is a diagram illustrating the result of a simulation performed using the dot pattern shown in FIG. 12A.

As shown in FIG. 12B, high-density overlap portions B12, B13, B14, and B15, where dots D6 and D8, dots D6 and D7, dots D5 and D8, dots D5 and D7 overlap with each other, respectively, are formed in the overlap area HA. Since the overlap portions B12, B13, B14, and B15 are generally identical in area, smaller in area than dots D5 and D7, and formed alternately in the directions of a column and a row, they are not likely to stand out.

Figure 13A:
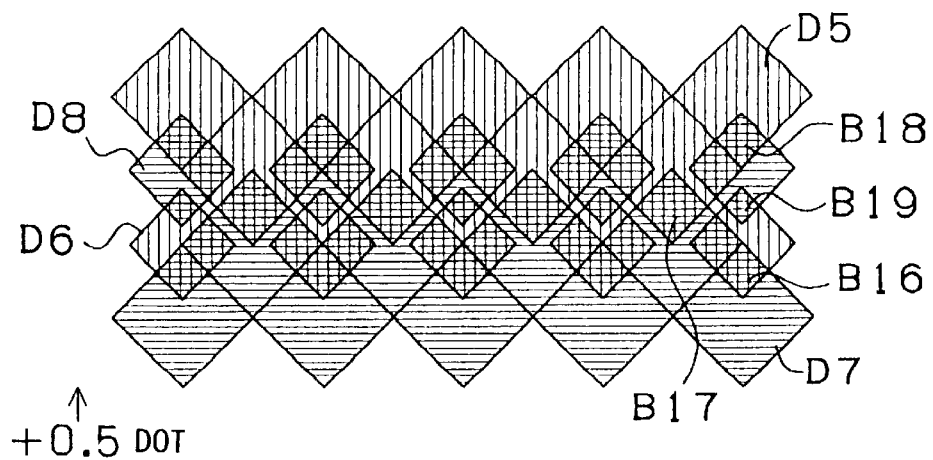
FIG. 13A is a diagram illustrating the result of simulating a case in the second embodiment where dots D8 are printed while being shifted by 0.5 dot in the +Y direction.
Figure 13B:
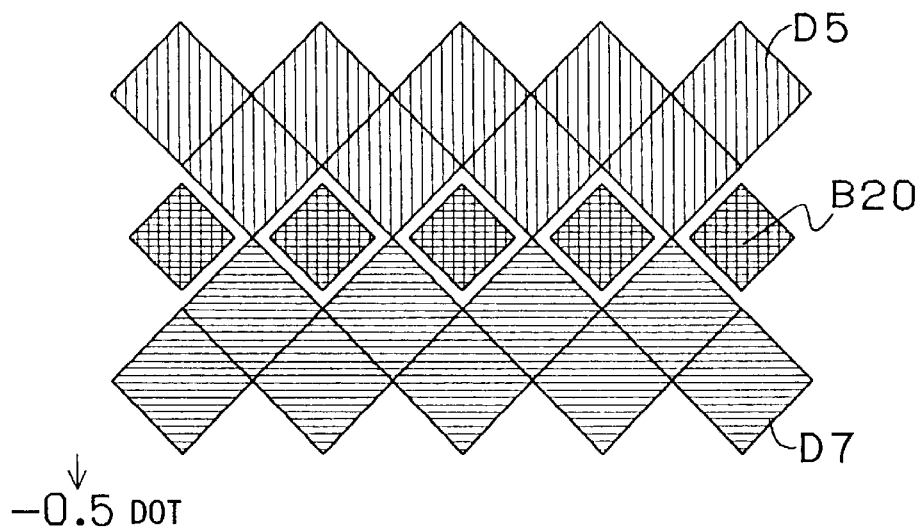
FIG. 13B is a diagram illustrating the result of simulating a case where dots D8 are printed while being shifted by 0.5 dot in the −Y direction.
Figure 13C:
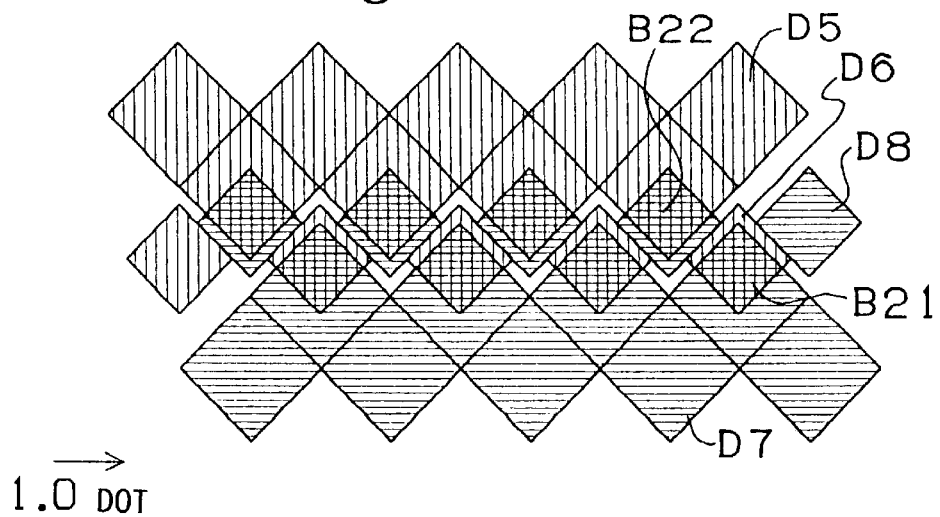
FIG. 13C is a diagram illustrating the result of simulating a case where dots D8 are shifted by 1.0 dot in the +X direction.

Referring now to FIGS. 13A, 13B, and 13C, illustrated therein are cases where dots D8 are printed slightly out of position in the overlap area HA.

FIG. 13A is a diagram illustrating the result of simulating a case where dots D8 are printed while being shifted by 0.5 dot in the +Y direction. In this case, as shown in FIG. 13A, high-density overlap portions B16, B17, B18, and B19, where dots D6 and D7, dots D5 and D7, dots D5 and D8, and dots D6 and D8 overlap with each other, respectively, are formed.

However, since the overlap portions B16, B17, B18, and B19 are small in area, they are not likely to stand out.

FIG. 13B is a diagram illustrating the result of simulating a case where dots D8 are printed while being shifted by 0.5 dot in the –Y direction. In this case, as shown in FIG. 13B, overlap portions B20, where dots D6 and D8 overlap with each other, are formed. However, since the overlap portions B20 are smaller in area than other dots D5 and D7, and formed uniformly in the row direction, they are not likely to stand out.

FIG. 13C is a diagram illustrating the result of simulating a case where dots D8 are shifted by 1.0 dot in the +X direction. In this case, as shown in FIG. 13C, overlap portions B21 and B22, where dots D6 and D7, and dots D5 and D8 overlap with each other, respectively, are formed. However, since the overlap portions B21 and B22 are smaller in area than other dots D5 and D7, and formed uniformly in the directions of a column and a row, they are not likely to stand out.

As described above, print quality of the overlap area HA between the print areas H5 and H6 can be improved by shifting, prior to printing, dots D8, which are smaller in area than dots D5 printed in the print area H5, by 0.5 dot in the column direction (+Y direction) from dots D6 formed at the lowermost end of the print area H5.

In particular, even if the print starting position for printing on the print area H5 and that for printing on the print area H6 are shifted from the respective proper positions, print quality is not noticeably affected.

A third embodiment of a tape printer 10 of this invention is described such that, when printing is repeated over the previously printed area, the print starting position is moved both in the directions of a column (+Y direction) and a row (+X direction).

The third embodiment is the same as the first embodiment except for values $\alpha$ and $\beta$, which are shown at S58 and S54, respectively.

In the flowchart shown in FIG. 8A, when the CPU 63 determines that the print buffer 69d stores image data used for printing the overlap area HA (S52: Yes), it feeds the tape T2 by a length of (Y1–$\beta$) at S54, and moves the thermal head 23 so that printing starts from (X1+$\alpha$) at S58.

In the third embodiment, $\alpha$ is a length corresponding to 0.5 dot and a is a length corresponding to 1.0 dot.

Figure 14A:
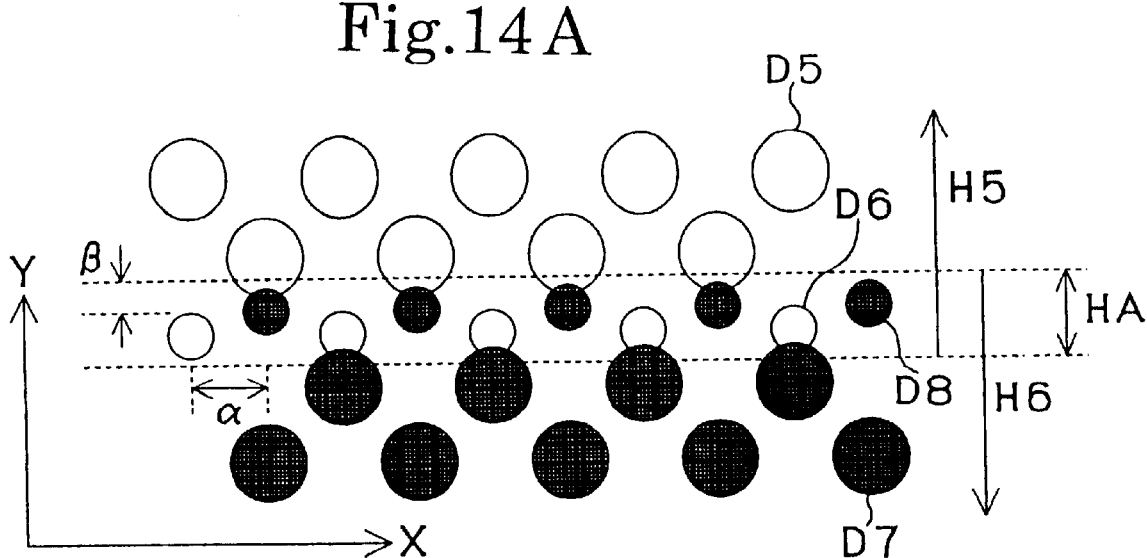
FIG. 14A is a partially exploded diagram illustrating a dot pattern in an overlap area in a third embodiment.
Figure 14B:
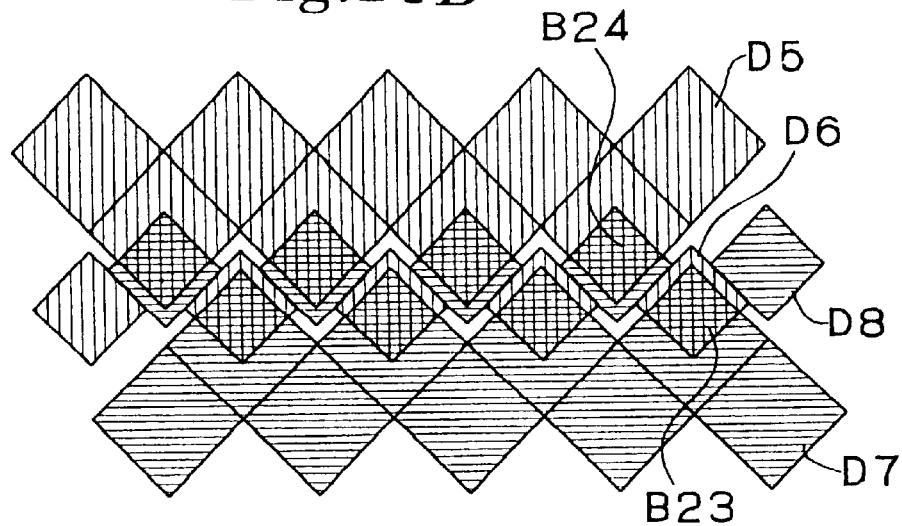
FIG. 14B is a diagram illustrating the result of a simulation performed using the dot pattern of FIG. 14A.

FIG. 14A is a partially exploded diagram illustrating a dot pattern in the overlap area HA, where, according to the above-mentioned control, the lower end of print area H5 and the upper end of print area H6 overlap with each other. FIG. 14B is a diagram illustrating the result of a simulation performed using the dot pattern shown in FIG. 14A.

As shown in FIG. 14B, high-density overlap portions B23 and B24, where dots D6 and D7, and dots D5 and D8, overlap with each other, respectively, are formed in the overlap area HA. However, since the overlap portions B23 and B24 are identical in area and formed alternately in the row direction, they are not likely to stand out.

Figure 15A:
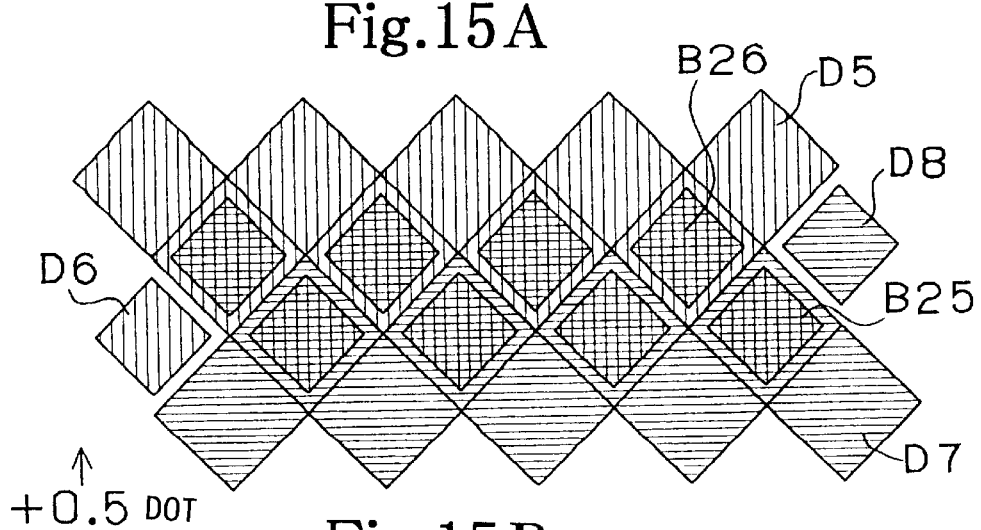
FIG. 15A is a diagram illustrating the result of simulating a case in the third embodiment where dots D8 are printed while being shifted by 0.5 dot in the +Y direction.
Figure 15B:
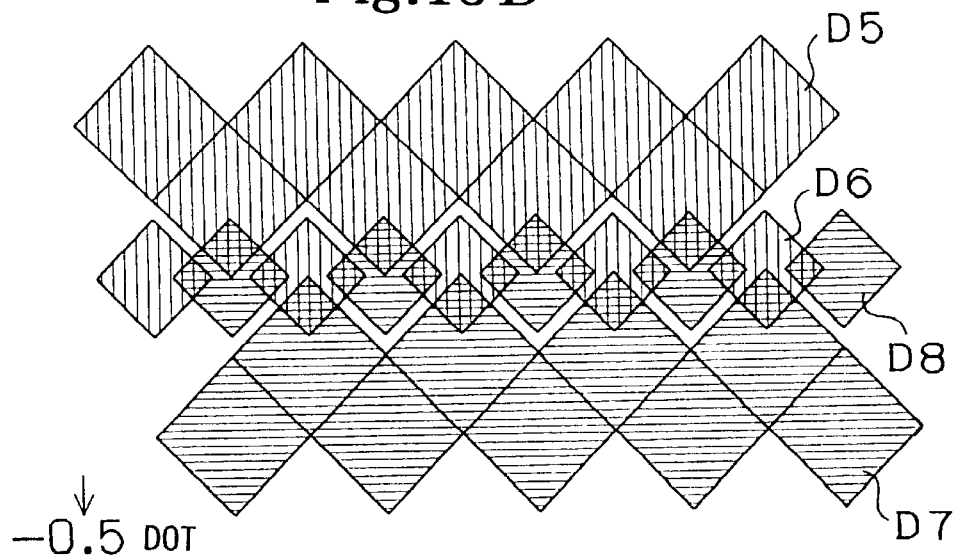
FIG. 15B is a diagram illustrating the result of simulating a case where dots D8 are printed while being shifted by 0.5 dot in the −Y direction.
Figure 15C:
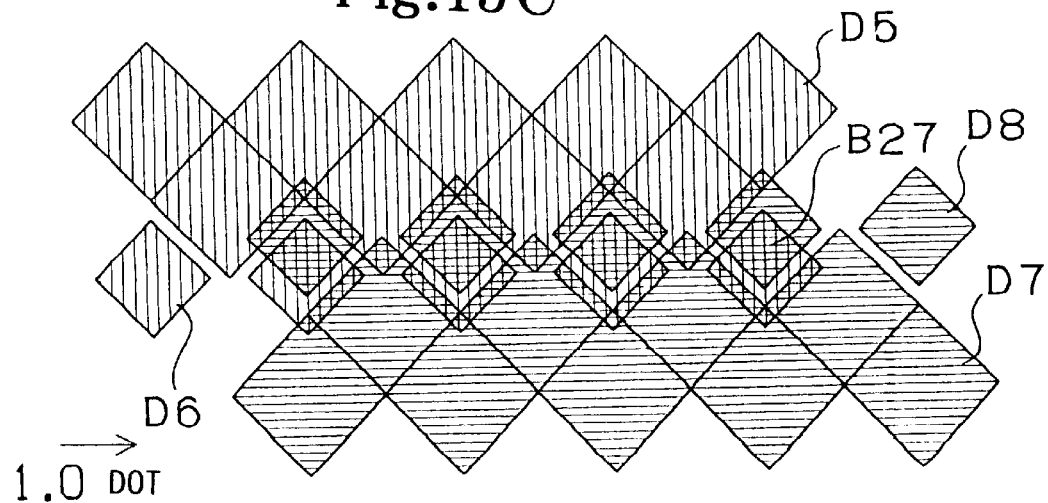
FIG. 15C is a diagram illustrating the result of simulating a case where dots D8 are printed while being shifted by 1.0 dot in the +X direction.

Referring now to FIGS. 15A, 15B, and 15C, illustrated therein are cases where dots D8 are printed slightly out of position in the overlap area HA.

FIG. 15A is a diagram illustrating the result of simulating a case where dots D8 are printed while being shifted by 0.5 dot in the +Y direction. As shown in FIG. 15A, when dots D8 are printed while being shifted by 0.5 dot in the tape feed direction, high-density overlap portions B25 and B26, where dots D6 and D7, and dots D5 and D8 overlap with each other, respectively, are formed.

However, since the overlap portions B25 and B26 are generally identical in area and formed alternately in the row direction, they are not likely to stand out.

FIG. 15B is a diagram illustrating the result of simulating a case where dots D8 are printed while being shifted by 0.5 dot in the –Y direction. As shown in FIG. 15B, when dots D8 are printed while being shifted by 0.5 dot in the direction opposite to the tape feed direction, dots rarely overlap with each other, and the overlap area HA is not likely to stand out.

FIG. 15C is a diagram illustrating the result of simulating a case where dots D8 are printed while being shifted by 1.0 dot in the +X direction. As shown in FIG. 1 SC, when dots D8 are printed while being shifted by 1.0 dot in the printing direction, overlap portions B27, where dots D6 and D8 overlap with each other, respectively, are formed. However, since the overlap portions B27 are smaller in area than other dots D5 and D7 and arranged uniformly in the row direction, they are not likely to stand out.

As described above, print quality of the overlap area HA between the print areas H5 and H6 can be improved by shifting, prior to printing, dots D8, which are smaller in area than dots D5 printed in the print area H5, by 0.5 dot in the column direction (+Y direction) and by 1.0 dot in the row direction (+X direction) from dots D6 formed at the lowermost end of the print area H5.

In particular, if the print starting position for printing on the print area H5 and that for printing on the print area H6 are shifted from the respective proper positions, print quality is not noticeably affected.

Print quality of the overlap area HA can be improved using any one of the tape printers 10 of the first, second, and third embodiments. Among them, according to the results of simulations, the tape printer 10 of the third embodiment achieves the highest print quality.

Discussed below is the print quality obtained when control described in the first, second, or third embodiment is not provided.

Figure 18A:
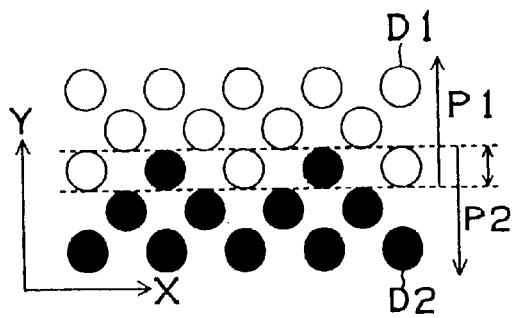
FIG. 18A is diagram showing a dot pattern printed in a border portion between print areas by a plurality of heating elements constituting the thermal head.

FIG. 18A shows a dot pattern printed in the vicinity of an overlap area PA by a plurality of heating elements that constitute the thermal head. In the overlap area PA, where a print area P2 overlaps with a previously printed print area P1, dots D1 forming the print area P1 are identical in size with dots D2 forming the print area P2. Dots identical in size with dots D1 and D2 printed also in the overlap area P2. X shows the thermal head scanning direction, while Y shows the paper feed direction.

Figure 18B:
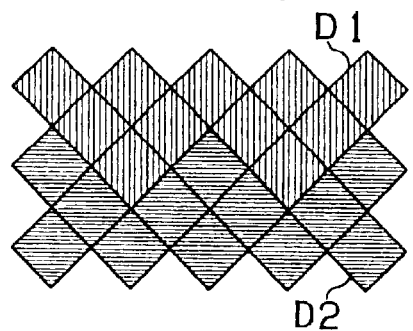
FIG. 18B is a diagram illustrating a case where print areas P1 and P2 are not shifted from each other.

FIGS. 18B–18E are diagrams illustrating the overlap area PA and showing the results of simulations, where the print area corresponds to the area of dots. FIG. 18B shows a case where the print areas P1 and P2 are not shifted from each other.

Figure 18C:
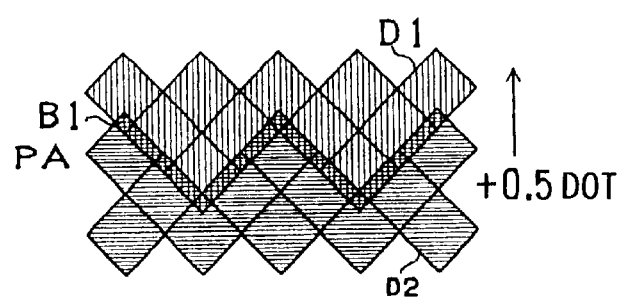
FIG. 18C is a diagram illustrating a case where a print area P2 is shifted erroneously by 0.5 dot in the +Y direction.

FIG. 18C shows a case where tape feed is insufficient and the print area P2 is shifted erroneously by 0.5 dot in the +Y direction. In this case, the print area P2 overlaps with the print area P1, producing high-density overlap portions which form a black streak B1.

Figure 18D:
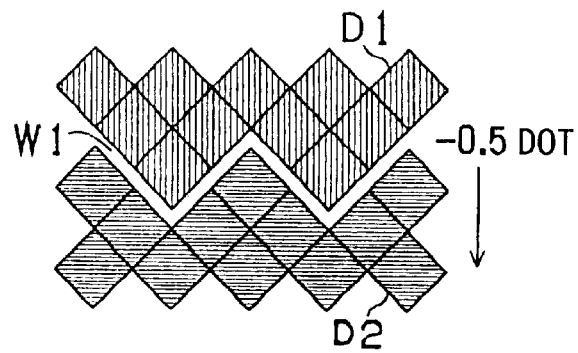
FIG. 18D is a diagram illustrating a case where a print area P2 is shifted by 0.5 dot in the −Y direction.

FIG. 18D shows a case where tape feed is excessive and the print area P2 is shifted by 0.5 dot in the −Y direction. In this case, a clearance produced between the print areas P1 and P2 appears as a white streak W1.

Figure 18E:
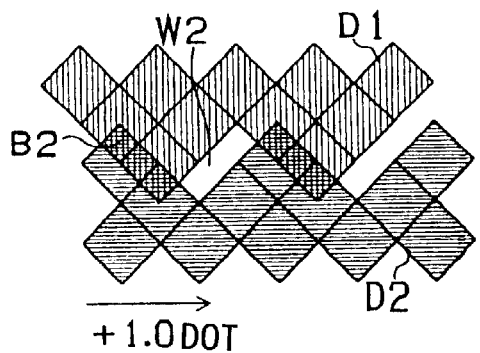
FIG. 18E is a diagram illustrating a case where the print starting position is shifted by 1.0 dot in the +X direction.

FIG. 18E shows a case where the print starting position is shifted erroneously by 1.0 dot in the +X direction. In this case, paper surface-exposed portions W2 and high-density overlap portions B2, where dots D1 and D2 overlap with each other, are formed. As a result, white streaks W2 and the overlap portions B2 are alternately formed.

Thus, erroneous shifting of the next print area produces white streaks W1 or black streaks B1, resulting in deterioration of print quality of the overlap area PA between the print areas.

In contrast, using a technique of the first, second, or third embodiment, high print quality can be maintained even at the event of erroneous shifting.

Figure 19A:
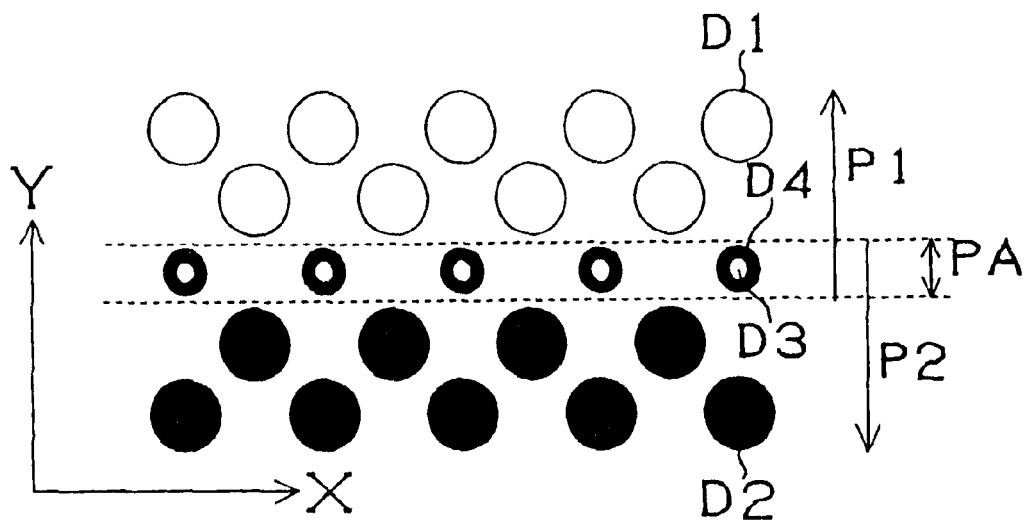
FIG. 19A is a diagram illustrating a dot pattern in a border portion between print areas.

FIG. 19A shows a case where, in the overlap area PA where the uppermost end of the print area P2 overlaps with the lowermost end of the print area P1, dots D4 belonging to the print area P2 are smaller than dots D3 belonging to the print area P1.

Figure 19B:
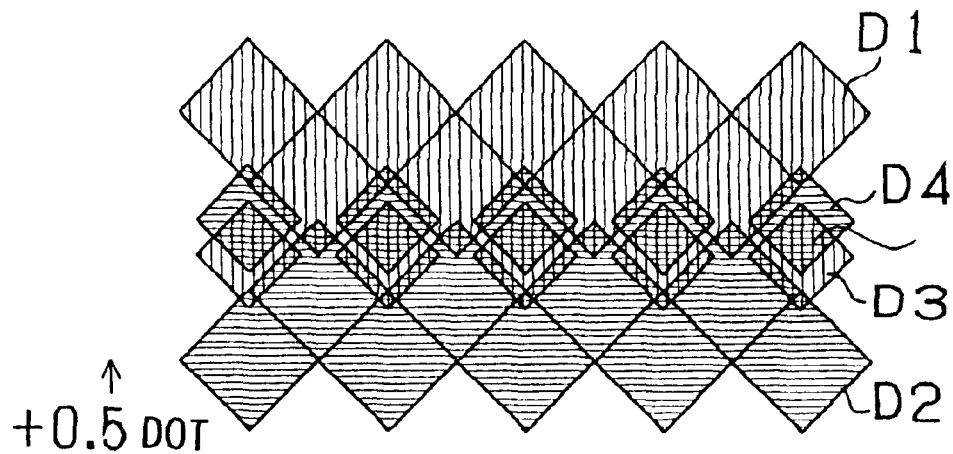
FIG. 19B is a diagram illustrating a case where a print area P2 is shifted by 0.5 dot in the +Y direction.

FIG. 19B shows a case where tape feed is insufficient and the print area P2 is shifted by 0.5 dot in the +Y direction. In this case, since many high-density large overlap portions B3, where dots D3 and D4 overlap with each other, are formed, the overlap area PA stand out.

Figure 19C:
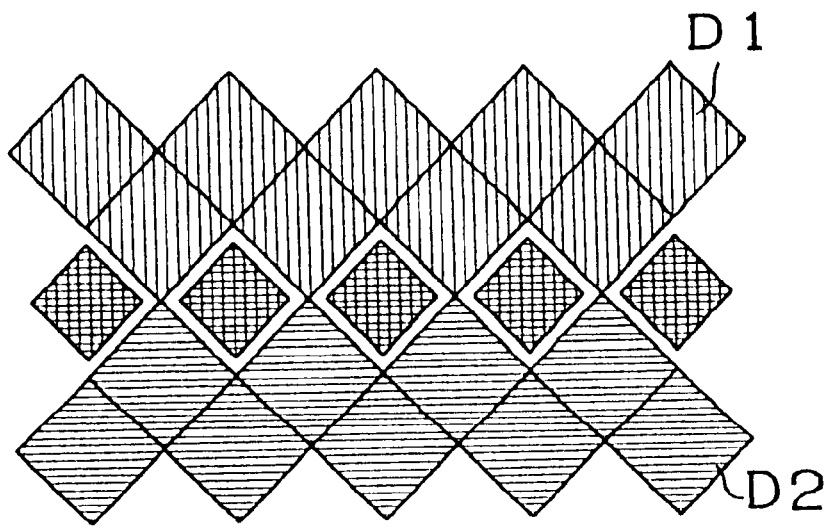
FIG. 19C is a diagram illustrating a case where print areas P1 and P2 are not shifted from each other.

FIG. 19C shows a case where the print areas P1 and P2 are not shifted from each other. In this case, since dots 4 are printed exactly over dots D3, the overlap portions are dense and stand out considerably.

Figure 19D:
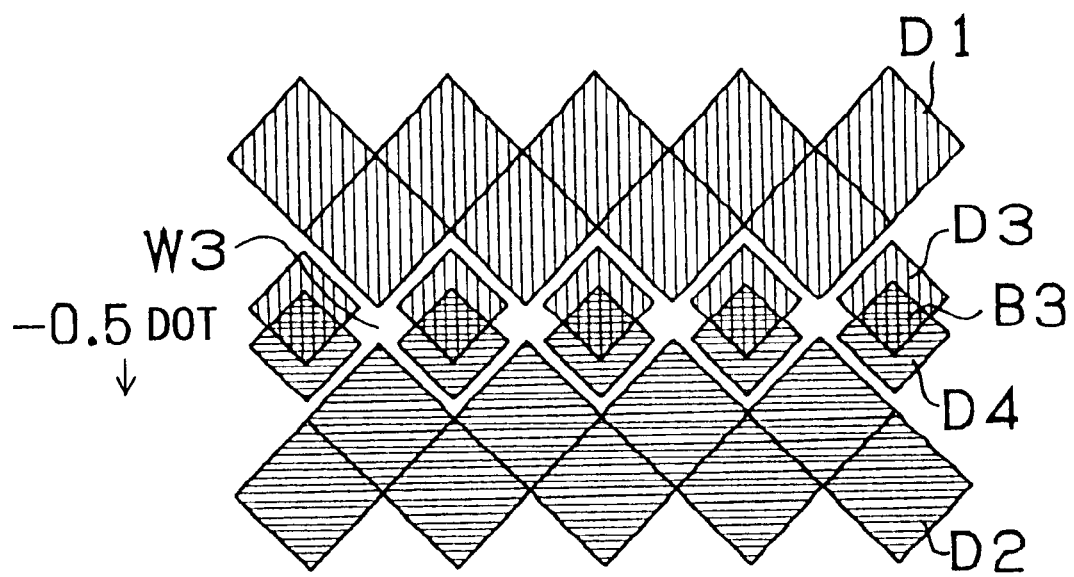
FIG. 19D is a diagram illustrating a case where a print area P2 is shifted by 0.5 dot in the −Y direction.

FIG. 19D shows a case where tape feed is excessive and the print area P2 is shifted by 0.5 dot in the −Y direction. In this case, many high-density large overlap portions B3, where dots D3 and D4 overlap with each other are formed, and relatively large paper surface-exposed portions W3 are formed every other dot.

As described above, erroneous shifting of the print area P2 produces paper surface-exposed portions W3 and high-density overlap portions B3–B5, resulting in deterioration of print quality of the overlap area PA between the print areas.

FIG. 17 is a graph showing the relationship between the area ratio and the lightness L* of dots printed in a border portion between print areas. The area ratio corresponds to the dot size, i.e., the tone level. As the lightness L* increases, a printed dot becomes whitish, and as it decreases, a printed dot becomes blackish.

Figures 16A, 16B:
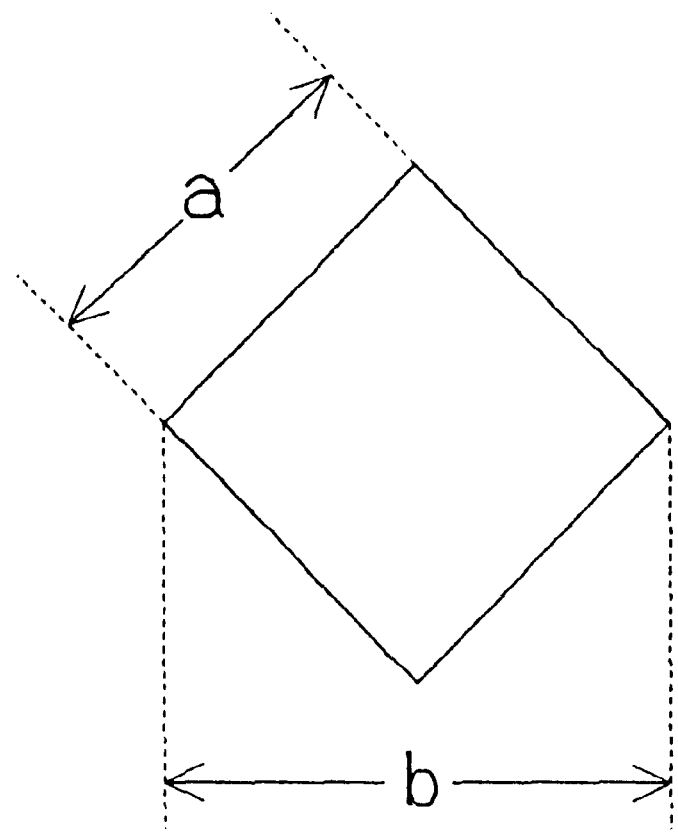
FIG. 16A is a diagram illustrating the area per dot.
FIG. 16B is a table showing the relationship between the area and lengths a and b shown in FIG. 16A.

FIG. 16A is a diagram illustrating the area per dot. FIG. 16B is a table showing the relationship between the area and lengths a and b shown in FIG. 16A.

As shown in FIG. 16B, it is assumed that the area is 100% when length a is 133 $\mu$m and length b is 185 $\mu$m. The area is 50% when length a is 94 $\mu$m and length b is 133 $\mu$m.

In FIG. 17, a solid line A shows the relationship between the area ratio and the lightness L* of dots printed in a print area except for the overlap area HA. A short dashed line B shows the same relationship in the case shown in FIG. 14B. A long dashed line C shows the same relationship in the case shown in FIG. 1A. An alternate long and short dashed line D shows the same relationship in the case shown in FIG. 15B.

Figure 20:
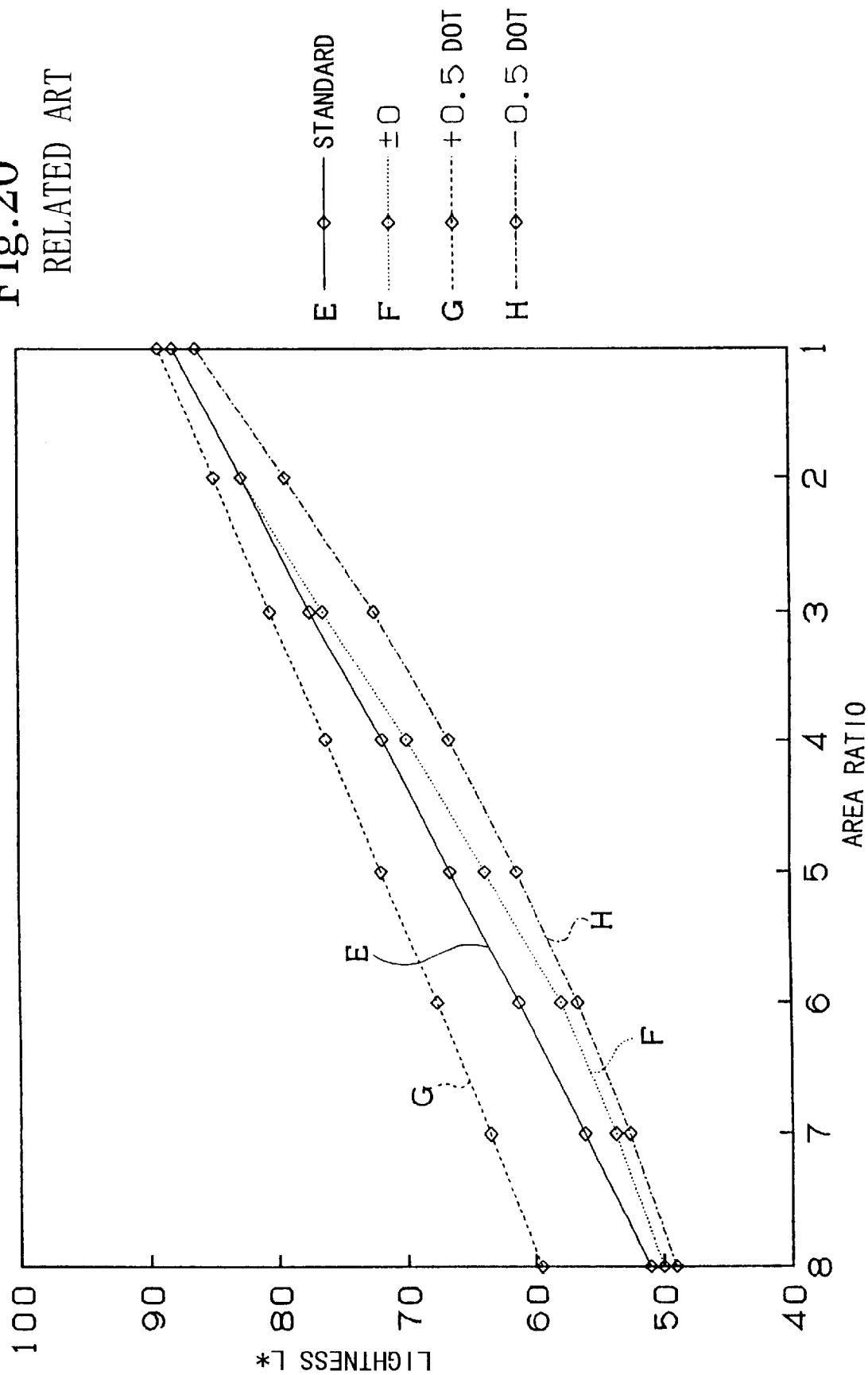
FIG. 20 is a graph showing the relationship between the area ratio and the lightness L* of dots printed in a border portion between print areas in cases of FIGS. 19A–19D.

FIG. 20 is a graph showing the relationship between the area ratio and the lightness L* of dots printed using the related art shown in FIGS. 19B, 19C, and 19D.

In FIG. 20, a solid line E shows the relationship between the area ratio and the lightness L* of dots printed in a print area except for the overlap area PA. A short dashed line F shows the same relationship in the case shown in FIG. 19C. A long dashed line G shows the same relationship in the case shown in FIG. 19B. An alternate long and short dashed line H shows the same relationship in the case shown in FIG. 19D.

In FIGS. 17 and 20, a given measurement value deviates from the standard line A or E in the + direction, the corresponding portion becomes whitish, and on the contrary, when a given measurement value deviates from the standard line A or E in the − direction, the corresponding portion becomes blackish.

If comparisons are made between FIGS. 17 and 20, the lines B–D deviate greatly from the standard line A in FIG. 17, while the lines F–H deviated less greatly from the standard line E in FIG. 20.

Thus, even if the print position is erroneously shifted vertically by 0.5 dot when printing is repeated over the previously printed area, the overlap area produced by the tape printer 10 of the third embodiment is less likely to become whitish or blackish than that produced using the related art shown in FIG. 20.

Accordingly, print quality of the overlap area can be improved by using the tape printer 10 of the third embodiment.

In the aforementioned embodiments, the overlap area HA is printed using the pulse table 64b in FIG. 6B. For color printing, the pulse tables 65a, 65b, and 65c should be used, instead.

By doing so, variations in the intensity of each color in the overlap area HA can be reduced, and print quality of the overlap area HA printed in color can be improved.

White/black streaks and overlap portions produced by a shift of the print position when printing is repeated over the previously printed area changes depending on the amount of a shift. Thus, if two kinds of dots D6 and D8, which are different in area, are used for printing on the overlap area HA, such streaks and overlap portions may be produced less than when dots D6 and D8 are identical in area.

To accomplish this, at least two kinds of pulse tables used for printing on the overlap area should be stored in the memory within the CPU 63. Also a step for the CPU 63 to determine if the dot to be printed is the (2n+1)th dot or (2n)th dot (n: natural number) should be provided after S36: Yes in FIG. 8A. If the CPU 63 is designed to read the number of pulses from the pulse table selected according to its determination, two kinds of dots D6 and D8 are printed on the overlap area HA, resulting in an improvement in print quality.

In a fourth embodiment of a tape printer 10 of this invention, print quality of an overlap area can be improved regardless of the color used for printing.

As the structure of the tape printer 10 is the same as that shown in FIGS. 1–6, a description of the structure will be omitted.

Referring now to FIGS. 7, 8B, 9, and 21, the sequence of operation of the tape printer 10 will be described below.

Figure 8B:
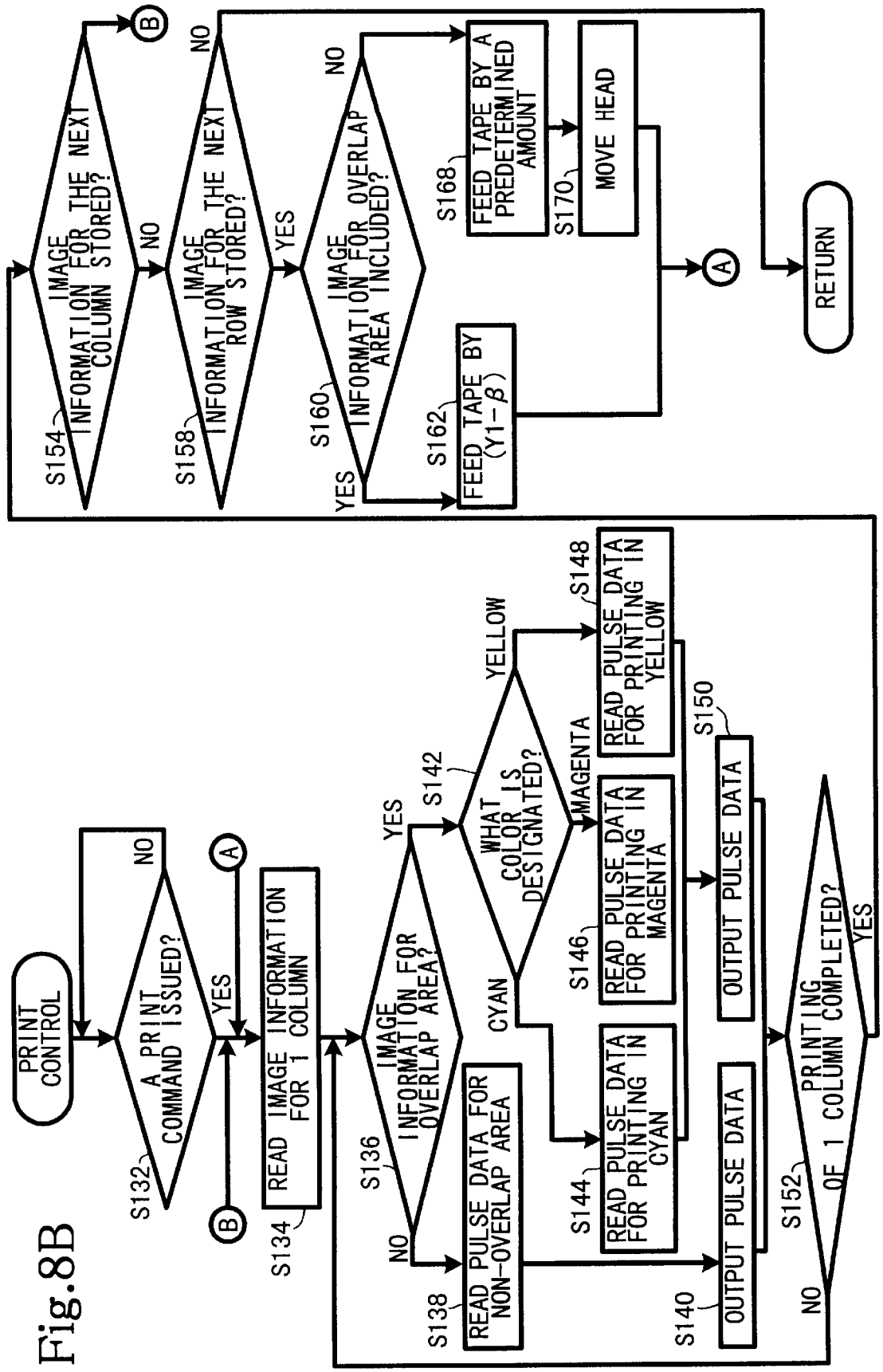
Figure 21A:
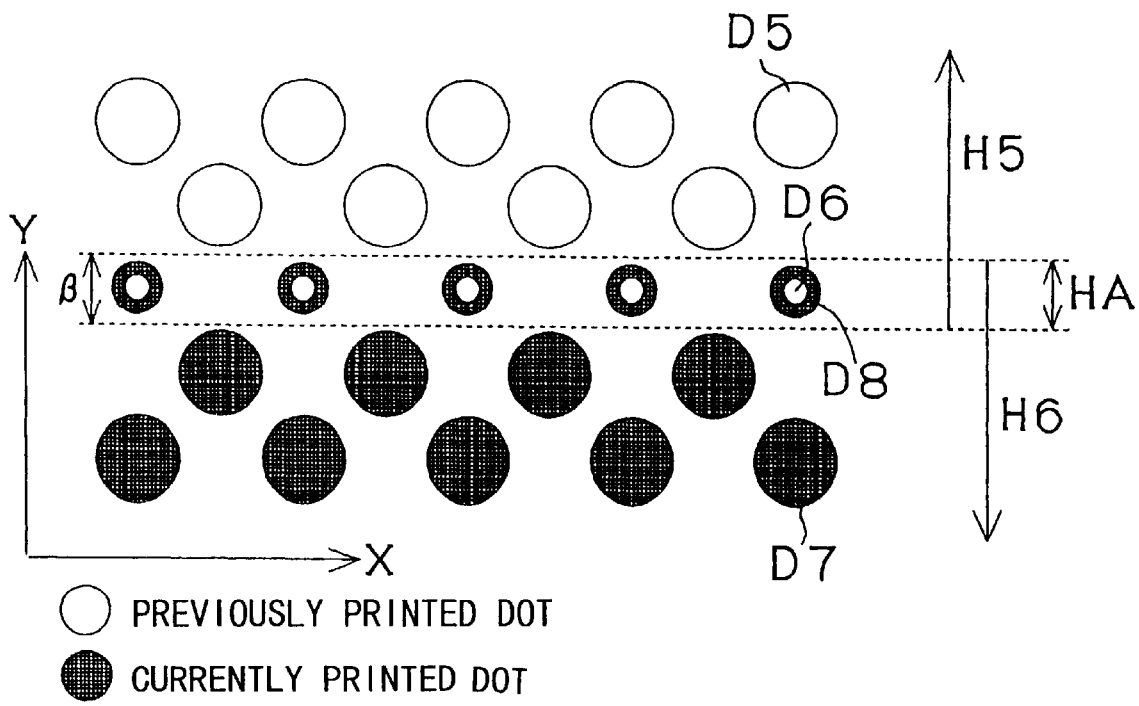
FIG. 21A is a partially exploded diagram illustrating a dot pattern in an overlap area obtained in a fourth embodiment.
Figure 21B:
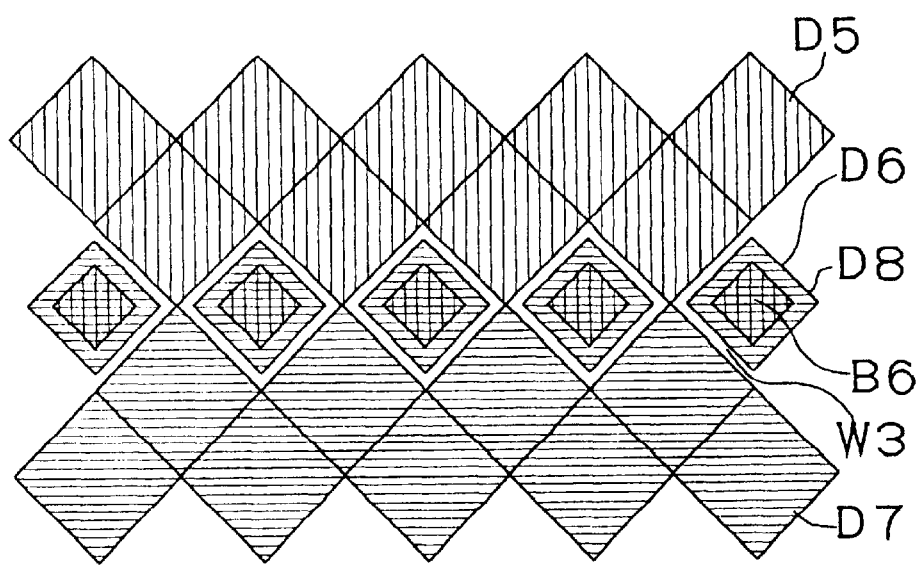
FIG. 21B is a diagram illustrating the result of a simulation performed using the dot pattern of FIG. 10A.

FIG. 7 is a flowchart outlining a control routine executed by the CPU 63. FIG. 8B is a flowchart showing a print control routine executed at step 30 of FIG. 7. FIG. 9 is a diagram illustrating characters to be printed on the tape T2 and a printing sequence. FIG. 21A is a partially exploded diagram illustrating a dot pattern in the overlap area HA, where print areas H5 and H6 in FIG. 9 overlap with each other. FIG. 21B is a diagram illustrating the result of a simulation performed using the dot pattern shown in FIG. 10A.

Described herein is a case where characters shown in FIG. 9 are printed in color on the tape T2 by the wide station WS. It is noted that printing on a single print area is accomplished by a single scan of the thermal head 23 in the row direction.

Referring to FIG. 7, the operation of the tape printer 10 will be outlined. First, when an operator turns on the power switch of the tape printer 10, the CPU 63 performs initialization (S10). Then, the CPU 63 executes display control for displaying on the LCD 16 characters and symbols entered from the keyboard 14 (S20), and executes print control for driving the thermal head 23 and various motors based on the dot pattern data for printing, which is associated with the entered characters and symbols (S30).

Referring now to FIG. 8B, a control routine executed by the CPU 63 will be described.

When the CPU 63 detects that a print command is issued through keyboard operations (S132: Yes), image information used for printing the first column of the print area H1 is read from the print buffer 69d in the RAM 69 (S134).

Then, the CPU 63 determines if each piece of image information is the one used for printing on the overlap area (S 136). Specifically, the CPU 63 determines if each piece of image information is the one to be output to the heating element R256 disposed at the uppermost or lowermost end of the thermal head 23.

In this embodiment, wherein a large character is printed by being divided into a plurality of areas, border portions are printed using the heating elements disposed at the uppermost and lowermost positions. A piece of image information to be output to such a heating element is determined to be the data used for printing on the overlap area HA.

When the CPU 63 determines that a piece of image information is not the one used for printing on the overlap area HA (S136: No), the CPU 63 reads, from the pulse table 64a stored in the pulse memory 64 within the CPU 63, pulse data corresponding to the tone level specified by the tone data contained in the piece of image information (S138).

For example, when the tone level is "8", the CPU 63 reads "47", as the pulse data, as shown in FIG. 6A.

Then, the CPU 63 outputs the read pulse data to the head drive circuit 57 (S140), which in turn outputs, according to the received pulse data, a drive signal in terms of the number of pulses to the applicable heating element of the thermal head 23.

When the CPU 63 determines that a piece of image information is the one used for printing on the overlap area HA (S136: Yes), the CPU 63 determines what color is designated for printing (S142).

Specifically, the CPU 63 determines what color is detected by the ink ribbon sensor 39. For example, this is accomplished as follows: The result of the detection by the ink ribbon sensor 39 is stored as a flag indicating a particular color in a memory within the CPU 63 or the RAM 69, and the CPU 63 determines the color based on the stored flag.

When the designated color is cyan (S142: cyan), the CPU 63 reads, from the pulse table used for printing in cyan 65a (FIG. 6C), the pulse data corresponding to the tone level specified by the piece of image information (S144), and outputs the read pulse data to the head drive circuit 57 (S150). When the tone level is "8", the CPU 63 reads "22" as the pulse data from the pulse table used for printing in cyan 65a.

When the designated color is magenta (S142: magenta), the CPU 63 reads, from the pulse table used for printing in magenta 65b (FIG. 6D), the pulse data corresponding to the tone level specified by the piece of image information (S146), and outputs the read pulse data to the head drive circuit 57 (S150). When the tone level is "8", the CPU 63 reads "21" as the pulse data from the pulse table used for printing in magenta 65b.

When the designated color is yellow (S142: yellow), the CPU 63 reads, from the pulse table used for printing in yellow 65c (FIG. 6E), the pulse data corresponding to the tone level specified by the piece of image information (S148), and outputs the read pulse data to the head drive circuit 57 (S150). When the tone level is "8", the CPU 63 reads "26" as the pulse data from the pulse table used for printing in yellow 65c. Then, the head drive circuit 57 outputs, upon receipt of the pulse data, a drive signal in terms of the number of pulses specified by the pulse data to the applicable heating element. The heating elements generate heat. Then, ink applied to the ink ribbon IR is melted and transferred to the tape T2. Thus, printing is accomplished in a pattern of dots on the tape T2. At this time, as the number of pulses becomes greater, the heating element generates higher heat, and dots being larger in area are printed.

The CPU 63 repeats S136 to S150 until it determines, at S152, that printing of one column is completed. After the CPU 63 determines in the affirmative at S152, it determines if the print buffer 69*d* stores image information used for printing the next column (S154).

Then, the CPU 63 repeats S134 to S152 to continue printing in the row direction, i.e., in the X-axis direction until it determines, at S154, that the print buffer 69*d* stores no image information for the next column. If the CPU 63 determines in the negative at S154, it then determines if the print buffer 69*d* stores image information used for printing the next row (S158). If the CPU 63 determines in the affirmative at S158, it determines if the image information for the next row includes image information used for printing on the overlap area (S160). Specifically, the CPU 63 determines if the image information for the next row includes image information to be output to the heating element R1 disposed at the uppermost end of the thermal head 23.

When the CPU determines that the image information for the next row includes image information used for printing on the overlap area (S160: Yes), it feeds the tape T2 by a length of (Y1–β) at S162. Y1 is the maximum width (in the row direction) printable by the thermal head 23, and β is an amount overlapping the previously printed area. In the fourth embodiment, β is a length corresponding to 1.0 dot.

Then, the CPU 63 jumps to S134, and repeats S134 to S152 to perform printing on the print area H6 until it determines, at S154, that the print buffer 69d stores no image information used for printing the next column.

If the CPU 63 determines, at S160, that the image information for the next row includes no image data used for printing on the overlap area HA (S160: No), it feeds the tape T2 by a predetermined amount (S168) and moves the thermal head 23 to its initial print starting position (S170).

When printing is all done, the tape T2 is fed to be discharged (S168), and the thermal head 23 is returned to its initial position (S170).

As described above, the CPU 63 performs printing on the print areas H1–H6 and, as a result, a character string is printed on the tape T2 as shown in FIG. 9.

Referring now to FIGS. 21A and 21B, the overlap area HA, where the print areas H5 and H6 overlap with each other, will be described.

As shown in FIG. 21A, the print area H6 overlaps with the previously printed print area H5 by β (1.0 dot) in the column direction (+Y direction). In the print are H5, dots D6 forming the overlap area HA are smaller in area than dots D5 forming the non-overlap area.

In the print area H6, dots D8 forming the overlap area HA are smaller in area than dots D7 forming the non-overlap area, and larger in area than dots D6. The center of each dot D8 lies right over the center of each dot D6, and dots D8 and D6 are printed while overlapping with each other.

As shown in FIG. 21B, high-density overlap portions B6, where dots D6 and D7 overlap with each other, are formed in the overlap area HA. These overlap portions B6 are surrounded by white portions W3. A mixture of colors occurs in the overlap area HA, and, as a result, the overlap area HA appears to have the same color as the color of dots D5 and D7, and is not likely to stand out. Furthermore, since dots D6 and D8 are different in area, the white portions W3 and the overlap portions B6 are dispersed into the non-overlap portions of D8, and the overlap area HA is less likely to stand out.

The intensity of the overlap portions B6 varies depending on the color. However, in the tape printer 10 of this embodiment, the number of pulses, which is applied to each of the heating elements used for printing dots D6 and D8, is set for each color. Thus, variations in the intensity can be reduced.

As described above, when printing is done in various colors, print quality of the overlap area HA can be improved by using the tape printer 10 of the fourth embodiment.

Whereas, in the fourth embodiment, the tape printer 10 is controlled to print dots D8 over the previously printed dots D6, it may be controlled to print dots D8 between dots D6 alternately.

Figure 22A:
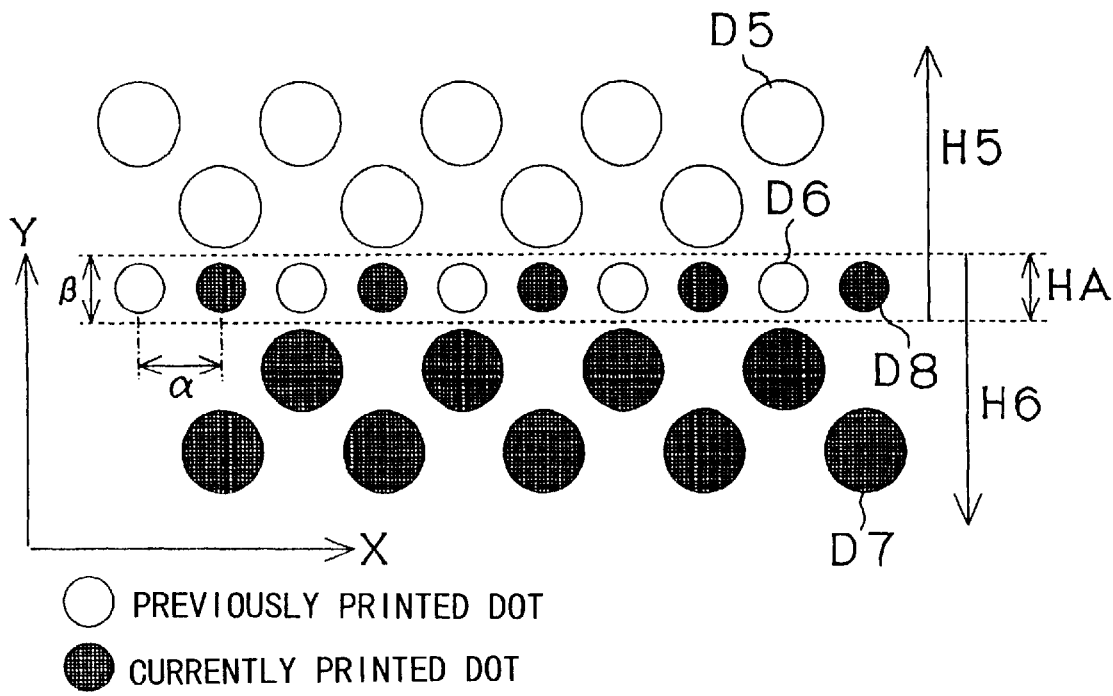
FIG. 22A is a diagram illustrating a dot pattern in an overlap area obtained in a modification of the forth embodiment, where dots D8 are printed alternately between dots D6.
Figure 22B:
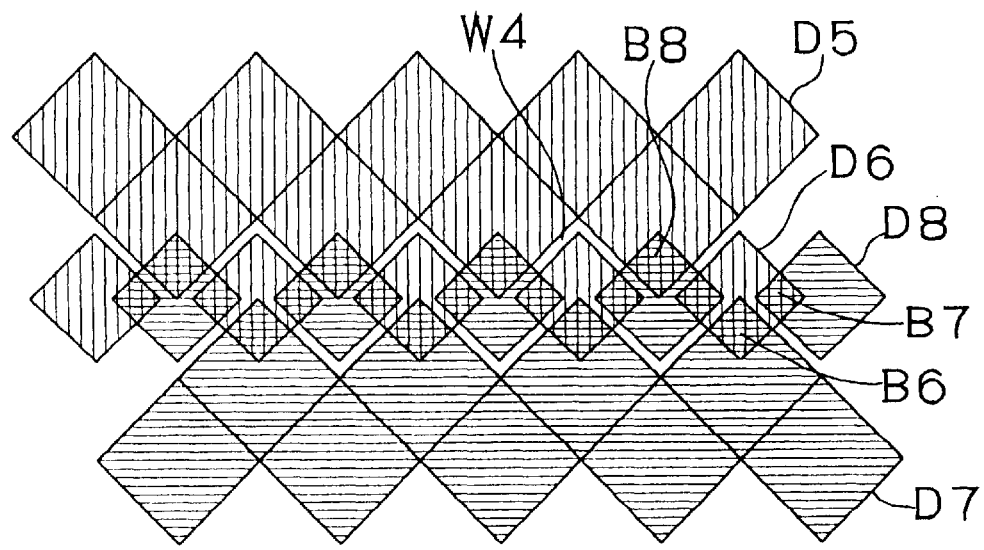
FIG. 22B is a diagram illustrating the result of a simulation performed using the dot pattern of FIG. 22A.

FIG. 22A is a diagram illustrating a dot pattern in the overlap area HA printed using such control. FIG. 22B is a diagram illustrating the result of a simulation performed using the dot pattern shown in FIG. 22A.

In this case, a step for moving the thermal head by (X1 +α) should be inserted after S162 so that the carriage is moved to set the thermal head 23 at a print starting position of (X1 +α). X1 shows the initial print starting position at which the print head 23 is set when the image information for the next row includes no image information used for printing on the overlap area HA, and α is an amount by which the thermal head 23 is moved in the row direction (+X direction).

As shown in FIG. 22B, high-density overlap portions B6, B7, and B8, where dots D6 and D7, dots D6 and D8, and dots D5 and D8 overlap with each other, respectively, as well as white portions, which are not affected by any dots, are formed in the overlap area HA. A mixture of colors occurs in the overlap area HA, and, as a result, the overlap area HA appears to have the same color as dots D5 and D7, and is not likely to stand out. Furthermore, in this embodiment, since dots D8 are alternately printed between dots D6, the overlap portions B6, B7, and B8 and the white portions W4 become small in area, and the overlap area HA is less likely to stand out.

When the tape printer 10 is controlled in this manner, the number of pulses applied to each of the heating elements is set for each color. Thus, variations in the intensity depending on the color can be reduced.

As described above, when dots D8 are printed between the previously printed dots D6 in the overlap area HA using various colors, print quality of the overlap area HA can be improved by using the tape printer 10 of this embodiment.

Whereas, in the above-described embodiment, printing is done using cyan, magenta, and yellow, other colors may be used. In such a case, a pulse table separate for each color should be stored in a memory within the CPU 63 or an EEPROM so that the CPU 63 can read pulse data according to the designated color from the corresponding pulse table. With this configuration, print quality of the overlap area HA can be improved.

Described below is a case where control for changing the number of pulses for each color is not provided.

Figure 23A:
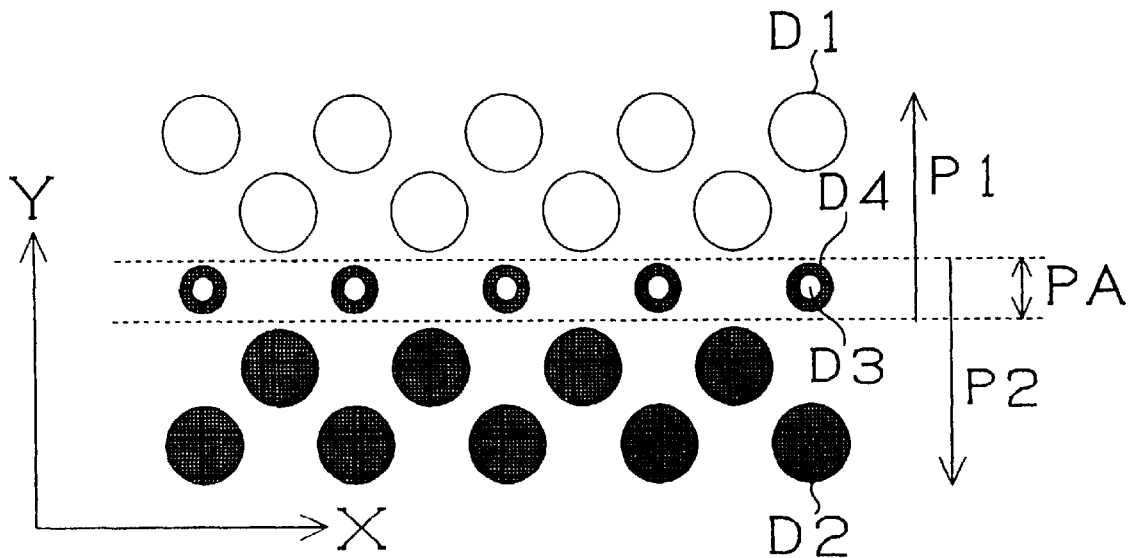
FIG. 23A is a diagram presented for comparison with the fourth embodiment and illustrating a border portion between print areas.

As shown in FIG. 23A, a print area P2 is printed over a print area P1, and an overlap area PA is formed. In the overlap area PA, dots D4 is printed over dots D3.

Dots D3 are smaller in area than dots D1 and D2, which are printed on the print areas P1 and P2, respectively, and identical in area with dots D4.

Figure 23B:
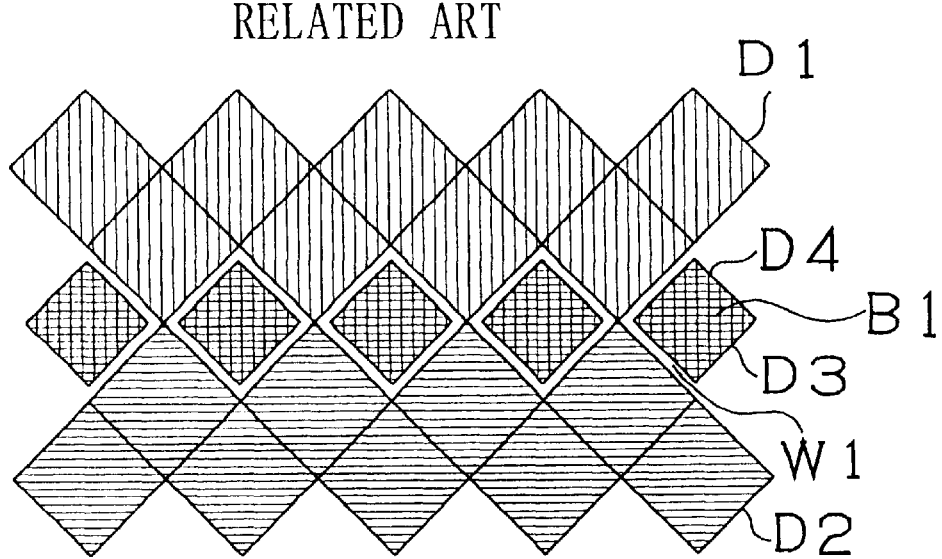
FIG. 23B is a diagram illustrating the result of a simulation performed using the dot pattern of 23A.

As shown in FIG. 23B, high-density overlap portions B1, where dots D3 and D4 overlap with each other, are formed, but they are smaller in area than other dots D1 and D2 and surrounded by white portions W1. Thus, a mixture of colors occurs in the overlap area HA, and, as a result, the overlap area HA appears to have the same color as the color of dots D1 and D3, and is not likely to stand out.

However, when dots having the same color are printed one over another, the intensity of the overlap portions varies depending on the color.

For example, when the portion printed in cyan over cyan stands out more than that printed in yellow over yellow.

With this control, print quality of the overlap area PA will be affected depending on the color to be used. The fourth embodiment provides a solution for this problem.

In the fifth embodiment, dots D6 and D7, which are different in area, are alternately printed on an overlap area HA of a print area H5. Dots D7 are larger in area than dots D6. On the other hand, dots D9 and D10, which are different in area, are alternately printed on the overlap area HA of a print area H6. Dots D9 are identical in area with dots D7, and larger in area than dots D10. Dots D10 are printed over dots D7, while dots D9 are printed over dots D6.

The structure of a tape printer 10 used for implementing the fifth embodiment is generally the same as that described in the first to fourth embodiments, except for the pulse tables to be used. FIGS. 6F, 6G, and 6H shows the pulse tables used for this embodiment.

FIG. 6F shows the contents of the pulse table 64c used for printing on a print area except for the overlap area HA (referred to as a non-overlap area hereinafter). FIG. 6G shows the contents of the pulse table 64d used for printing dots D6 and D10 in the overlap area HA. FIG. 6H shows the pulse table 64e used for printing dots D7 and D9 in the overlap are HA.

As shown in FIGS. 6F, 6G, and 6H, tone data representing the nine levels of tone from 0 to 8 and pulse data representing the number of pulses, which is applied to the heating elements, are shown in a one-to-one correspondence. Dots D9 and D7 in the overlap area are smaller in area than dots in the non-overlap area, and larger in area than dots D6 and D10 in the non-overlap area HA. Accordingly, the number of pulses set for a certain tone level in the pulse table 64e, which is used for printing dots D9 and D7, is smaller than that set in the pulse table 64c, which is used for printing on the non-overlap area, and greater than that set in the pulse table 64d, which is used for printing dots D6 and D10.

Referring now to FIGS. 7, 8C, 9, and 24, the sequence of operation of the tape printer 10 will be described below.

The tape printer 10 of the fifth embodiment is described such that when printing is repeated over the previously printed area, two kinds of dots, which are different in area, are used.

Figure 8C:
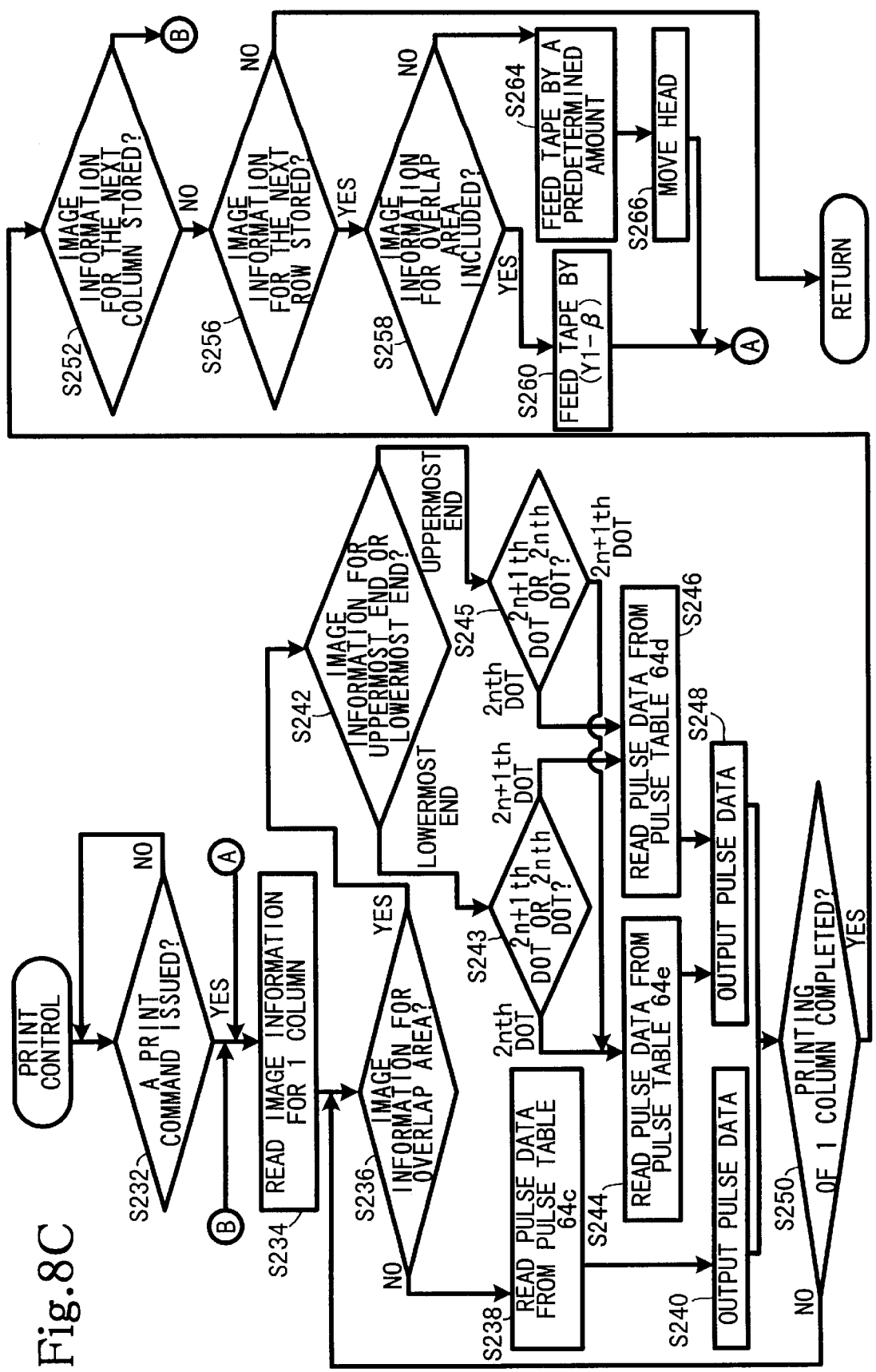
Figure 24A:
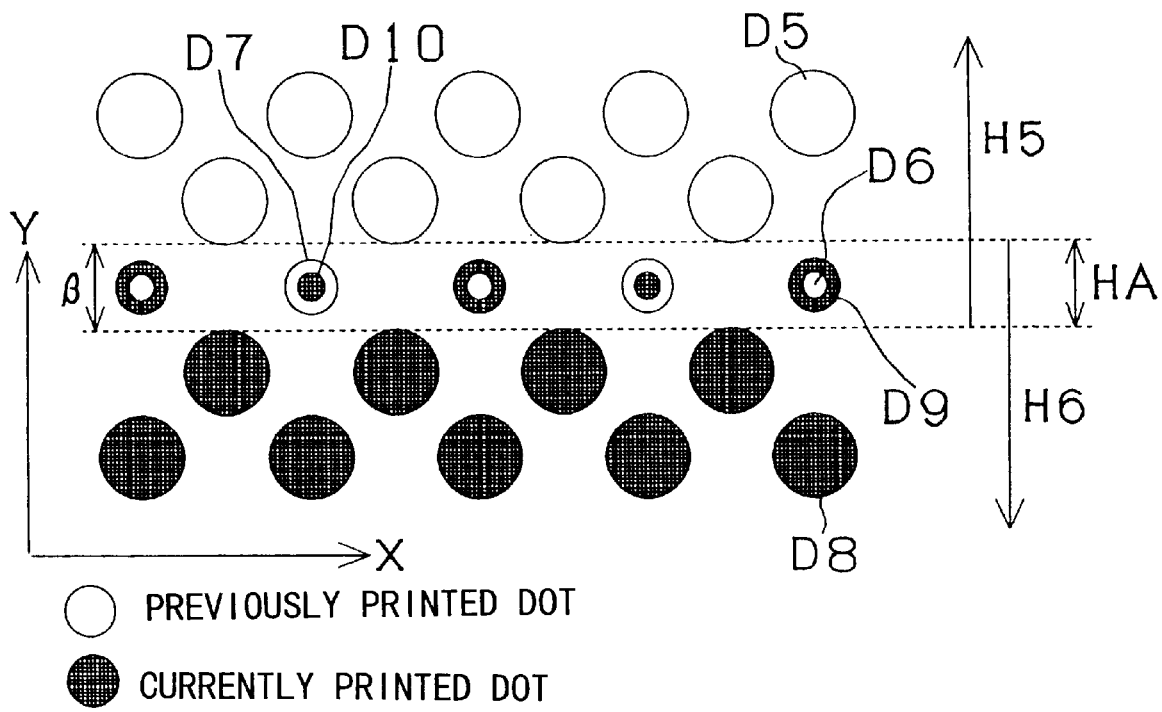
FIG. 24A is a partially exploded diagram illustrating a dot pattern in an overlap area obtained in a fifth embodiment.
Figure 24B:
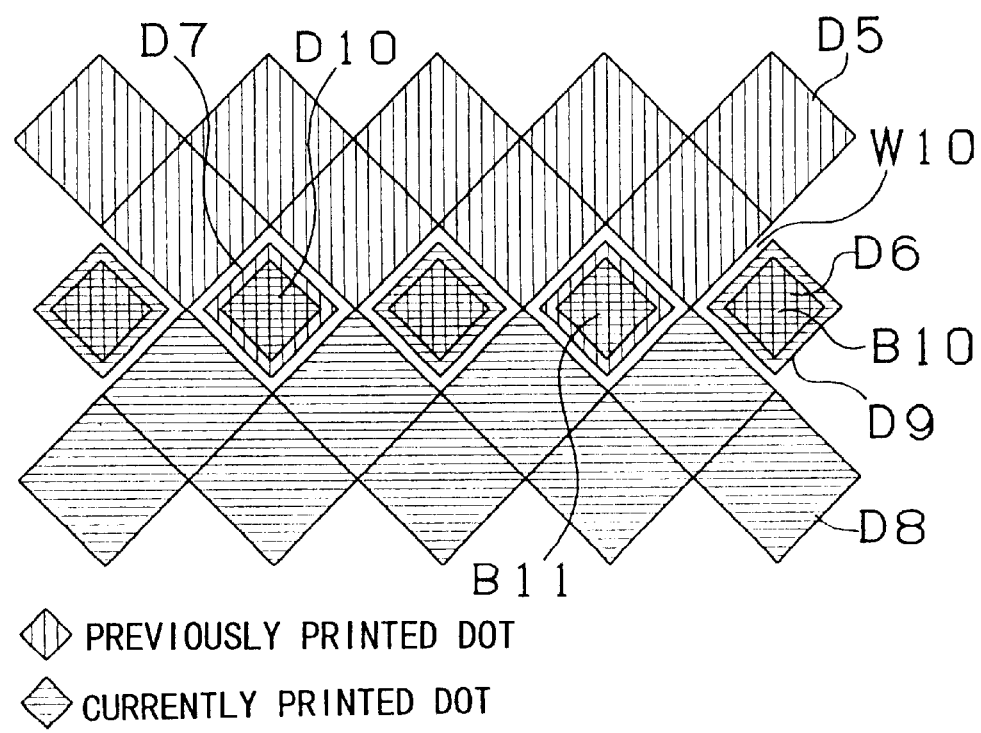
FIG. 24B is a diagram illustrating the result of a simulation performed using the dot pattern of FIG. 24A.

FIG. 7 is a flowchart outlining a control routine executed by the CPU 63. FIG. 8C is a flowchart showing a print control routine executed at step 30 of FIG. 7. FIG. 9 is a diagram illustrating characters to be printed on the tape T2 and a printing sequence. FIG. 24A is a partially exploded diagram illustrating a dot pattern in the overlap area HA, where print areas H5 and H6 shown in FIG. 9 overlap with each other. FIG. 24B is a diagram illustrating the result of a simulation performed using the dot pattern shown in FIG. 24A.

Described herein is a case where characters shown in FIG. 9 are printed as open characters against a red background on the tape T2 by the wide station WS. It is noted that printing on a single print area is accomplished by a single scan of the thermal head 23 in the direction of a row (X direction).

First, when an operator turns on the power switch of the tape printer 10, the CPU 63 performs initialization (S10). Then, the CPU 63 executes display control for displaying on the LCD 16 characters and symbols entered from the keyboard 14 (S20), and executes print control for driving the thermal head 23 and various motors based on the dot pattern data for printing, which is associated with the entered characters and symbols (S30).

Referring now to FIG. 8C, a print control routine executed by the CPU 63 will be described.

When the CPU 63 detects that a print command is issued through keyboard operations (S232: Yes), image information used for printing the first column of the print area H1 is read from the print buffer 69d in the RAM 69 (S234).

Then, the CPU 63 determines if each piece of image information is the one used for printing on the overlap area (S236). Specifically, the CPU 63 determines if each piece of image information is the one to be output to the heating element R256 disposed at the uppermost or lowermost end of the thermal head 23.

A piece of image information to be output to such a heating element is determined to be the data used for printing on the overlap area HA.

When the CPU 63 determines that a piece of image information is not the one used for printing on the overlap area HA (S236: No), the CPU 63 reads, from the pulse table 64c stored in the pulse memory 64 within the CPU 63, pulse data corresponding to the tone level specified by the tone data contained in the piece of image information (S238).

For example, when the tone level is "8", the CPU 63 reads "47", as the pulse data, as shown in FIG. 6F.

Then, the CPU 63 outputs the read pulse data to the head drive circuit 57 (S240), which outputs, upon receipt of the pulse data, a drive signal in terms of the number of pulses to the applicable heating element of the thermal head 23. The heating element generates heat. Then, ink applied to the ink ribbon IR is melted and transferred to the tape T2.

After the CPU 63 determines that a piece of image information is the one used for printing on the overlap area HA (S236: Yes), it determines if the piece of image information is the one used for printing the uppermost or lowermost end of print areas H1–H5 (S242). If the CPU 63 determines the piece of image information is the one used for printing the lowermost end (S242: lowermost end), it then determines if a dot to be printed is the (2n+1)th dot or (2n)th dot (n: natural number) counting from the print starting position (S243). If the CPU 63 determines that the dot is the (2n+1)th dot (S243: (2n+1)th dot), it reads, from the pulse table 64d stored in the memory 64, pulse data corresponding to tone data contained in the image information (S246), and outputs the read pulse data to the head drive circuit 57 (S248). When the tone level is "8", the CPU 63 reads "19" as the pulse data, as shown in the FIG. 6G.

On the other hand, When the CPU 63 determines that the dot is the (2n)th dot (S243: (2n)th dot), it reads, from the pulse table 64e stored in the memory 64, pulse data corresponding to tone data contained in the image information (S246), and outputs the read pulse data to the head drive circuit 57 (S248). When the tone level is "8", the CPU 63 reads "22" as the pulse data, as shown in the FIG. 6H.

If the CPU 63 determines, at S242, that the piece of image information is the one used for printing the uppermost end of print areas H1–H5 (S242: uppermost end), it then determines if a dot to be printed is the (2n+1)th dot or (2n)th dot counting from the print starting position (S245). When the CPU 63 determines that the dot is the (2n+1)th dot (S245: (2n+1)th dot), it reads, from the pulse table 64*e* stored in the memory 64, pulse data corresponding to tone data contained in the image information (S244), and outputs the read pulse data to the head drive circuit 57 (S248). When the tone level is "8", the CPU 63 reads "22" as the pulse data, as shown in the FIG. 6H.

On the other hand, When the CPU 63 determines that the dot is the (2n)th dot (S245: (2n)th dot), it reads, from the pulse table 64*d* stored in the memory 64, pulse data corresponding to tone data contained in the image information (S246), and outputs the read pulse data to the head drive circuit 57 (S248). When the tone level is "8", the CPU 63 reads "19" as the pulse data, as shown in the FIG. 6G. The head drive circuit 57 outputs a drive signal in terms of the number of pulses corresponding to the pulse data to the applicable heating element. Then, the heating element generates heat, and ink applied to the ink ribbon IR is melted and transferred to the tape T2. Thus, printing is accomplished in a pattern of dots on the tape T2. At this time, as the number of pulses becomes greater, the heating element generates higher heat, and dots being larger in area are printed.

The CPU 63 repeats S236 to S248 until it determines, at S250, that printing of one column is completed. If the CPU 63 determines in the affirmative at S250, it then determines if the print buffer 69*d* stores image information used for printing the next column (S252).

Then, the CPU 63 repeats S234 to S250 to continue printing in the row direction, i.e., in the X-axis direction until it determines, at S252, that the print buffer 69*d* stores no image information for the next column. If the CPU 63 determines in the negative at S252, it then determines if the print buffer 69*d* stores image information used for printing the next row (S256). If the CPU 63 determines in the affirmative at S256, it determines if the image information for the next row includes image information used for printing on the overlap area HA (S258). Specifically, the CPU 63 determines if the image information for the next row includes image information to be output to the heating element R1 disposed at the uppermost end of the thermal head 23.

When the CPU determines that the image information for the next row includes image information used for printing on the overlap area HA (S258: Yes), it feeds the tape T2 by a length of (Y1-β) at S260. Y1 is the maximum width (in the row direction) printable by the thermal head 23, and β is an amount overlapping the previously printed area. It is noted that β is a length corresponding to 1.0 dot.

Then, the CPU 63 jumps to S234, and repeats S234 to S250 to perform printing on the next print area until it determines, at S252, that the print buffer 69*d* stores no image information used for printing the next column.

When the CPU 63 determines, at S258, that the image information for the next row includes no image data used for printing on the overlap area HA (S258: No), it feeds the tape T2 by a predetermined amount (S264) and moves the thermal head 23 to its initial print starting position (S266).

When printing is all done, the tape T2 is fed to be discharged (S264) and the thermal head 23 is returned to its initial position (S266). Then, the tape T2 is cut by a cutting mechanism (not shown).

As described above, the CPU 63 performs printing on the print areas H1–H6 and, as a result, a character string is printed on the tape T2.

Referring now to FIGS. 24A and 24B, the overlap area HA, where the print areas H5 and H6 overlap with each other, will be described.

As shown in FIG. 24A, the print area H6 overlaps with the previously printed print area H5 by β (1.0 dot) in the column direction (+Y direction). In the print area H5, dots D6 forming the overlap area HA are smaller in area than dots D5 forming the non-overlap area. Dots 7 forming the overlap area D7 are smaller in area than dots D5 and larger in area than dots D6.

In the print area H6, dots D9 forming the overlap area HA are identical in area with dots 7. Dots 10 forming the overlap area HA are identical in area with dots D6. The center of each dot D9 lies right over the center of each dot D6, and likewise the center of each dot D10 lies right over the center of each dot D7.

Figure 31A:
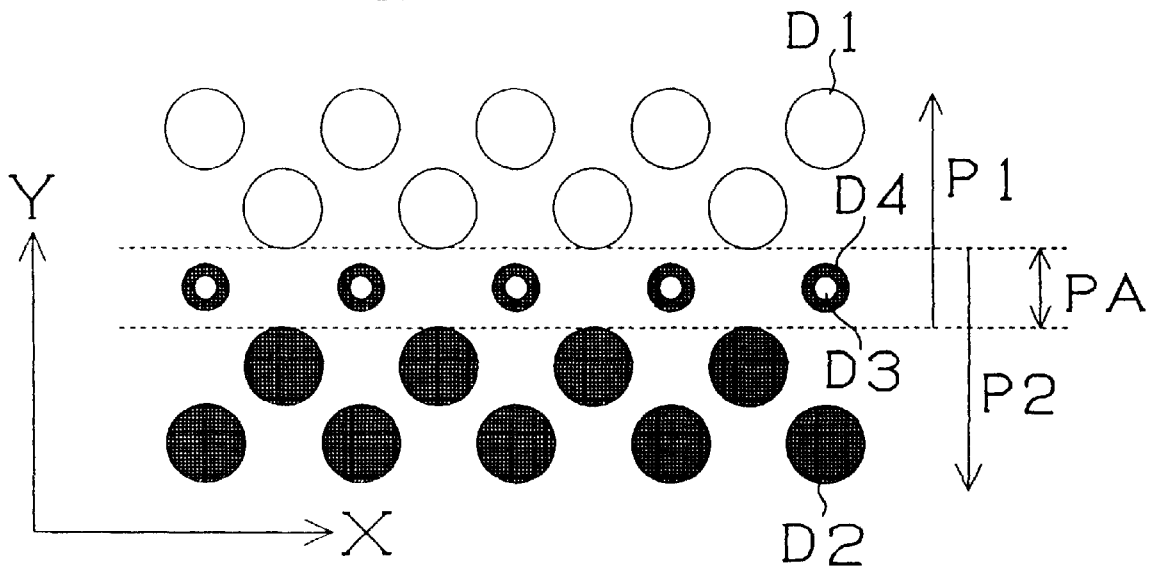
FIG. 31A is a diagram presented for comparison with the fifth embodiment and illustrating a dot pattern in a border portion between print areas printed by a plurality of heating elements constituting the thermal head.
Figure 31B:
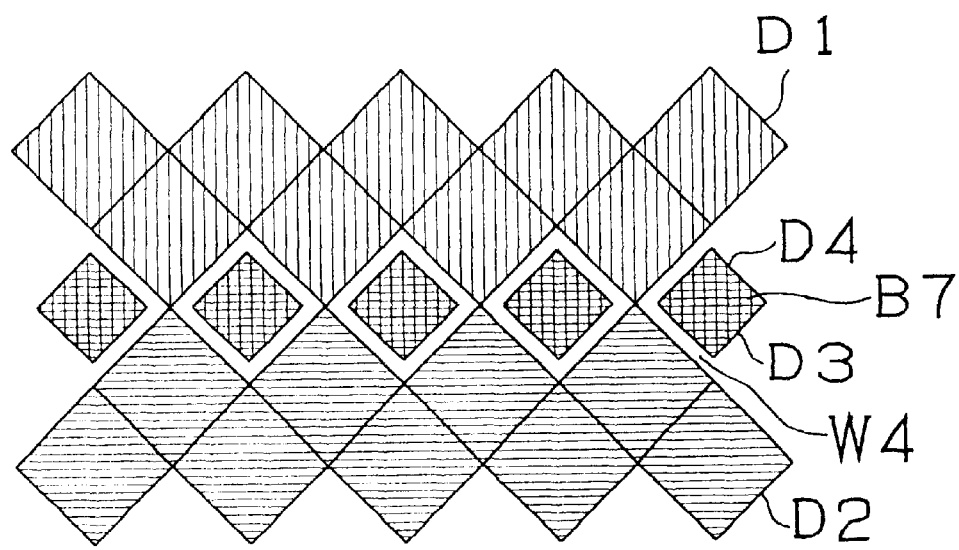
FIG. 31B is a diagram illustrating a case where print areas P1 and P2 are not shifted from each other.

Thus, as shown in FIG. 24B, since high-density overlap portions B10 and B11, where dots overlap with each other, are smaller in area than those B7 formed using related art shown in FIG. 31B, and white portions W10 are smaller in area than those W4 in FIG. 31B, the overlap area HA is less likely to stand out than that printed using the related art.

Figure 25:
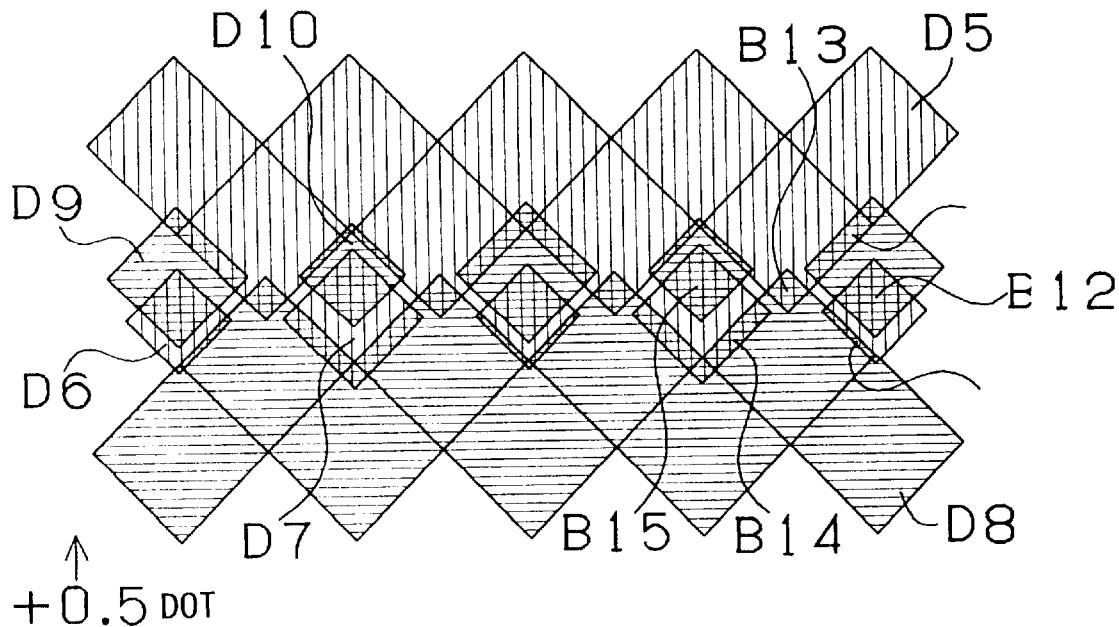
FIG. 25A is a diagram illustrating the result of simulating a case of the fifth embodiment, where the printed position of a print area H6 is shifted by 0.5 dot in the +Y direction.
FIG. 25B is a diagram illustrating the result of simulating a case where the printed position of a print area H6 is shifted by 0.5 dot in the −Y direction.
Figure 25:
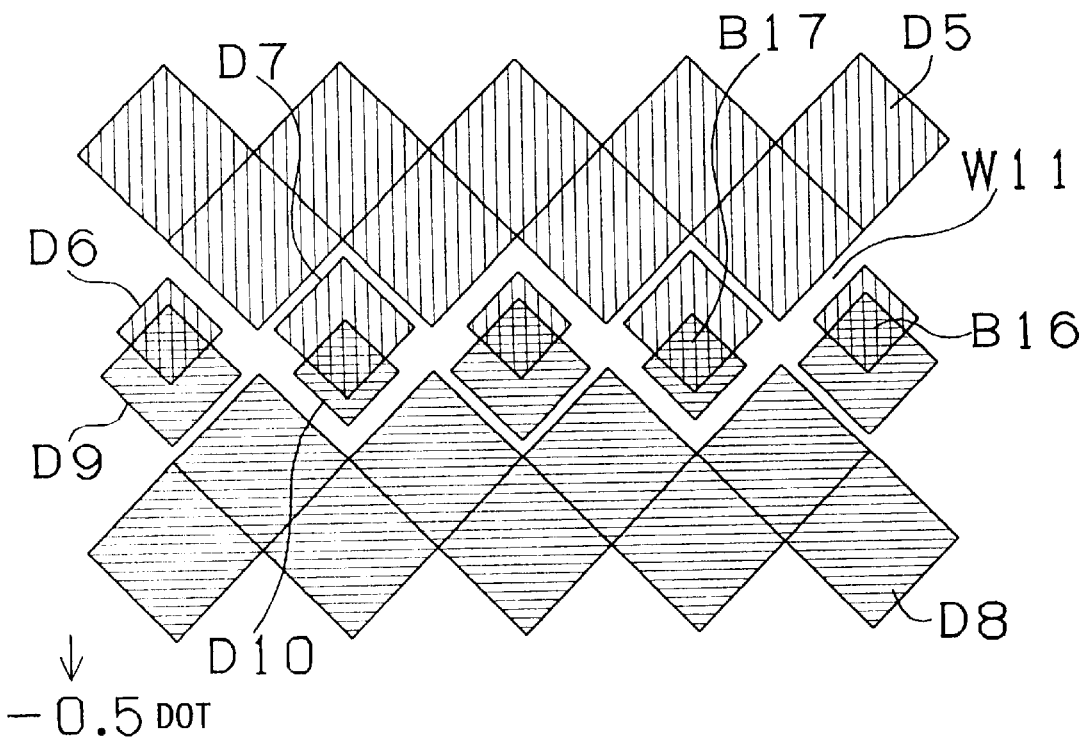

Referring now to FIGS. 25A and 25B, illustrated therein are cases where the print position of the print area H6 is shifted erroneously.

FIG. 25A is a diagram illustrating the result of simulating a case where the print position of the print area H6 is shifted by 0.5 dot in the +Y direction. In this case, high-density overlap portions B12, B13, B14, and B15, where dots overlap with each other, are dispersed alternately, and are less likely to stand out than those formed using the related art shown in FIG. 32A.

FIG. 25B is a diagram illustrating the result of simulating a case where the print position of the print area H6 is shifted by 0.5 dot in the −Y direction. In this case, since high-density overlap portions B16 and B17, where dots overlap with each other, are alternately dispersed, they are less likely to stand out than those formed using the related art shown in FIG. 32B. In addition, since wide and narrow white portions W11 are alternately dispersed, they are less likely to stand out than white portions formed using the related art shown in FIG. 32A.

As described above, print quality can be improved by using the tape printer 10 of the fifth embodiment, wherein dots D6, which are smaller than dots D5 in the non-overlap area, and dots D7, which are smaller than dots D5 and larger than dots D6, are printed alternately in the overlap area HA, while dots D9, which are as large as dots D7, are printed over dots D6, and dots D10, which are as large as dots D6, are printed over dots D7.

Referring now to FIGS. 26, 27A, 27B, 28A, and 28B, a sixth embodiment of a tape printer 10 of this invention will be described below.

In the sixth embodiment, when dots of the uppermost end of a print area are printed over dots of the lowermost end of the previously printed area, the center of each dot of the uppermost end is shifted slightly in the +X direction.

Figure 26:
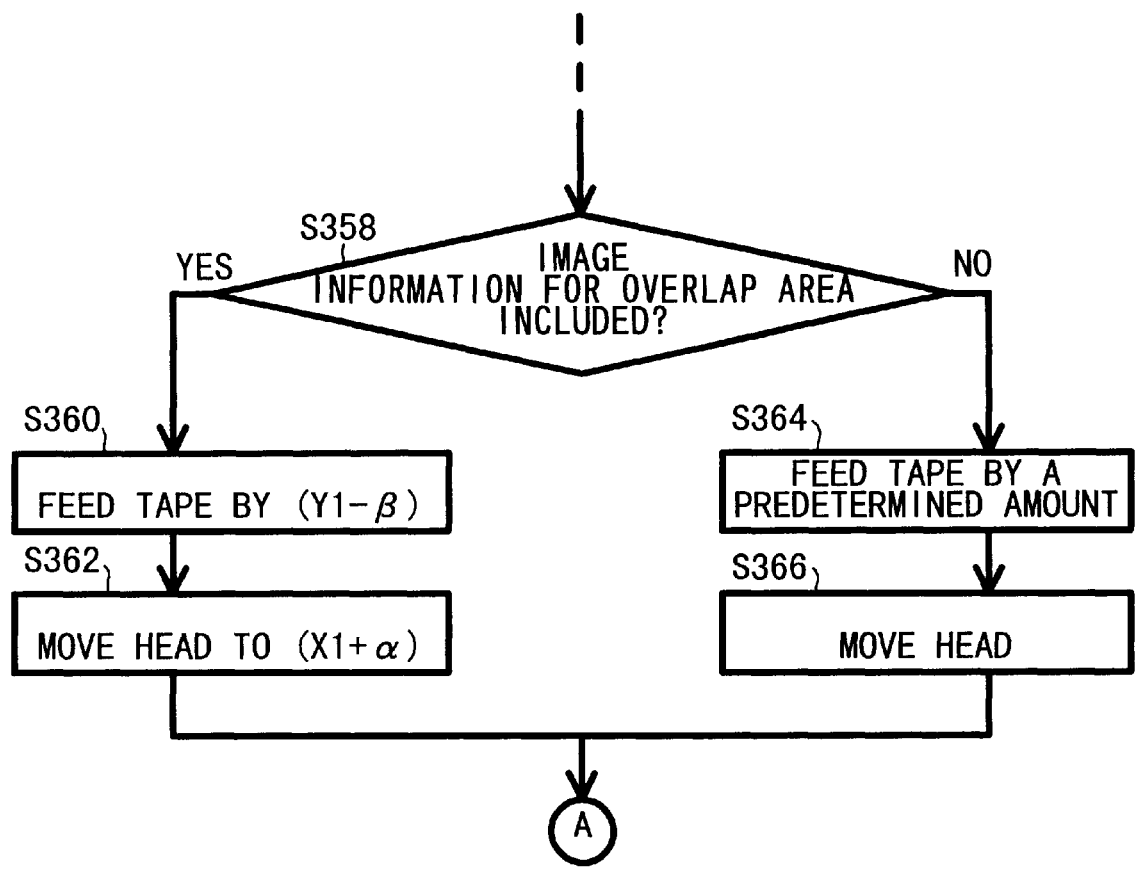
FIG. 26 is a flowchart showing part of a print control routine executed by the CPU in the sixth embodiment.

FIG. 26 is a flowchart showing part of a print control routine executed by the CPU 63. A description of the structure of the tape printer 10 of the sixth embodiment will be omitted because it is the same as that of the fifth embodiment except for control executed for printing on the overlap area HA. Shown in the FIG. 26 is control steps unique to the sixth embodiment.

FIG. 26 shows, as a modification of the control routine shown in FIG. 8C, control steps executed after S258 in FIG. 8C.

When the CPU 63 determines that the image information for the next row includes image information used for printing on the overlap area HA (S358: Yes), it feeds the tape T2 by a length of (Y1–β) at S360, and moves the thermal head 23 by a length of (X1+α) in the +X direction at S362.

X1 shows the initial print starting position at which the print head 23 is set when the image information for the next row includes no image information used for printing on the overlap area HA. α shows an amount (offset) (FIG. 27A) by which the thermal head 23 is moved in the +X direction.

It is noted that β is a length corresponding to 1.0 dot, and so is α.

Figure 27:
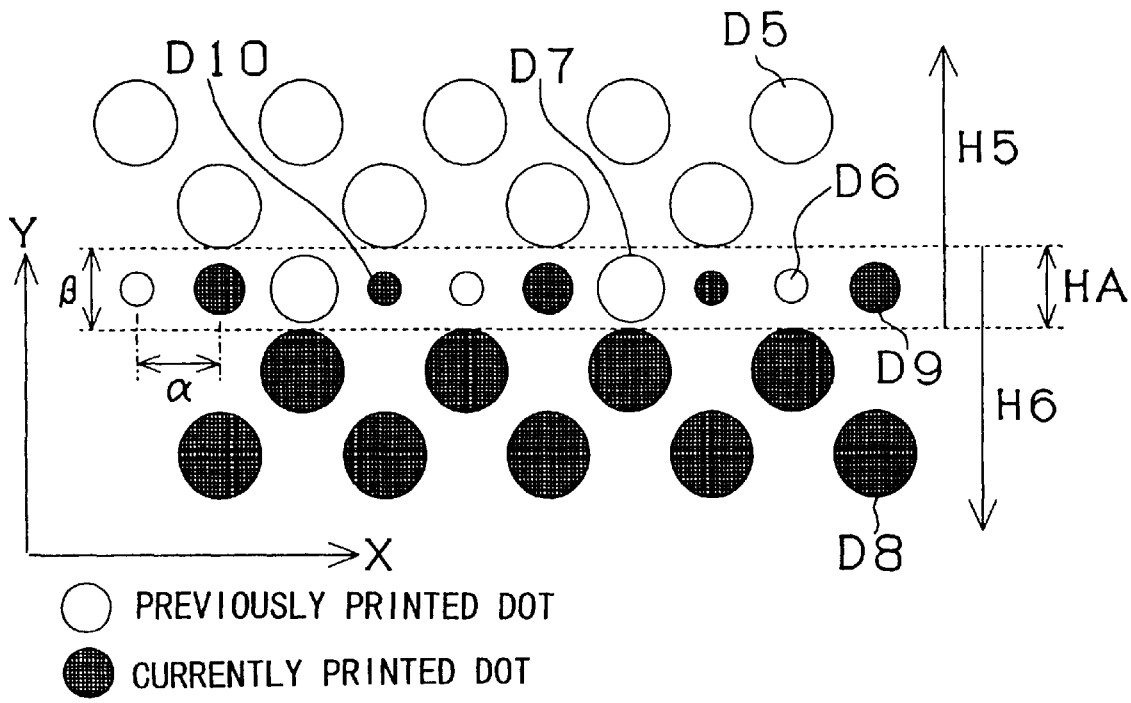
FIG. 27A is a partially exploded diagram illustrating a dot pattern in an overlap area obtained in the sixth embodiment.
FIG. 27B is a diagram illustrating the result of a simulation performed using the dot pattern of FIG. 27A.
Figure 27:
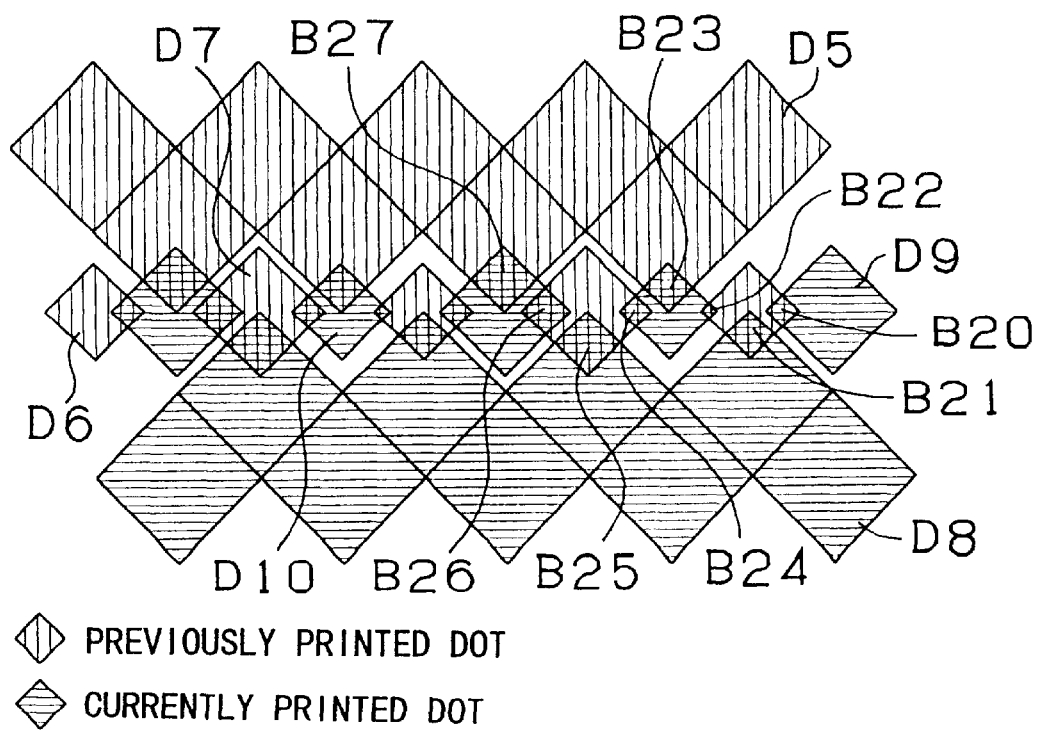

In the fifth embodiment, the print starting position is not moved in the +X direction, and dots D6 and D9 are aligned in the column direction. In the sixth embodiment, as shown in FIG. 27A, the center of each dot D9 and D10 is shifted by 1.0 dot from the center of each dot D6 and D7 in the +X direction. Accordingly, a is set to 1.0 dot.

FIG. 27B shows the result of a simulation performed using the dot pattern shown in FIG. 27A. As shown in FIG. 27B, high-density overlap portions B20–B27, where dots D5–D9 overlap with each other, are formed. However, since the overlap portions B20–B27 are small in area and dispersed, they are not likely to stand out.

Figure 28A:
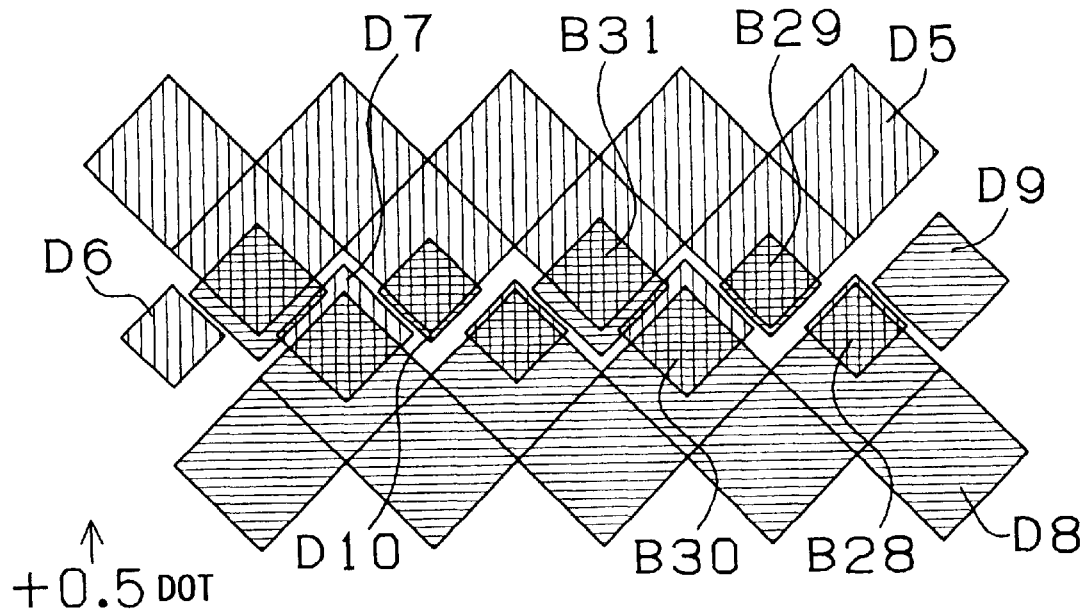
FIG. 28A is a diagram illustrating the result of simulating a case of the sixth embodiment, where dots D9 and D10 are printed while being shifted by 0.5 dot in the +Y direction.
Figure 28B:
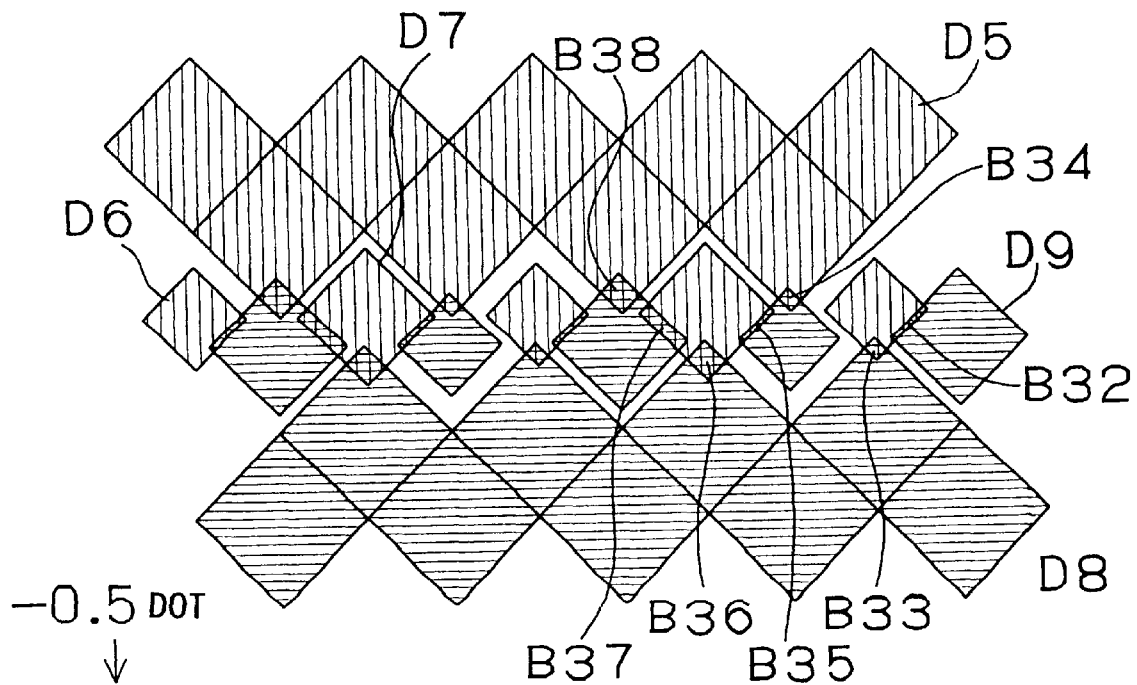
FIG. 28B is a diagram illustrating the result of simulating a case where dots D9 and D10 are printed while being shifted by 0.5 dot in the −Y direction.

Referring now to FIG. 28A and 28B, depicted therein are cases where dots D9 and D10 are printed slightly out of position in the overlap area HA due to, for example, an error of the drive system for feeding the tape T2.

FIG. 28A shows the result of simulating a case where dots D9 and D10 are printed while being shifted by 0.5 dot in the +Y direction. In this case, high-density overlap portions B28–B31, where dots D5–D9 overlap with each other, are formed. However, since the overlap portions B28–B31 are staggered in the Y direction, they are not likely to stand out.

FIG. 28B shows the result of simulating a case where dots D9 and D10 are printed while being shifted by 0.5 dot in the –Y direction. In this case, high-density overlap portions B32–B38, where dots D5–D9 overlap with each other, are formed. However, since the overlap portions B32–B38 are small in area and dispersed, they are not likely to stand out.

As described above, print quality can be improved by using the tape printer 10 of the sixth embodiment, wherein the center of each dot D9 and D10 is slightly shifted in the X direction when dots D6, which are smaller than dots D5 in the non-overlap area, and dots D7, which are smaller than dots D5 and larger than dots D6, are alternately printed in the overlap area HA, while dots D9, which are as large as dots D7, are printed over dots D6, and dots D10, which are as large as dots D6, are printed over dots D7.

α may be set to be greater or smaller than 1.0 dot.

Discussed below is the print quality obtained when control described in the fifth or sixth embodiment is not provided.

FIG. 31A shows a case where, when the uppermost end of a print area P2 is printed over the lowermost end of a print area P1 of an overlap area PA, dots D4 belonging to the print area P2 are larger than dots D3 belonging to the print area P1.

FIG. 31B shows a case where the print areas P1 and P2 are not shifted from each other.

Figure 32A:
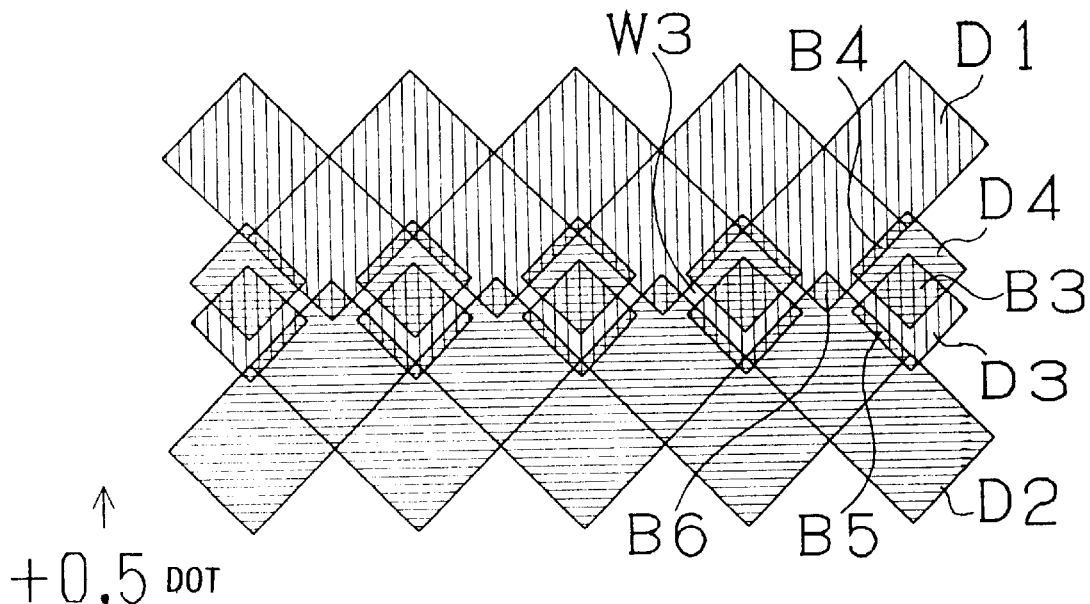
FIG. 32A is a diagram illustrating a case where a print area P2 is shifted by 0.5 dot in the +Y direction.

FIG. 32A shows a case where tape feed is insufficient and the print area P2 is shifted erroneously by 0.5 dot in the +Y direction. In this case, high-density overlap portions B3, B4, B5, and B6, where dots D3 and D4, D1 and D4, dots D2 and D3, and dots D1 and D2 overlap with each other, respectively, are formed. Thus, many high-density portions and a few white portions are formed. The overlap portions B3–B6 are aligned horizontally, respectively. As a result, the overlap area PA stands out.

Figure 32B:
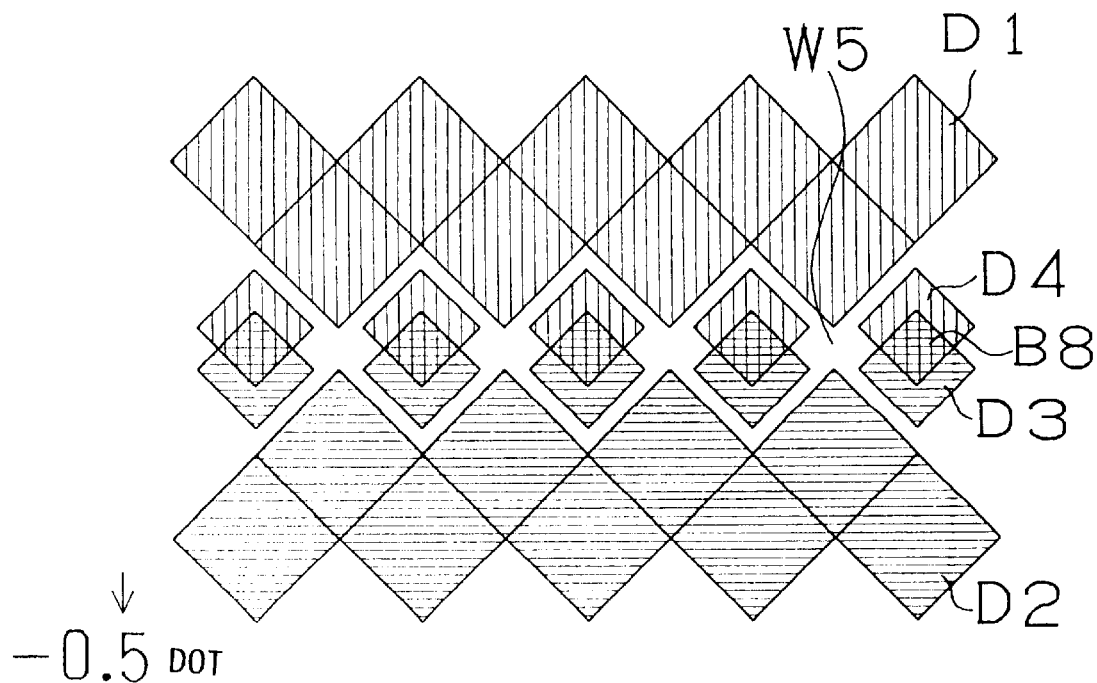
FIG. 32B is a diagram illustrating a case where a print area P2 is shifted by 0.5 dot in the −Y direction.

FIG. 32B shows a case where tape feed is excessive and the print area P2 is shifted by 0.5 dot in the –Y direction. In this case, white portions are formed in the print areas P1 and P2, and high-density overlap portions B8, where dots D3 and D4 overlap with each other, are formed. In this state, the overlap area PA appears to be whitish, and the white portions W5 and the overlap portions B8 are arranged alternately.

As described above, print quality will be deteriorated if the print area P2 is shifted from the previously printed area.

The fifth and sixth embodiments provide a solution for this problem.

To illustrate the difference in performance between the tape printer 10 according to this invention and the related art, discussed below is the relationship between the area ratio and the lightness L* of dots printed in the overlap area HA.

Figure 30:
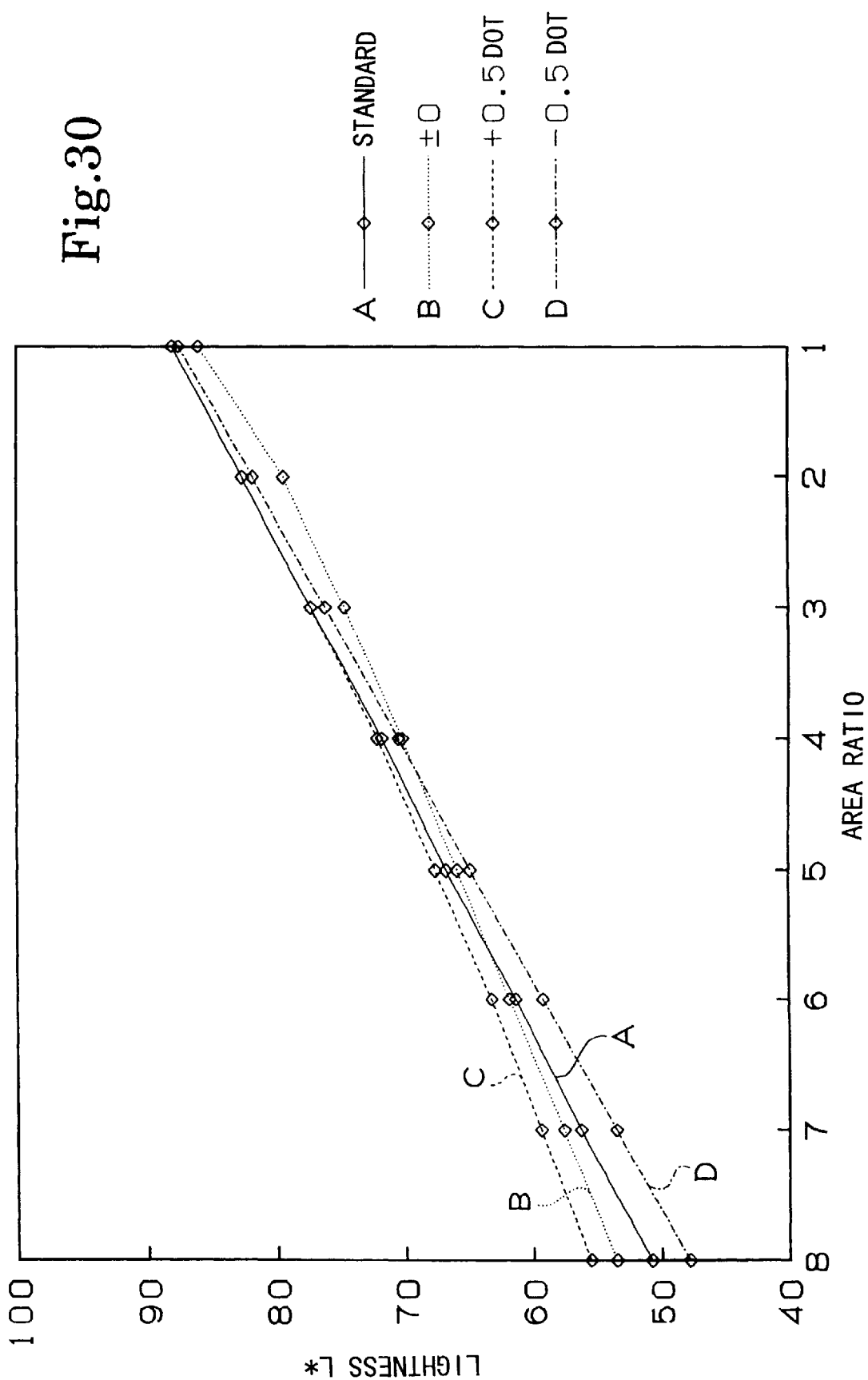
FIG. 30 is a graph showing the relationship between the area ratio and the lightness L* of dots printed in a border portion between print areas.
Figure 33:
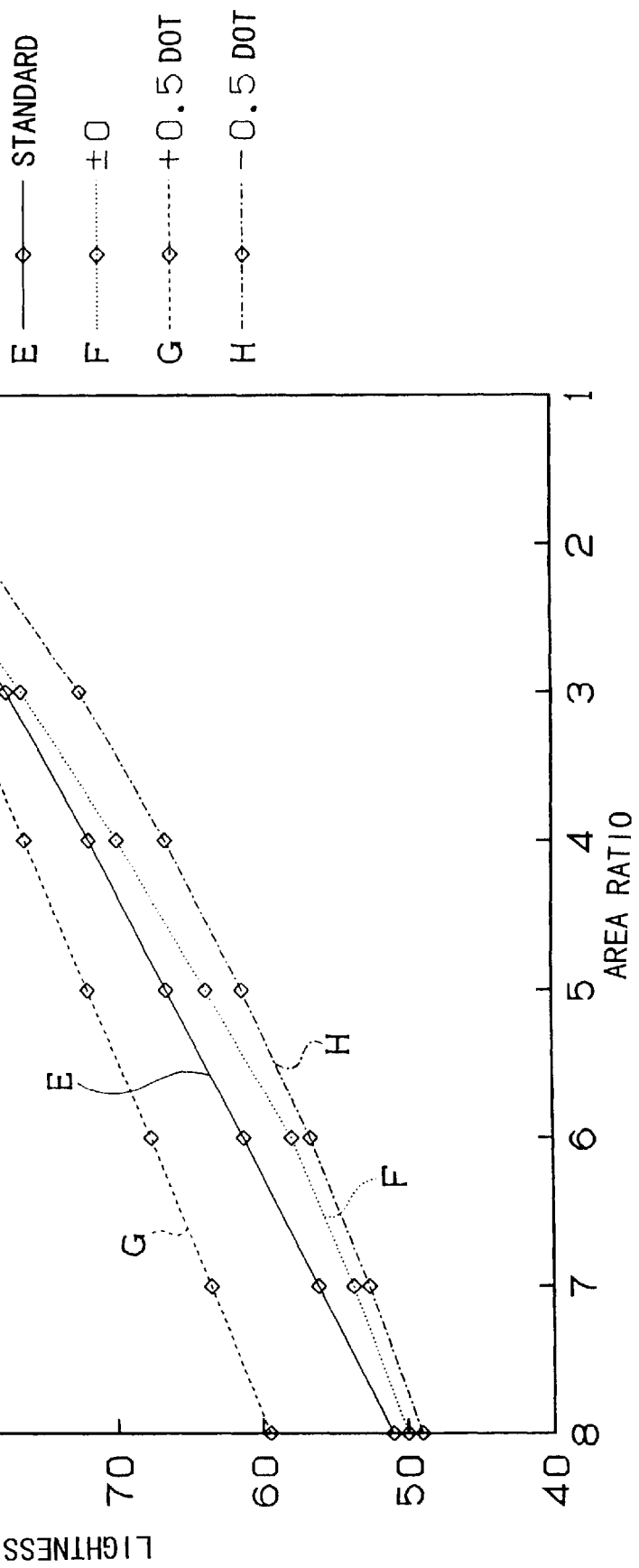
FIG. 33 is graph showing the relationship between the area ratio and the lightness L* of dots printed in a border portion between print areas in cases of FIGS. 31A, 31B, 32A, and 32B.

FIGS. 30 and 33 show the relationship between the area ratio and the lightness L* of dots printed in a border portion between print areas. FIG. 30 is a graph showing the case where the tape printer 10 of the fifth embodiment is used, while FIG. 33 is a graph showing the case where the related art shown in FIG. 31 is used.

In FIGS. 30 and 33, the area ratio corresponds to the dot size, i.e., the tone level. As the lightness L* increases, a printed dot becomes whitish, and as it decreases, a printed dot becomes blackish.

Figures 29A, 29B:
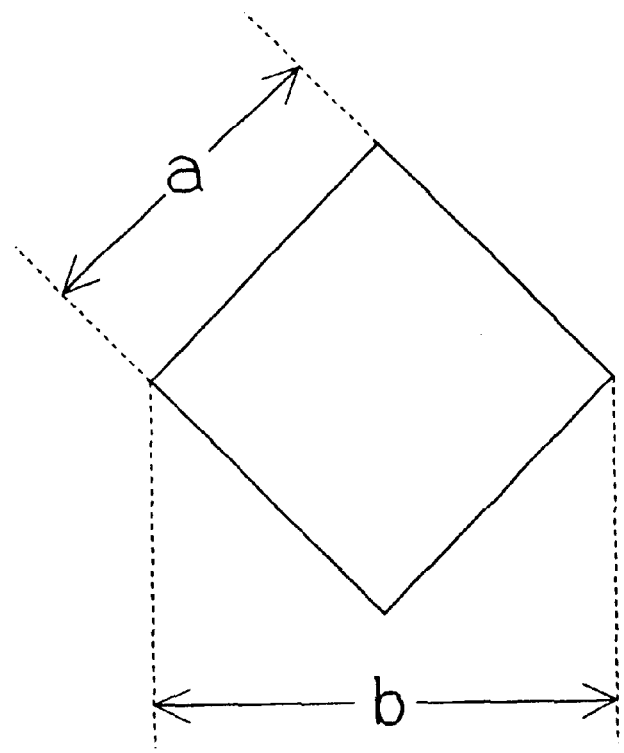
FIG. 29A is a diagram illustrating the area per dot.
FIG. 29B is a table showing the relationship between the area and lengths a and b shown in FIG. 29A.

FIG. 29A is a diagram illustrating the area per dot. FIG. 29B is a table showing the relationship between the area and lengths a and b shown in FIG. 29A.

As shown in FIG. 29B, it is assumed that the area is 100% when length a is 133 μm and length b is 185 μm. The area is 50% when length a is 94 μm and length b is 133 μm.

Both solid line A in FIG. 30 and solid line E in FIG. 33 show the relationship between the area ratio and the lightness L* of dots printed in a print area except for the overlap area HA. A short dashed line B in FIG. 30 shows the same relationship in the case shown in FIG. 24B. A long dashed line C in FIG. 30 shows the same relationship in the case shown in FIG. 25A. An alternate long and short dashed line D in FIG. 30 shows the same relationship in the case shown in FIG. 25B.

A short dashed line F in FIG. 33 shows the same relationship in the case shown in FIG. 31B. A long dashed line G in FIG. 33 shows the same relationship in the case shown in FIG. 32A. An alternate long and short dashed line H in FIG. 33 shows the same relationship in the case shown in FIG. 32B.

As shown in FIGS. 30 and 33, when the area ratio changes from 8 to 1, as a deviation of a given measurement value from the standard line A or B becomes greater, a difference in the lightness L* becomes greater.

When a given measurement value deviates from the standard line A or E in the + direction, the corresponding portion becomes whitish, and on the contrary, when a given measurement value deviates from the standard A or E in the – direction, the corresponding portion becomes blackish. If a line lies close to the standard line A or E when the area ratio changes from 8 to 1, it shows that dots in any size can be printed in a color close to the standard color.

If comparisons are made between FIGS. 30 and 33, the lines B–D deviate greatly from the standard line A in FIG. 30, while the lines F–H deviate less greatly from the standard line E in FIG. 33.

Thus, even if the print position is erroneously shifted by 0.5 dot in the tape feed direction when printing is repeated over the previously printed area, the overlap area produced by the tape printer 10 of the fifth embodiment is less likely to become whitish or blackish than that produced using the related art shown in FIG. 31.

Accordingly, print quality of the overlap area can be improved by using the tape printer 10 of the fifth embodiment.

In the fifth and sixth embodiments, the pulse tables 64*d* in FIG. 6G and 64*e* in FIG. 6H are used at S244 and S246. For color printing, pulse tables for color printing should be stored in the memory 64 within the CPU 53.

By doing so, variations in the intensity of each color in the overlap area HA can be reduced, and print quality of the overlap area HA printed in color can be improved.

Preferred embodiments have been described in connection with the tape printer. A computer may be connected to the tape printer so that print control is executed by the computer. Although, preferred embodiments have been described in connection with the tape printer with a thermal head, this invention may be applied to a word processor with a thermal head or an inkjet head, and a printer with a thermal head or an inkjet head.

What is claimed is:

1. A printing device, comprising:
   a print head having a plurality of printing elements which are aligned in a column direction, the print head being movable in a row direction relative to a medium; and
   a print controller that generates a print signal which drives the printing elements to form dots on the medium,
   wherein the print controller generates the print signal so that dots are formed over a predetermined area of a previous print area, the dots in the predetermined area being smaller than dots in the other portion of the previous print area, and the dots formed over the predetermined area being shifted by a predetermined amount in a predetermined direction from dots previously formed in the predetermined area, wherein the predetermined direction is the row direction.

2. The printing device of claim 1, wherein the predetermined direction is the row and column directions.

3. The printing device of claim 1, wherein the predetermined amount by which the dots are shifted is 1.0 dot in the row direction from the dots previously formed in the predetermined area.

4. A printing device, comprising:
   a print head having a plurality of printing elements which are aligned in a column direction, the print head being movable in a row direction relative to a medium; and
   a print controller that generates a print signal which drives the printing elements to form dots on the medium,
   wherein the print controller generates the print signal so that dots are formed over a predetermined area of a previous print area, the dots in the predetermined area being smaller than dots in the other portion of the previous print area, and the dots formed over the predetermined area being shifted by a predetermined amount in a predetermined direction from dots previously formed in the predetermined area, wherein the predetermined direction is the column direction, and wherein the predetermined amount by which the dots are shifted is 0.5 dot in the column direction from the dots previously formed in the predetermined area.

5. The printing device of claim 1, wherein the dots formed in the predetermined area and the dots the printing device forms over the predetermined area are at least two kinds of dots, which are different in area, respectively.

6. The printing device of claim 1, wherein the printing device performs color printing upon receipt of a print signal, to form color dots on the medium, wherein when the printing device forms dots over the predetermined area of the previous print area, the printing device changes a tone of the dots according to a color used for printing.

7. The printing device of claim 1, wherein the print head is a thermal head.

8. The printing device of claim 1, wherein the printing device further comprises a storage device that stores tone data and energy data which correspond to each other and are set for each color, the tone data representing the tone of the dots and energy data representing an amount of energy to be applied to the printing elements, and wherein the printing device changes the tone of the dots by selecting the energy data associated with the tone data for the color used for printing.

9. A storage medium for storing programs, the programs controlling a printing device that includes a print head having a plurality of printing elements which are aligned in a column direction, the print head being movable in a row direction relative to a medium; the programs further comprising:
   a program for generating a print signal which drives the printing elements so that dots are formed over a predetermined area of a previous print area, the dots in the predetermined area being smaller than dots in the other portion of the previous print area, and the dots formed over the predetermined area being shifted by a predetermined amount in a predetermined direction from dots previously formed in the predetermined area, wherein the predetermined direction is the row direction.

10. The storage medium of claim 9, wherein the predetermined direction is the row and column directions.

11. The storage medium of claim 9, wherein the predetermined amount by which the dots are shifted is 1.0 dot in the row direction from the dots previously formed in the predetermined area.

12. A storage medium for storing programs, the programs controlling a printing device that includes a print head having a plurality of printing elements which are aligned in a column direction, the print head being movable in a row direction relative to a medium; the programs further comprising:
   a program for generating a print signal which drives the printing elements so that dots are formed over a predetermined area of a previous print area, the dots in the predetermined area being smaller than dots in the other portion of the previous print area, and the dots formed over the predetermined area being shifted by a predetermined amount in a predetermined direction from dots previously formed in the predetermined area, wherein the predetermined direction is the column direction, and wherein the predetermined amount by which the dots are shifted is 0.5 dot in the column direction from the dots previously formed in the predetermined area.

13. The storage medium of claim 9, wherein the dots formed in the predetermined area and the dots the printing device forms over the predetermined area are at least two kinds of dots, which are different in area, respectively.

14. The storage medium of claim 9, wherein the program performs color printing upon receipt of a print signal, to form color dots on the medium, wherein when dots are formed over the predetermined area of the previous print area, a tone of dots is changed according to a color used for printing.

15. The storage medium of claim 9, wherein the print head is a thermal head.

16. The storage medium of claim 9, wherein further comprising a program for storing tone data and energy data which correspond to each other and are set for each color, the tone data representing the tone of the dots and energy data representing an amount of energy to be applied to the printing elements, and wherein the tone of the dots is changed by selecting the energy data associated with the tone data for the color used for printing.

17. A method for printing using a printing device that includes a print head having a plurality of printing elements which are aligned in a column direction, the print head being movable in a row direction relative to a medium, comprising:

generating a print signal which drives the printing elements so that dots are formed over a predetermined area of a previous print area, the dots in the predetermined area being smaller than dots in the other portion of the previous print area, and the dots formed over the predetermined area being shifted by a predetermined amount in a predetermined direction from dots previously formed in the predetermined area, wherein the predetermined direction is the row direction.

18. The method of claim 17, wherein the predetermined direction is the row and column directions.

19. The method of claim 17, wherein the predetermined amount by which the dots are shifted is 1.0 dot in the row direction from the dots previously formed in the predetermined area.

20. A method for printing using a printing device that includes a print head having a plurality of printing elements which are aligned in a column direction, the print head being movable in a row direction relative to a medium, comprising:

generating a print signal which drives the printing elements so that dots are formed over a predetermined area of a previous print area, the dots in the predetermined area being smaller than dots in the other portion of the previous print area, and the dots formed over the predetermined area being shifted by a predetermined amount in a predetermined direction from dots previously formed in the predetermined area, wherein the predetermined direction is the column direction, and wherein the predetermined amount by which the dots are shifted is 0.5 dot in the column direction from the dots previously formed in the predetermined area.

21. The method of claim 17, wherein the dots formed in the predetermined area and the dots formed over the predetermined area are at least two kinds of dots, which are different in area, respectively.

22. The method of claim 17, wherein color printing is performed upon receipt of a print signal, to form color dots on the medium, wherein when dots are formed over the predetermined area of the previous print area, the dots are changed in tone according to a color used for printing.

23. The method of claim 17, wherein the print head is a thermal head.

24. The method of claim 17, further comprising storing tone data and energy data which correspond to each other and are set for each color, the tone data representing the tone of the dots and energy data representing an amount of energy to be applied to the printing elements, and wherein the tone of the dots is changed by selecting the energy data associated with the tone data for the color used for printing.

* * * * *